United States Patent
Voit et al.

(10) Patent No.: US 8,976,782 B1
(45) Date of Patent: Mar. 10, 2015

(54) NETWORK SESSION MANAGEMENT FOR TELEPHONY OVER HYBRID NETWORKS

(75) Inventors: Eric A. Voit, Baltimore, MD (US); Edward E. Balkovich, Potomac, MD (US); William D. Goodman, Collegeville, PA (US); Jayant G. Gadre, Oakton, VA (US); Patrick E. White, Vienna, VA (US); David E. Young, Silver Spring, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1484 days.

(21) Appl. No.: 11/930,672

(22) Filed: Oct. 31, 2007

Related U.S. Application Data

(63) Continuation of application No. 10/979,317, filed on Nov. 2, 2004, now Pat. No. 7,948,968, which is a continuation of application No. 08/931,159, filed on Sep. 16, 1997, now Pat. No. 6,137,869, and a continuation-in-part of application No. 08/931,480, filed on Sep. 16, 1997, now Pat. No. 6,839,340.

(51) Int. Cl.
*H04L 12/66* (2006.01)
*H04M 15/00* (2006.01)
*H04M 11/00* (2006.01)

(52) U.S. Cl.
USPC .......... 370/352; 370/353; 370/354; 370/355; 370/356; 379/114.28; 379/114.29; 379/126; 379/127.01; 455/406; 455/407; 455/408

(58) Field of Classification Search
CPC ... H04L 12/14; H04L 12/56; H04L 29/06176; H04L 29/08576; H04L 29/12518; H04L 61/2571; H04W 4/24; H04W 4/26; H04M 15/41; H04M 15/67; H04M 2215/016; H04M 2215/0164; H04M 2215/24

USPC ........ 370/260, 352–356; 379/114.28, 114.29, 379/126, 127.01; 455/406–408
See application file for complete search history.

(56) References Cited

U.S. PATENT DOCUMENTS

| | | | |
|---|---|---|---|
| 4,054,756 | A | 10/1977 | Comella et al. |
| 4,100,377 | A | 7/1978 | Flanagan |

(Continued)

FOREIGN PATENT DOCUMENTS

| | | |
|---|---|---|
| EP | 0235257 | 2/1987 |
| EP | 0235057 | 9/1987 |

(Continued)

OTHER PUBLICATIONS

Haley, James E., "Pay-per-call blocking using LIDB," AIN Service Description, Bell Atlantic Easy Number Call Routing Service, Oct. 1996.

(Continued)

*Primary Examiner* — Luat Phung
*Assistant Examiner* — Kai Chang

(57) ABSTRACT

A communication system providing telephony communication across combined circuit switched and packet switched networks, such as a telephone network and the Internet, which are connectable to terminals, such as telephones and computers, for selective communication therebetween. The communication system includes an authorization and account control object in the packet switched network, multiple gateways between the circuit switched and packet switched networks providing controlled connectivity between those networks, and an information retrieval object in the packet switched network.

19 Claims, 13 Drawing Sheets

(56) References Cited

U.S. PATENT DOCUMENTS

| | | |
|---|---|---|
| 4,191,860 A | 3/1980 | Weber |
| 4,201,891 A | 5/1980 | Lawrence et al. |
| 4,310,727 A | 1/1982 | Lawser |
| 4,313,035 A | 1/1982 | Jordon et al. |
| 4,313,036 A | 1/1982 | Jabara et al. |
| 4,371,752 A | 2/1983 | Matthews et al. |
| 4,375,097 A | 2/1983 | Ulug |
| 4,555,594 A | 11/1985 | Friedes et al. |
| 4,565,903 A | 1/1986 | Riley |
| 4,577,066 A | 3/1986 | Bimonte et al. |
| 4,585,906 A | 4/1986 | Matthews et al. |
| 4,602,129 A | 7/1986 | Matthews et al. |
| 4,609,778 A | 9/1986 | Franklin et al. |
| 4,611,094 A | 9/1986 | Asmuth et al. |
| 4,611,096 A | 9/1986 | Asmuth et al. |
| 4,625,081 A | 11/1986 | Lotito et al. |
| 4,630,262 A | 12/1986 | Callens et al. |
| 4,652,700 A | 3/1987 | Matthews et al. |
| 4,653,045 A | 3/1987 | Stanley et al. |
| 4,672,700 A | 6/1987 | Poncy |
| 4,679,190 A | 7/1987 | Dias et al. |
| 4,685,125 A | 8/1987 | Zave |
| 4,710,917 A | 12/1987 | Tompkins et al. |
| 4,713,806 A | 12/1987 | Oberlander et al. |
| 4,718,005 A | 1/1988 | Feigenbaum et al. |
| 4,730,071 A | 3/1988 | Schoenthal |
| 4,734,931 A | 3/1988 | Bourg et al. |
| 4,741,820 A | 5/1988 | Coughlin |
| 4,747,127 A | 5/1988 | Hansen et al. |
| 4,747,130 A | 5/1988 | Ho |
| 4,748,618 A | 5/1988 | Brown et al. |
| 4,765,924 A | 8/1988 | Inoue |
| 4,766,604 A | 8/1988 | Axberg |
| 4,771,425 A | 9/1988 | Baran et al. |
| 4,782,485 A | 11/1988 | Gollub |
| 4,788,718 A | 11/1988 | McNabb et al. |
| 4,790,003 A | 12/1988 | Kepley |
| 4,821,034 A | 4/1989 | Anderson et al. |
| 4,827,500 A | 5/1989 | Binkerd et al. |
| 4,865,763 A | 9/1989 | Inoue |
| 4,866,763 A | 9/1989 | Cooper et al. |
| 4,872,157 A | 10/1989 | Hemmady et al. |
| 4,872,159 A | 10/1989 | Hemmady et al. |
| 4,872,160 A | 10/1989 | Hemmady et al. |
| 4,872,197 A | 10/1989 | Pemmaraju |
| 4,875,206 A | 10/1989 | Nichols et al. |
| 4,877,949 A | 10/1989 | Danielson |
| 4,882,476 A | 11/1989 | White |
| 4,893,302 A | 1/1990 | Hemmady et al. |
| 4,894,824 A | 1/1990 | Hemmady et al. |
| 4,897,874 A | 1/1990 | Lidinsky et al. |
| 4,899,333 A | 2/1990 | Roediger |
| 4,899,373 A | 2/1990 | Lee et al. |
| 4,910,794 A | 3/1990 | Mahany |
| 4,916,691 A | 4/1990 | Goodman |
| 4,918,722 A | 4/1990 | Duehren et al. |
| 4,922,348 A | 5/1990 | Gillon et al. |
| 4,922,486 A | 5/1990 | Lidinsky et al. |
| 4,933,931 A | 6/1990 | Kokubo |
| 4,942,574 A | 7/1990 | Zelle |
| 4,958,341 A | 9/1990 | Hemmady et al. |
| 4,969,184 A | 11/1990 | Gordon et al. |
| 4,979,206 A | 12/1990 | Padden et al. |
| 4,996,707 A | 2/1991 | O'Malley et al. |
| D315,573 S | 3/1991 | Schultz |
| 5,008,906 A | 4/1991 | Reichwein |
| 5,008,926 A | 4/1991 | Misholi |
| 5,009,337 A | 4/1991 | Bimbi |
| 5,012,511 A | 4/1991 | Hanle et al. |
| 5,018,191 A | 5/1991 | Catron et al. |
| 5,019,699 A | 5/1991 | Koenck |
| 5,023,868 A | 6/1991 | Davidson |
| 5,025,254 A | 6/1991 | Hess |
| 5,029,196 A | 7/1991 | Morganstein |
| 5,029,199 A | 7/1991 | Jones et al. |
| 5,029,200 A | 7/1991 | Haas |
| 5,031,098 A | 7/1991 | Miller |
| 5,034,975 A | 7/1991 | Grimes |
| 5,052,020 A | 9/1991 | Koenck |
| 5,052,943 A | 10/1991 | Davis |
| 5,065,393 A | 11/1991 | Sibbitt et al. |
| 5,068,888 A | 11/1991 | Scherk et al. |
| 5,070,536 A | 12/1991 | Mahany |
| 5,098,877 A | 3/1992 | Coughlin |
| 5,107,492 A | 4/1992 | Roux et al. |
| 5,113,499 A | 5/1992 | Ankney et al. |
| 5,115,431 A | 5/1992 | Williams et al. |
| 5,115,495 A | 5/1992 | Tsuchiya et al. |
| 5,123,064 A | 6/1992 | Hacker |
| 5,134,647 A | 7/1992 | Pugh et al. |
| 5,144,282 A | 9/1992 | Sutterlin |
| 5,146,488 A | 9/1992 | Okada et al. |
| 5,146,491 A | 9/1992 | Silver et al. |
| 5,157,390 A | 10/1992 | Yoshie et al. |
| 5,157,662 A | 10/1992 | Tadamura et al. |
| 5,159,592 A | 10/1992 | Perkins |
| 5,159,624 A | 10/1992 | Makita |
| 5,163,080 A | 11/1992 | Amoroso |
| 5,164,938 A | 11/1992 | Jurkevich et al. |
| 5,180,232 A | 1/1993 | Chadima |
| 5,185,860 A | 2/1993 | Wu |
| 5,193,110 A | 3/1993 | Jones et al. |
| 5,195,085 A | 3/1993 | Bertsch et al. |
| 5,195,086 A | 3/1993 | Baumgartner et al. |
| 5,195,128 A | 3/1993 | Knitl |
| 5,195,183 A | 3/1993 | Miller |
| 5,199,062 A | 3/1993 | Von Meister |
| 5,200,993 A | 4/1993 | Wheeler et al. |
| 5,202,817 A | 4/1993 | Koenck |
| 5,202,825 A | 4/1993 | Miller |
| 5,204,894 A | 4/1993 | Darden |
| 5,206,901 A | 4/1993 | Harlow et al. |
| 5,208,848 A | 5/1993 | Pula |
| 5,215,011 A | 6/1993 | Monney |
| 5,216,233 A | 6/1993 | Main |
| 5,218,187 A | 6/1993 | Koenck |
| 5,218,188 A | 6/1993 | Hanson |
| 5,223,699 A | 6/1993 | Flynn et al. |
| 5,223,820 A | 6/1993 | Sutterlin |
| 5,225,071 A | 7/1993 | Coughlin |
| 5,226,075 A | 7/1993 | Funk et al. |
| 5,227,614 A | 7/1993 | Danielson |
| 5,231,492 A | 7/1993 | Dangi et al. |
| 5,235,317 A | 8/1993 | Sutterlin |
| 5,237,604 A | 8/1993 | Ryan |
| 5,241,588 A | 8/1993 | Babson et al. |
| 5,243,645 A | 9/1993 | Bissell et al. |
| 5,243,654 A | 9/1993 | Hunter |
| 5,247,571 A | 9/1993 | Kay et al. |
| 5,254,971 A | 10/1993 | Sutterlin |
| 5,260,986 A | 11/1993 | Pershan |
| 5,263,080 A | 11/1993 | Jones et al. |
| 5,265,155 A | 11/1993 | Castro |
| 5,272,749 A | 12/1993 | Masek |
| 5,274,696 A | 12/1993 | Perelman |
| 5,280,159 A | 1/1994 | Schultz et al. |
| 5,287,199 A | 2/1994 | Zoccolillo |
| 5,289,378 A | 2/1994 | Miller |
| 5,289,468 A | 2/1994 | Yoshida |
| 5,295,154 A | 3/1994 | Meier |
| 5,303,297 A | 4/1994 | Hillis |
| 5,305,181 A | 4/1994 | Schultz |
| 5,308,966 A | 5/1994 | Danielson |
| 5,309,437 A | 5/1994 | Perlman et al. |
| 5,311,583 A | 5/1994 | Friedes et al. |
| 5,313,053 A | 5/1994 | Koenck |
| 5,317,566 A | 5/1994 | Joshi |
| 5,317,691 A | 5/1994 | Traeger |
| 5,318,719 A | 6/1994 | Hughes |
| 5,322,991 A | 6/1994 | Hanson |
| 5,325,421 A | 6/1994 | Hou et al. |
| 5,327,421 A | 7/1994 | Hiller et al. |
| 5,327,486 A | 7/1994 | Wolff et al. |
| 5,329,520 A | 7/1994 | Richardson |

(56) References Cited

U.S. PATENT DOCUMENTS

| | | |
|---|---|---|
| 5,329,578 A | 7/1994 | Brennan et al. |
| 5,331,580 A | 7/1994 | Miller |
| 5,333,266 A | 7/1994 | Boaz |
| 5,341,374 A | 8/1994 | Lewen et al. |
| 5,345,446 A | 9/1994 | Hiller et al. |
| 5,346,611 A | 9/1994 | Coughlin |
| 5,347,633 A | 9/1994 | Ashfield et al. |
| 5,349,497 A | 9/1994 | Hanson |
| 5,349,678 A | 9/1994 | Morris et al. |
| 5,351,286 A | 9/1994 | Nici |
| 5,353,331 A | 10/1994 | Emery et al. |
| 5,359,185 A | 10/1994 | Hanson |
| 5,361,256 A | 11/1994 | Doeringer et al. |
| 5,365,524 A | 11/1994 | Hiller et al. |
| 5,365,546 A | 11/1994 | Koenck |
| 5,367,566 A | 11/1994 | Moe et al. |
| 5,371,858 A | 12/1994 | Miller |
| 5,375,068 A | 12/1994 | Palmer et al. |
| 5,375,159 A | 12/1994 | Williams |
| 5,377,186 A | 12/1994 | Wegner et al. |
| 5,381,465 A | 1/1995 | Carter et al. |
| 5,384,831 A | 1/1995 | Creswell et al. |
| 5,384,840 A | 1/1995 | Blatchford et al. |
| 5,386,467 A | 1/1995 | Ahmad |
| 5,390,175 A | 2/1995 | Hiller et al. |
| 5,390,335 A | 2/1995 | Stephan et al. |
| 5,392,344 A | 2/1995 | Ash et al. |
| 5,392,402 A | 2/1995 | Robrock |
| 5,394,436 A | 2/1995 | Meier |
| 5,396,542 A | 3/1995 | Alger et al. |
| 5,400,393 A | 3/1995 | Knuth |
| 5,402,478 A | 3/1995 | Hluchyj et al. |
| 5,406,557 A | 4/1995 | Baudoin |
| 5,408,237 A | 4/1995 | Patterson et al. |
| 5,408,382 A | 4/1995 | Schultz |
| 5,410,141 A | 4/1995 | Koenck |
| 5,410,754 A | 4/1995 | Klotzbach et al. |
| 5,416,842 A | 5/1995 | Aziz |
| 5,418,844 A | 5/1995 | Morrisey et al. |
| 5,420,211 A | 5/1995 | Hughes |
| 5,420,916 A | 5/1995 | Sekiguchi |
| 5,422,882 A | 6/1995 | Hiller et al. |
| 5,422,940 A | 6/1995 | Endo et al. |
| 5,422,941 A | 6/1995 | Hasenauer et al. |
| 5,425,028 A | 6/1995 | Britton et al. |
| 5,425,051 A | 6/1995 | Mahany |
| 5,425,085 A | 6/1995 | Weinberger et al. |
| 5,425,090 A | 6/1995 | Orriss |
| 5,425,091 A | 6/1995 | Josephs |
| 5,426,636 A | 6/1995 | Hiller et al. |
| 5,428,608 A | 6/1995 | Freeman et al. |
| 5,428,636 A | 6/1995 | Meier |
| 5,430,719 A | 7/1995 | Weisser, Jr. |
| 5,430,727 A | 7/1995 | Callon |
| 5,434,852 A | 7/1995 | La Porta et al. |
| 5,434,913 A | 7/1995 | Tung et al. |
| 5,436,957 A | 7/1995 | McConnell |
| 5,436,963 A | 7/1995 | Fitzpatrick et al. |
| 5,440,563 A | 8/1995 | Isidoro et al. |
| 5,440,620 A | 8/1995 | Slusky |
| 5,440,621 A | 8/1995 | Castro |
| 5,442,690 A | 8/1995 | Nazif et al. |
| 5,444,709 A | 8/1995 | Riddle |
| 5,448,633 A | 9/1995 | Jamaleddin et al. |
| 5,450,411 A | 9/1995 | Heil |
| 5,452,289 A | 9/1995 | Sharma et al. |
| 5,452,297 A | 9/1995 | Hiller et al. |
| 5,452,350 A | 9/1995 | Reynolds et al. |
| 5,455,821 A | 10/1995 | Schaeffer et al. |
| 5,457,629 A | 10/1995 | Miller |
| 5,459,775 A | 10/1995 | Isono et al. |
| 5,461,611 A | 10/1995 | Drake et al. |
| 5,463,677 A | 10/1995 | Bash et al. |
| 5,465,207 A | 11/1995 | Boatwright |
| 5,466,170 A | 11/1995 | Pavek |
| 5,468,947 A | 11/1995 | Danielson et al. |
| 5,468,950 A | 11/1995 | Hanson |
| 5,469,496 A | 11/1995 | Emery et al. |
| 5,469,497 A | 11/1995 | Pierce et al. |
| 5,469,500 A | 11/1995 | Satter et al. |
| 5,473,608 A | 12/1995 | Gagne et al. |
| 5,473,677 A | 12/1995 | D'Amato et al. |
| 5,475,732 A | 12/1995 | Pester, III |
| 5,475,737 A | 12/1995 | Garner et al. |
| 5,475,748 A | 12/1995 | Jones |
| 5,475,817 A | 12/1995 | Waldo et al. |
| 5,477,531 A | 12/1995 | McKee et al. |
| 5,479,494 A | 12/1995 | Clitherow |
| 5,481,603 A | 1/1996 | Gutierrez et al. |
| 5,483,527 A | 1/1996 | Doshi et al. |
| 5,483,549 A | 1/1996 | Weinberg et al. |
| 5,483,586 A | 1/1996 | Sussman |
| 5,483,587 A | 1/1996 | Hogan et al. |
| 5,483,676 A | 1/1996 | Mahany |
| 5,487,111 A | 1/1996 | Slusky |
| 5,488,575 A | 1/1996 | Danielson |
| 5,490,247 A | 2/1996 | Tung et al. |
| 5,493,568 A | 2/1996 | Sampat et al. |
| 5,493,573 A | 2/1996 | Kobayashi et al. |
| 5,495,521 A | 2/1996 | Rangachar |
| 5,500,859 A | 3/1996 | Sharma et al. |
| 5,500,889 A | 3/1996 | Baker et al. |
| 5,504,746 A | 4/1996 | Meier |
| 5,506,887 A | 4/1996 | Emery et al. |
| 5,506,893 A | 4/1996 | Buscher et al. |
| 5,511,111 A | 4/1996 | Serbetcioglu et al. |
| 5,513,127 A | 4/1996 | Gard et al. |
| 5,515,303 A | 5/1996 | Cargin, Jr. |
| 5,517,434 A | 5/1996 | Hanson |
| 5,517,560 A | 5/1996 | Greenspan |
| 5,520,796 A | 5/1996 | Chen |
| 5,521,370 A | 5/1996 | Hanson |
| 5,521,719 A | 5/1996 | Yamada |
| 5,521,924 A | 5/1996 | Kakuma et al. |
| 5,524,137 A | 6/1996 | Rhee |
| 5,524,145 A | 6/1996 | Parker |
| 5,526,353 A | 6/1996 | Henley et al. |
| 5,526,416 A | 6/1996 | Dezonno et al. |
| 5,526,489 A | 6/1996 | Nilakantan et al. |
| 5,528,539 A | 6/1996 | Ong |
| 5,530,744 A | 6/1996 | Charalambous et al. |
| 5,530,852 A | 6/1996 | Meske et al. |
| 5,537,470 A | 7/1996 | Lee |
| 5,539,193 A | 7/1996 | Gibbs |
| 5,539,194 A | 7/1996 | Miller |
| 5,539,884 A | 7/1996 | Robrock |
| 5,539,886 A | 7/1996 | Aldred et al. |
| 5,541,398 A | 7/1996 | Hanson |
| 5,541,917 A | 7/1996 | Farris |
| 5,541,927 A | 7/1996 | Kristol et al. |
| 5,541,930 A | 7/1996 | Klingman |
| 5,544,010 A | 8/1996 | Schultz |
| 5,551,025 A | 8/1996 | O'Reilly et al. |
| 5,551,035 A | 8/1996 | Arnold et al. |
| 5,555,276 A | 9/1996 | Koenck |
| 5,559,068 A | 9/1996 | Chen |
| 5,559,721 A | 9/1996 | Ishii |
| 5,559,871 A | 9/1996 | Smith |
| 5,561,670 A | 10/1996 | Hoffert et al. |
| 5,563,882 A | 10/1996 | Bruno et al. |
| 5,568,645 A | 10/1996 | Morris |
| 5,572,583 A | 11/1996 | Wheeler, Jr. et al. |
| 5,576,529 A | 11/1996 | Koenck |
| 5,579,472 A | 11/1996 | Keyworth et al. |
| 5,583,564 A | 12/1996 | Rao |
| 5,583,920 A | 12/1996 | Wheeler, Jr. |
| 5,583,926 A | 12/1996 | Venier et al. |
| 5,583,929 A | 12/1996 | Ardon |
| 5,586,175 A | 12/1996 | Hogan |
| 5,586,177 A | 12/1996 | Farris et al. |
| 5,587,577 A | 12/1996 | Schultz |
| 5,590,127 A | 12/1996 | Bales et al. |
| 5,590,133 A | 12/1996 | Billstrom et al. |
| 5,590,181 A | 12/1996 | Hogan |

(56) References Cited

U.S. PATENT DOCUMENTS

| | | | |
|---|---|---|---|
| 5,590,346 A | 12/1996 | West | |
| 5,594,717 A | 1/1997 | Watanabe et al. | |
| 5,594,769 A | 1/1997 | Pellegrino et al. | |
| 5,594,784 A | 1/1997 | Velius | |
| 5,594,789 A | 1/1997 | Seazholtz et al. | |
| 5,598,464 A | 1/1997 | Hess et al. | |
| 5,598,487 A | 1/1997 | Hacker | |
| 5,602,456 A | 2/1997 | Cargin | |
| 5,602,854 A | 2/1997 | Luse | |
| 5,603,085 A | 2/1997 | Shedlo | |
| 5,604,682 A | 2/1997 | McLaughlin et al. | |
| 5,604,737 A | 2/1997 | Iwami et al. | |
| 5,608,446 A | 3/1997 | Carr et al. | |
| 5,608,447 A | 3/1997 | Farry et al. | |
| 5,608,782 A | 3/1997 | Carlsen et al. | |
| 5,608,786 A | 3/1997 | Gordon | |
| 5,610,910 A | 3/1997 | Focsaneanu et al. | |
| 5,610,972 A | 3/1997 | Emery et al. | |
| 5,610,976 A | 3/1997 | Uota et al. | |
| 5,610,977 A | 3/1997 | Williams et al. | |
| 5,615,251 A | 3/1997 | Hogan et al. | |
| 5,617,343 A | 4/1997 | Danielson | |
| 5,617,422 A | 4/1997 | Litzenberger et al. | |
| 5,617,540 A | 4/1997 | Civanlar et al. | |
| 5,619,555 A | 4/1997 | Fenton et al. | |
| 5,619,557 A | 4/1997 | Van Berkum | |
| 5,619,562 A | 4/1997 | Maurer et al. | |
| 5,621,787 A | 4/1997 | McKoy et al. | |
| 5,623,601 A | 4/1997 | Vu | |
| 5,625,180 A | 4/1997 | Hanson | |
| 5,625,404 A | 4/1997 | Grady et al. | |
| 5,625,407 A | 4/1997 | Biggs et al. | |
| 5,625,555 A | 4/1997 | Davis | |
| 5,625,675 A | 4/1997 | Katsumaru et al. | |
| 5,625,677 A | 4/1997 | Feiertag et al. | |
| 5,625,681 A | 4/1997 | Butler, II | |
| 5,625,682 A | 4/1997 | Gray et al. | |
| 5,626,682 A | 5/1997 | Kobari et al. | |
| 5,627,886 A | 5/1997 | Bowman | |
| 5,633,916 A | 5/1997 | Goldhagen et al. | |
| 5,633,919 A | 5/1997 | Hogan | |
| 5,636,216 A | 6/1997 | Fox et al. | |
| 5,638,430 A | 6/1997 | Hogan | |
| 5,640,001 A | 6/1997 | Danielson | |
| 5,644,471 A | 7/1997 | Schultz | |
| 5,646,982 A | 7/1997 | Hogan et al. | |
| 5,651,006 A | 7/1997 | Fujino et al. | |
| 5,652,787 A | 7/1997 | O'Kelly | |
| 5,654,957 A | 8/1997 | Koyama | |
| 5,657,250 A | 8/1997 | Park et al. | |
| 5,657,317 A | 8/1997 | Mahany | |
| 5,661,197 A | 8/1997 | Villiger et al. | |
| 5,661,782 A | 8/1997 | Bartholomew et al. | |
| 5,661,790 A | 8/1997 | Hsu | |
| 5,661,792 A | 8/1997 | Akinpelu et al. | |
| 5,663,208 A | 9/1997 | Martin | |
| 5,664,005 A | 9/1997 | Emery et al. | |
| 5,664,102 A | 9/1997 | Faynberg | |
| 5,668,857 A | 9/1997 | McHale | |
| 5,669,062 A | 9/1997 | Olds et al. | |
| 5,671,436 A | 9/1997 | Morrison | |
| 5,672,860 A | 9/1997 | Miller | |
| 5,673,031 A | 9/1997 | Meier | |
| 5,673,080 A * | 9/1997 | Biggs et al. | 348/14.09 |
| 5,673,263 A | 9/1997 | Basso et al. | |
| 5,675,507 A | 10/1997 | Bobo | |
| 5,675,741 A | 10/1997 | Aggarwal et al. | |
| 5,679,943 A | 10/1997 | Schultz et al. | |
| 5,680,392 A | 10/1997 | Semaan | |
| 5,680,442 A | 10/1997 | Bartholomew et al. | |
| 5,680,446 A | 10/1997 | Fleischer et al. | |
| 5,680,633 A | 10/1997 | Koenck | |
| 5,682,379 A | 10/1997 | Mahany | |
| 5,687,167 A | 11/1997 | Bertin et al. | |
| 5,689,550 A | 11/1997 | Garson et al. | |
| 5,689,553 A | 11/1997 | Ahuja et al. | |
| 5,692,039 A | 11/1997 | Brankley et al. | |
| 5,694,318 A | 12/1997 | Miller | |
| 5,694,463 A | 12/1997 | Christie et al. | |
| 5,696,903 A | 12/1997 | Mahany | |
| 5,699,089 A | 12/1997 | Murray | |
| 5,699,352 A | 12/1997 | Kriete et al. | |
| 5,699,528 A | 12/1997 | Hogan | |
| 5,701,295 A | 12/1997 | Bales et al. | |
| 5,701,465 A | 12/1997 | Baugher et al. | |
| 5,703,935 A | 12/1997 | Raissyan et al. | |
| 5,703,942 A | 12/1997 | Pinard et al. | |
| 5,706,286 A | 1/1998 | Reiman et al. | |
| 5,708,680 A | 1/1998 | Gollnick | |
| 5,708,833 A | 1/1998 | Kinney | |
| 5,710,728 A | 1/1998 | Danielson | |
| 5,710,884 A | 1/1998 | Dedrick | |
| 5,712,903 A | 1/1998 | Bartholomew et al. | |
| 5,712,906 A | 1/1998 | Grady et al. | |
| 5,712,907 A | 1/1998 | Wegner et al. | |
| 5,712,908 A | 1/1998 | Brinkman et al. | |
| 5,719,854 A | 2/1998 | Choudhury et al. | |
| 5,722,067 A | 2/1998 | Fougnies | |
| 5,724,355 A | 3/1998 | Bruno et al. | |
| 5,724,406 A | 3/1998 | Juster | |
| 5,724,412 A | 3/1998 | Srinivasan | |
| 5,726,984 A | 3/1998 | Kubler et al. | |
| 5,727,002 A | 3/1998 | Miller et al. | |
| 5,727,129 A | 3/1998 | Barrett et al. | |
| 5,729,544 A | 3/1998 | Lev et al. | |
| 5,729,599 A | 3/1998 | Plomondon et al. | |
| 5,732,078 A | 3/1998 | Arango | |
| 5,732,213 A | 3/1998 | Gessel et al. | |
| 5,737,333 A | 4/1998 | Civanlar et al. | |
| 5,737,395 A | 4/1998 | Irribarren | |
| 5,737,404 A | 4/1998 | Segal | |
| 5,737,414 A | 4/1998 | Walker et al. | |
| 5,740,075 A | 4/1998 | Bigham et al. | |
| 5,740,164 A | 4/1998 | Liron | |
| 5,740,366 A | 4/1998 | Mahany | |
| 5,742,596 A | 4/1998 | Baratz et al. | |
| 5,742,668 A | 4/1998 | Pepe et al. | |
| 5,742,670 A | 4/1998 | Bennett | |
| 5,742,675 A | 4/1998 | Kilander et al. | |
| 5,742,905 A | 4/1998 | Pepe et al. | |
| 5,744,533 A | 4/1998 | Iwamoto et al. | |
| 5,747,785 A | 5/1998 | Miller | |
| 5,747,786 A | 5/1998 | Cargin, Jr. | |
| 5,748,104 A | 5/1998 | Argyroudis et al. | |
| 5,748,468 A | 5/1998 | Notenboom et al. | |
| 5,748,619 A | 5/1998 | Meier | |
| 5,751,706 A | 5/1998 | Land et al. | |
| 5,751,707 A | 5/1998 | Voit et al. | |
| 5,751,961 A | 5/1998 | Smyk | |
| 5,754,639 A | 5/1998 | Flockhart et al. | |
| 5,754,641 A | 5/1998 | Voit et al. | |
| 5,757,784 A | 5/1998 | Liebowitz et al. | |
| 5,758,281 A | 5/1998 | Emery et al. | |
| 5,761,294 A | 6/1998 | Shaffer et al. | |
| 5,763,867 A | 6/1998 | Main | |
| 5,764,741 A | 6/1998 | Barak | |
| 5,768,513 A | 6/1998 | Kuthyar et al. | |
| 5,774,530 A | 6/1998 | Montgomery et al. | |
| 5,774,533 A | 6/1998 | Patel | |
| 5,774,535 A | 6/1998 | Castro | |
| 5,774,660 A | 6/1998 | Brendel et al. | |
| 5,774,695 A | 6/1998 | Autrey et al. | |
| 5,778,313 A | 7/1998 | Fougnies | |
| 5,781,550 A | 7/1998 | Templin et al. | |
| 5,781,620 A | 7/1998 | Montgomery et al. | |
| 5,781,624 A | 7/1998 | Mitra et al. | |
| 5,784,617 A | 7/1998 | Greenstein et al. | |
| 5,787,160 A | 7/1998 | Chaney et al. | |
| 5,790,172 A | 8/1998 | Imanaka | |
| 5,790,536 A | 8/1998 | Mahany et al. | |
| 5,790,548 A | 8/1998 | Sistani zadeh et al. | |
| 5,790,806 A * | 8/1998 | Koperda | 709/252 |
| 5,793,762 A | 8/1998 | Penners et al. | |
| 5,793,763 A | 8/1998 | Mayes et al. | |

(56) References Cited

U.S. PATENT DOCUMENTS

| | | |
|---|---|---|
| 5,793,771 A | 8/1998 | Darland et al. |
| 5,796,790 A | 8/1998 | Brunner |
| 5,799,072 A | 8/1998 | Vulcan et al. |
| 5,799,156 A | 8/1998 | Hogan |
| 5,802,502 A | 9/1998 | Gell et al. |
| 5,802,510 A | 9/1998 | Jones |
| 5,802,513 A | 9/1998 | Bowie, III |
| 5,804,805 A | 9/1998 | Koenck |
| 5,805,474 A | 9/1998 | Danielson |
| 5,805,587 A | 9/1998 | Norris |
| 5,805,682 A | 9/1998 | Voit et al. |
| 5,805,807 A | 9/1998 | Hanson |
| 5,809,128 A | 9/1998 | McMullin |
| 5,809,279 A | 9/1998 | Oeda et al. |
| 5,812,534 A | 9/1998 | Davis et al. |
| 5,812,639 A | 9/1998 | Bartholomew et al. |
| 5,812,652 A | 9/1998 | Jodoin et al. |
| 5,812,795 A | 9/1998 | Horovitz et al. |
| 5,812,834 A | 9/1998 | Suzuki |
| 5,812,865 A | 9/1998 | Theimer et al. |
| 5,818,836 A | 10/1998 | DuVal |
| 5,818,921 A | 10/1998 | Vander Meiden et al. |
| 5,825,780 A | 10/1998 | Christie |
| 5,825,862 A | 10/1998 | Voit et al. |
| 5,825,863 A | 10/1998 | Walker |
| 5,825,869 A | 10/1998 | Brooks et al. |
| 5,826,268 A | 10/1998 | Schaefer et al. |
| 5,828,737 A | 10/1998 | Sawyer |
| 5,828,740 A | 10/1998 | Khuc et al. |
| 5,828,844 A | 10/1998 | Civanlar et al. |
| 5,832,197 A | 11/1998 | Houji |
| 5,834,753 A | 11/1998 | Danielson |
| 5,835,723 A | 11/1998 | Andrews et al. |
| 5,838,665 A | 11/1998 | Kahn et al. |
| 5,838,682 A | 11/1998 | Dekelbaum et al. |
| 5,838,686 A | 11/1998 | Ozkan |
| 5,838,970 A | 11/1998 | Thomas |
| 5,841,764 A | 11/1998 | Roderique et al. |
| 5,844,893 A | 12/1998 | Gollnick et al. |
| 5,844,896 A | 12/1998 | Marks et al. |
| 5,845,267 A | 12/1998 | Ronen |
| 5,848,143 A | 12/1998 | Andrews et al. |
| 5,850,358 A | 12/1998 | Danielson |
| 5,850,433 A | 12/1998 | Rondeau |
| 5,854,833 A | 12/1998 | Hogan |
| 5,854,975 A | 12/1998 | Fougnies |
| 5,856,364 A | 1/1999 | Martin |
| 5,862,171 A | 1/1999 | Mahany |
| 5,864,604 A | 1/1999 | Moen et al. |
| 5,864,610 A | 1/1999 | Ronen |
| 5,867,495 A * | 2/1999 | Elliott et al. ............... 370/352 |
| 5,867,562 A | 2/1999 | Scherer |
| 5,867,566 A | 2/1999 | Hogan |
| 5,870,565 A | 2/1999 | Glitho |
| 5,873,099 A | 2/1999 | Hogan |
| 5,878,126 A | 3/1999 | Velamuri et al. |
| 5,878,130 A | 3/1999 | Andrews et al. |
| 5,878,212 A | 3/1999 | Civanlar et al. |
| 5,881,134 A | 3/1999 | Foster et al. |
| 5,883,891 A | 3/1999 | Williams et al. |
| 5,884,032 A | 3/1999 | Bateman et al. |
| 5,888,087 A | 3/1999 | Hanson |
| 5,889,774 A | 3/1999 | Mirashrafi et al. |
| 5,892,754 A | 4/1999 | Kompella et al. |
| 5,892,822 A | 4/1999 | Gottlieb et al. |
| 5,892,971 A | 4/1999 | Danielson |
| 5,894,595 A | 4/1999 | Foladare et al. |
| 5,895,431 A | 4/1999 | Miller |
| 5,895,906 A | 4/1999 | Danielson |
| 5,898,668 A | 4/1999 | Shaffer |
| 5,898,673 A | 4/1999 | Riggan et al. |
| 5,901,140 A | 5/1999 | Van As et al. |
| 5,903,558 A | 5/1999 | Jones et al. |
| 5,905,736 A | 5/1999 | Ronen et al. |
| 5,907,547 A | 5/1999 | Foladare et al. |
| 5,907,678 A | 5/1999 | Housel et al. |
| 5,910,946 A | 6/1999 | Csapo |
| 5,912,887 A | 6/1999 | Sehgal |
| 5,914,481 A | 6/1999 | Danielson |
| 5,915,001 A | 6/1999 | Uppaluru |
| 5,915,005 A | 6/1999 | He |
| 5,915,008 A | 6/1999 | Dulman |
| 5,915,012 A | 6/1999 | Miloslavsky |
| 5,917,175 A | 6/1999 | Miller |
| 5,917,424 A | 6/1999 | Goldman et al. |
| 5,918,179 A | 6/1999 | Foladare et al. |
| 5,923,659 A | 7/1999 | Curry et al. |
| 5,926,482 A | 7/1999 | Christie |
| 5,928,292 A | 7/1999 | Miller |
| 5,930,343 A | 7/1999 | Vasquez |
| 5,930,700 A | 7/1999 | Pepper |
| 5,933,425 A | 8/1999 | Iwata |
| 5,936,958 A | 8/1999 | Soumiya et al. |
| 5,937,045 A | 8/1999 | Yaoya et al. |
| 5,940,479 A | 8/1999 | Guy et al. |
| 5,940,598 A | 8/1999 | Strauss et al. |
| 5,940,616 A | 8/1999 | Wang |
| 5,940,771 A | 8/1999 | Gollnick |
| 5,944,795 A | 8/1999 | Civanlar |
| 5,946,299 A | 8/1999 | Blonder |
| 5,946,386 A | 8/1999 | Rogers et al. |
| 5,949,056 A | 9/1999 | White |
| 5,949,776 A | 9/1999 | Mahany |
| 5,949,869 A | 9/1999 | Sink |
| 5,953,322 A | 9/1999 | Kimball |
| 5,953,338 A | 9/1999 | Ma et al. |
| 5,953,504 A | 9/1999 | Sokal et al. |
| 5,953,651 A | 9/1999 | Lu et al. |
| 5,956,391 A | 9/1999 | Melen et al. |
| 5,956,482 A | 9/1999 | Agraharam et al. |
| 5,956,697 A | 9/1999 | Usui |
| 5,958,016 A | 9/1999 | Chang et al. |
| 5,958,052 A | 9/1999 | Bellovin et al. |
| 5,959,998 A | 9/1999 | Takahashi et al. |
| 5,962,837 A | 10/1999 | Main |
| 5,966,431 A | 10/1999 | Reiman et al. |
| 5,966,434 A | 10/1999 | Schafer et al. |
| 5,969,321 A | 10/1999 | Danielson |
| 5,970,065 A | 10/1999 | Miloslavsky |
| 5,970,477 A | 10/1999 | Roden |
| 5,974,043 A | 10/1999 | Solomon |
| 5,974,052 A | 10/1999 | Johnson et al. |
| 5,978,569 A | 11/1999 | Traeger |
| 5,978,840 A | 11/1999 | Nguyen et al. |
| 5,979,768 A | 11/1999 | Koenck |
| 5,982,774 A | 11/1999 | Foladare et al. |
| 5,987,108 A | 11/1999 | Jagadish et al. |
| 5,987,499 A | 11/1999 | Morris |
| 5,991,291 A | 11/1999 | Asai et al. |
| 5,991,292 A | 11/1999 | Focsaneanu et al. |
| 5,991,301 A | 11/1999 | Christie |
| 5,991,308 A | 11/1999 | Fuhrmann et al. |
| 5,991,864 A | 11/1999 | Kinney |
| 5,995,503 A | 11/1999 | Crawley et al. |
| 5,995,606 A | 11/1999 | Civanlar et al. |
| 5,999,524 A | 12/1999 | Corbalis et al. |
| 5,999,525 A | 12/1999 | Krishnaswamy |
| 6,005,926 A | 12/1999 | Mashinsky |
| 6,006,100 A | 12/1999 | Koenck |
| 6,006,253 A | 12/1999 | Kumar et al. |
| 6,011,975 A | 1/2000 | Emery et al. |
| 6,012,088 A | 1/2000 | Li et al. |
| 6,014,379 A | 1/2000 | White et al. |
| 6,014,687 A | 1/2000 | Watanabe et al. |
| 6,016,307 A | 1/2000 | Kaplan et al. |
| 6,016,343 A | 1/2000 | Hogan |
| 6,018,360 A | 1/2000 | Stewart et al. |
| 6,018,567 A | 1/2000 | Dulman |
| 6,021,126 A | 2/2000 | White et al. |
| 6,021,263 A | 2/2000 | Kujoory et al. |
| 6,023,147 A | 2/2000 | Cargin |
| 6,023,474 A | 2/2000 | Gardner et al. |
| 6,026,087 A | 2/2000 | Mirashrafi et al. |
| 6,026,091 A | 2/2000 | Christie |

(56) References Cited

U.S. PATENT DOCUMENTS

| | | | |
|---|---|---|---|
| 6,028,858 A | 2/2000 | Rivers et al. | |
| 6,029,062 A * | 2/2000 | Hanson | 455/408 |
| 6,029,261 A | 2/2000 | Hartmann | |
| 6,031,840 A | 2/2000 | Christie | |
| 6,035,028 A | 3/2000 | Ward et al. | |
| 6,036,093 A | 3/2000 | Schultz | |
| 6,041,109 A | 3/2000 | Cardy et al. | |
| 6,041,117 A | 3/2000 | Androski et al. | |
| 6,044,081 A | 3/2000 | Bell et al. | |
| 6,046,992 A | 4/2000 | Meier | |
| 6,047,051 A | 4/2000 | Ginzboorg et al. | |
| 6,047,326 A | 4/2000 | Kilkki | |
| 6,049,545 A | 4/2000 | Stephenson et al. | |
| 6,049,813 A | 4/2000 | Danielson | |
| 6,052,445 A | 4/2000 | Bashoura et al. | |
| 6,052,450 A | 4/2000 | Allison et al. | |
| 6,058,000 A | 5/2000 | Koenck | |
| 6,064,653 A | 5/2000 | Farris | |
| 6,069,890 A | 5/2000 | White et al. | |
| 6,075,783 A | 6/2000 | Voit | |
| 6,078,582 A | 6/2000 | Curry et al. | |
| 6,078,943 A | 6/2000 | Yu | |
| 6,081,525 A | 6/2000 | Christie | |
| 6,084,867 A | 7/2000 | Meier | |
| 6,084,953 A | 7/2000 | Bardenheuer et al. | |
| 6,088,431 A | 7/2000 | LaDue | |
| 6,097,804 A | 8/2000 | Gilbert et al. | |
| 6,098,094 A | 8/2000 | Barnhouse et al. | |
| 6,101,182 A | 8/2000 | Sistanizadeh et al. | |
| 6,104,645 A | 8/2000 | Ong | |
| 6,104,704 A | 8/2000 | Buhler et al. | |
| 6,104,711 A | 8/2000 | Voit | |
| 6,108,341 A | 8/2000 | Christie | |
| 6,108,704 A | 8/2000 | Hutton | |
| 6,112,206 A | 8/2000 | Morris | |
| 6,115,458 A | 9/2000 | Taskett | |
| 6,115,737 A | 9/2000 | Ely et al. | |
| 6,118,936 A | 9/2000 | Lauer et al. | |
| 6,122,255 A | 9/2000 | Bartholomew et al. | |
| 6,125,113 A | 9/2000 | Farris et al. | |
| 6,125,126 A | 9/2000 | Hallenstal | |
| 6,128,304 A | 10/2000 | Gardell | |
| 6,131,121 A | 10/2000 | Mattaway | |
| 6,134,235 A | 10/2000 | Goldman et al. | |
| 6,134,433 A | 10/2000 | Joong et al. | |
| 6,134,530 A | 10/2000 | Bunting et al. | |
| 6,137,792 A | 10/2000 | Jonas et al. | |
| 6,137,869 A * | 10/2000 | Voit et al. | 379/114.01 |
| 6,141,404 A | 10/2000 | Westerlage et al. | |
| 6,141,412 A | 10/2000 | Smith et al. | |
| 6,144,647 A | 11/2000 | Lopez-Torres | |
| 6,144,661 A | 11/2000 | Katsube et al. | |
| 6,144,667 A | 11/2000 | Doshi et al. | |
| 6,144,976 A | 11/2000 | Silva | |
| 6,149,062 A | 11/2000 | Danielson | |
| 6,154,445 A | 11/2000 | Farris et al. | |
| 6,154,777 A | 11/2000 | Ebrahim | |
| 6,157,621 A | 12/2000 | Brown et al. | |
| 6,157,636 A | 12/2000 | Voit et al. | |
| 6,157,648 A | 12/2000 | Voit et al. | |
| 6,157,823 A | 12/2000 | Fougnies | |
| 6,163,536 A | 12/2000 | Dunn et al. | |
| 6,169,735 B1 | 1/2001 | Allen et al. | |
| 6,175,618 B1 | 1/2001 | Shah et al. | |
| 6,181,690 B1 | 1/2001 | Civanlar | |
| 6,181,695 B1 | 1/2001 | Curry et al. | |
| 6,181,703 B1 | 1/2001 | Christie | |
| 6,185,184 B1 | 2/2001 | Mattaway | |
| 6,185,198 B1 | 2/2001 | LaDue | |
| 6,188,677 B1 | 2/2001 | Oyama et al. | |
| 6,192,050 B1 | 2/2001 | Stovall | |
| 6,192,400 B1 | 2/2001 | Hanson | |
| 6,195,425 B1 | 2/2001 | Farris et al. | |
| 6,198,738 B1 | 3/2001 | Chang et al. | |
| 6,201,812 B1 | 3/2001 | Christie | |
| 6,205,139 B1 | 3/2001 | Voit | |
| 6,212,162 B1 | 4/2001 | Horlin | |
| 6,212,193 B1 | 4/2001 | Christie | |
| 6,215,790 B1 | 4/2001 | Voit et al. | |
| 6,222,919 B1 | 4/2001 | Hollatz et al. | |
| 6,226,273 B1 | 5/2001 | Busuioc et al. | |
| 6,226,287 B1 | 5/2001 | Brady | |
| 6,226,678 B1 | 5/2001 | Mattaway | |
| 6,230,203 B1 | 5/2001 | Koperda et al. | |
| 6,233,318 B1 | 5/2001 | Picard et al. | |
| 6,233,604 B1 | 5/2001 | Van Horne et al. | |
| 6,236,851 B1 | 5/2001 | Fougnies | |
| 6,240,091 B1 | 5/2001 | Ginzboorg et al. | |
| 6,243,373 B1 * | 6/2001 | Turock | 370/352 |
| 6,243,374 B1 | 6/2001 | White | |
| 6,252,869 B1 | 6/2001 | Silverman | |
| 6,260,067 B1 | 7/2001 | Barnhouse et al. | |
| 6,263,372 B1 | 7/2001 | Hogan | |
| 6,266,685 B1 | 7/2001 | Danielson | |
| 6,278,693 B1 | 8/2001 | Aldred et al. | |
| 6,278,704 B1 | 8/2001 | Creamer et al. | |
| 6,279,038 B1 | 8/2001 | Hogan | |
| 6,282,192 B1 | 8/2001 | Murphy et al. | |
| 6,282,281 B1 | 8/2001 | Low | |
| 6,282,284 B1 | 8/2001 | Dezonno et al. | |
| 6,282,574 B1 | 8/2001 | Voit et al. | |
| 6,285,745 B1 | 9/2001 | Bartholomew et al. | |
| 6,289,010 B1 | 9/2001 | Voit et al. | |
| 6,292,478 B1 | 9/2001 | Farris | |
| 6,292,479 B1 | 9/2001 | Bartholomew et al. | |
| 6,292,481 B1 | 9/2001 | Voit et al. | |
| 6,295,292 B1 | 9/2001 | Voit et al. | |
| 6,298,057 B1 | 10/2001 | Guy | |
| 6,298,062 B1 | 10/2001 | Gardell et al. | |
| 6,298,064 B1 | 10/2001 | Christie | |
| 6,298,120 B1 | 10/2001 | Civanlar et al. | |
| 6,301,609 B1 | 10/2001 | Aravamudan et al. | |
| 6,304,566 B1 | 10/2001 | Schessel | |
| 6,304,567 B1 | 10/2001 | Rosenburg | |
| 6,310,873 B1 | 10/2001 | Rainis et al. | |
| 6,310,941 B1 | 10/2001 | Crutcher et al. | |
| 6,314,103 B1 | 11/2001 | Medhat et al. | |
| 6,324,264 B1 | 11/2001 | Wiener et al. | |
| 6,327,258 B1 | 12/2001 | Deschaine et al. | |
| 6,330,250 B1 | 12/2001 | Curry et al. | |
| 6,332,023 B1 | 12/2001 | Porter et al. | |
| 6,335,927 B1 | 1/2002 | Elliott | |
| 6,343,115 B1 | 1/2002 | Foladare et al. | |
| 6,347,085 B2 | 2/2002 | Kelly | |
| 6,359,880 B1 | 3/2002 | Curry | |
| 6,363,065 B1 | 3/2002 | Thornton et al. | |
| 6,363,349 B1 | 3/2002 | Urs et al. | |
| 6,373,929 B1 | 4/2002 | Johnson et al. | |
| 6,374,302 B1 | 4/2002 | Galasso et al. | |
| 6,375,344 B1 | 4/2002 | Hanson | |
| 6,381,321 B1 | 4/2002 | Brown et al. | |
| 6,385,191 B1 | 5/2002 | Coffman et al. | |
| 6,385,193 B1 | 5/2002 | Civanlar et al. | |
| 6,400,702 B1 | 6/2002 | Meier | |
| 6,407,991 B1 | 6/2002 | Meier | |
| 6,430,195 B1 | 8/2002 | Christie | |
| 6,430,275 B1 | 8/2002 | Voit et al. | |
| 6,438,218 B1 | 8/2002 | Farris | |
| 6,449,259 B1 | 9/2002 | Allain et al. | |
| 6,449,356 B1 | 9/2002 | Dezonno | |
| 6,456,617 B1 | 9/2002 | Oda et al. | |
| 6,480,588 B1 | 11/2002 | Donovan | |
| 6,493,353 B2 | 12/2002 | Kelly et al. | |
| 6,498,788 B1 | 12/2002 | Emilsson et al. | |
| 6,501,753 B1 | 12/2002 | Lin et al. | |
| 6,513,066 B1 | 1/2003 | Hutton | |
| 6,515,968 B1 | 2/2003 | Combar et al. | |
| 6,529,516 B1 | 3/2003 | Parzych | |
| 6,539,015 B2 | 3/2003 | Voit et al. | |
| 6,539,077 B1 | 3/2003 | Ranalli et al. | |
| 6,542,497 B1 | 4/2003 | Curry | |
| 6,546,003 B1 | 4/2003 | Farris | |
| 6,546,005 B1 | 4/2003 | Berkley et al. | |
| 6,553,108 B1 * | 4/2003 | Felger | 379/144.01 |

(56) References Cited

U.S. PATENT DOCUMENTS

| | | |
|---|---|---|
| 6,570,871 B1 | 5/2003 | Schneider |
| 6,574,216 B1 | 6/2003 | Farris et al. |
| 6,574,681 B1 | 6/2003 | White |
| 6,584,093 B1 | 6/2003 | Salama et al. |
| 6,594,254 B1 | 7/2003 | Kelly |
| 6,600,733 B2 | 7/2003 | Deng |
| 6,600,735 B1 | 7/2003 | Iwama et al. |
| 6,614,768 B1 | 9/2003 | Mahany |
| 6,614,781 B1 | 9/2003 | Elliott |
| 6,621,942 B1 | 9/2003 | Hacker et al. |
| 6,625,170 B1 | 9/2003 | Curry et al. |
| 6,633,846 B1 | 10/2003 | Bennett et al. |
| 6,643,362 B2 | 11/2003 | Hogan |
| 6,654,357 B1 | 11/2003 | Wiedeman |
| 6,671,285 B1 | 12/2003 | Kirkby et al. |
| 6,678,718 B1 | 1/2004 | Khouri et al. |
| 6,681,994 B1 | 1/2004 | Koenck |
| 6,687,738 B1 | 2/2004 | Hutton |
| 6,688,523 B1 | 2/2004 | Koenck |
| 6,690,788 B1 | 2/2004 | Bauer et al. |
| 6,694,359 B1 | 2/2004 | Morris |
| 6,701,365 B1 | 3/2004 | Hutton |
| 6,704,287 B1 | 3/2004 | Moharram |
| 6,711,241 B1 | 3/2004 | White et al. |
| 6,714,559 B1 | 3/2004 | Meier |
| 6,714,983 B1 | 3/2004 | Koenck |
| 6,731,625 B1 * | 5/2004 | Eastep et al. ............ 370/352 |
| 6,735,191 B1 | 5/2004 | Hosein |
| 6,754,181 B1 | 6/2004 | Elliott et al. |
| 6,760,429 B1 | 7/2004 | Hung et al. |
| 6,775,519 B1 | 8/2004 | Wiedeman et al. |
| 6,778,651 B1 * | 8/2004 | Jost et al. ............... 379/201.01 |
| 6,792,256 B1 | 9/2004 | Kinney |
| 6,798,786 B1 | 9/2004 | Lo et al. |
| 6,810,033 B2 | 10/2004 | Derks |
| 6,823,384 B1 | 11/2004 | Wilson et al. |
| 6,826,165 B1 | 11/2004 | Meier |
| 6,829,645 B1 | 12/2004 | Hutton |
| 6,839,340 B1 * | 1/2005 | Voit et al. ............... 370/352 |
| 6,870,827 B1 | 3/2005 | Voit et al. |
| 6,885,678 B2 | 4/2005 | Curry et al. |
| 6,895,419 B1 | 5/2005 | Cargin |
| 6,910,632 B2 | 6/2005 | Koerck |
| 6,925,054 B1 | 8/2005 | Atterton et al. |
| 6,990,090 B2 | 1/2006 | Meier |
| 7,012,898 B1 | 3/2006 | Farris et al. |
| 7,013,001 B1 | 3/2006 | Felger et al. |
| 7,079,534 B1 | 7/2006 | Medhat |
| 7,085,362 B1 | 8/2006 | Christie |
| 7,088,705 B2 | 8/2006 | Curry |
| 7,092,379 B1 | 8/2006 | Singh et al. |
| 7,120,319 B2 | 10/2006 | Danielson |
| 7,145,898 B1 | 12/2006 | Elliott |
| 7,149,208 B2 | 12/2006 | Mattaway |
| 7,170,887 B2 | 1/2007 | Rosenberg |
| 7,206,592 B1 | 4/2007 | Gollnick |
| 7,236,575 B2 | 6/2007 | Kim et al. |
| 7,260,060 B1 | 8/2007 | Abaye et al. |
| 7,269,247 B2 * | 9/2007 | Mashinsky ............ 379/88.14 |
| 7,274,662 B1 | 9/2007 | Kalmanek, Jr. et al. |
| 7,286,562 B1 | 10/2007 | Vargo et al. |
| 7,295,830 B2 | 11/2007 | Lippelt |
| 7,359,972 B2 | 4/2008 | Jorgensen |
| 7,492,886 B1 | 2/2009 | Kalmanek et al. |
| 7,502,339 B1 | 3/2009 | Pirkola et al. |
| 7,646,743 B2 | 1/2010 | Kubler et al. |
| 7,693,062 B2 | 4/2010 | Perkins et al. |
| 7,797,236 B1 * | 9/2010 | Liu et al. .............. 705/40 |
| 7,948,968 B2 | 5/2011 | Voit et al. |
| 2002/0006137 A1 | 1/2002 | Rabenko et al. |
| 2002/0064149 A1 | 5/2002 | Elliott |
| 2002/0067739 A1 | 6/2002 | Wilkes et al. |
| 2002/0083166 A1 | 6/2002 | Dugan et al. |
| 2002/0114324 A1 | 8/2002 | Low et al. |
| 2002/0133412 A1 * | 9/2002 | Oliver et al. ............. 705/26 |
| 2002/0159461 A1 | 10/2002 | Hamamoto et al. |
| 2003/0078006 A1 | 4/2003 | Mahany |
| 2003/0112767 A1 | 6/2003 | Meier |
| 2003/0169767 A1 | 9/2003 | Christie |
| 2003/0189941 A1 | 10/2003 | Christie |
| 2003/0193933 A1 | 10/2003 | Jones |
| 2003/0198218 A1 | 10/2003 | Farris et al. |
| 2003/0198335 A1 | 10/2003 | Porter et al. |
| 2004/0005046 A1 | 1/2004 | Deo et al. |
| 2004/0013253 A1 | 1/2004 | Hogan et al. |
| 2004/0018851 A1 | 1/2004 | Koenck |
| 2004/0022379 A1 * | 2/2004 | Klos et al. ............... 379/201.01 |
| 2004/0023651 A1 | 2/2004 | Gollnick |
| 2004/0038717 A1 | 2/2004 | Mahany |
| 2004/0039846 A1 | 2/2004 | Goss |
| 2004/0044667 A1 | 3/2004 | Mahany |
| 2004/0073933 A1 | 4/2004 | Gollnick |
| 2004/0090952 A1 | 5/2004 | Kubler |
| 2004/0093363 A1 | 5/2004 | Cargin |
| 2004/0114567 A1 | 6/2004 | Kubler |
| 2004/0125753 A1 | 7/2004 | Mahany |
| 2004/0131018 A1 | 7/2004 | Johnson et al. |
| 2004/0145775 A1 | 7/2004 | Kubler |
| 2004/0146020 A1 | 7/2004 | Kubler |
| 2004/0146037 A1 | 7/2004 | Kubler |
| 2004/0151150 A1 | 8/2004 | Kubler |
| 2004/0151151 A1 | 8/2004 | Kubler |
| 2004/0151164 A1 | 8/2004 | Kubler |
| 2004/0160912 A1 | 8/2004 | Kubler |
| 2004/0160913 A1 | 8/2004 | Kubler |
| 2004/0162889 A1 | 8/2004 | Morris |
| 2004/0165573 A1 | 8/2004 | Kubler |
| 2004/0165793 A1 | 8/2004 | Hacker |
| 2004/0166895 A1 | 8/2004 | Koenck |
| 2004/0169583 A1 | 9/2004 | Meier |
| 2004/0174841 A1 | 9/2004 | Kubler |
| 2004/0174842 A1 | 9/2004 | Kubler |
| 2004/0174843 A1 | 9/2004 | Kubler |
| 2004/0203834 A1 | 10/2004 | Mahany |
| 2004/0246940 A1 | 12/2004 | Kubler |
| 2004/0264442 A1 | 12/2004 | Kubler |
| 2005/0008002 A1 | 1/2005 | Kubler |
| 2005/0013266 A1 | 1/2005 | Kubler |
| 2005/0021713 A1 | 1/2005 | Dugan et al. |
| 2005/0036467 A1 | 2/2005 | Kubler |
| 2005/0078647 A1 | 4/2005 | Meier |
| 2005/0083872 A1 | 4/2005 | Kubler |
| 2005/0087603 A1 | 4/2005 | Mahany |
| 2005/0191989 A1 | 9/2005 | Plush et al. |
| 2005/0195859 A1 | 9/2005 | Mahany |
| 2005/0232213 A1 | 10/2005 | Meier |
| 2005/0242192 A1 | 11/2005 | Koenck |
| 2005/0254475 A1 | 11/2005 | Kubler |
| 2006/0007951 A1 | 1/2006 | Meier |
| 2006/0062240 A1 | 3/2006 | Meier |
| 2006/0131420 A1 | 6/2006 | Koenck |
| 2006/0233161 A1 | 10/2006 | Koenck |
| 2006/0251226 A1 | 11/2006 | Hogan |
| 2006/0268806 A1 | 11/2006 | Meier |
| 2006/0268807 A1 | 11/2006 | Meier |
| 2006/0274732 A1 | 12/2006 | Allen et al. |
| 2006/0274735 A1 | 12/2006 | Allen et al. |
| 2006/0291752 A1 | 12/2006 | Hacker |
| 2007/0001007 A1 | 1/2007 | Koenck |
| 2007/0007353 A1 | 1/2007 | Danielson |
| 2007/0065046 A1 | 3/2007 | Hacker |
| 2007/0076687 A1 | 4/2007 | Low et al. |
| 2007/0086445 A1 | 4/2007 | Mattaway |
| 2007/0121529 A1 | 5/2007 | Meier |
| 2007/0121591 A1 | 5/2007 | Donovan |
| 2007/0201515 A1 | 8/2007 | Lewis |
| 2007/0206576 A1 | 9/2007 | Radulovic |
| 2007/0263644 A1 | 11/2007 | Christie et al. |
| 2008/0013531 A1 | 1/2008 | Elliott et al. |
| 2008/0063161 A1 | 3/2008 | Joyce et al. |
| 2008/0232509 A1 | 9/2008 | Jonsson et al. |
| 2009/0022147 A1 | 1/2009 | Farris et al. |
| 2011/0004808 A1 | 1/2011 | Anandakumer et al. |

(56) References Cited

U.S. PATENT DOCUMENTS

FOREIGN PATENT DOCUMENTS

| | | |
|---|---|---|
| EP | 0335562 | 10/1989 |
| EP | 0365885 | 5/1990 |
| EP | 0381365 | 8/1990 |
| EP | 0559979 | 9/1993 |
| EP | 0729281 | 2/1995 |
| EP | 0767568 | 10/1995 |
| EP | 0802690 | 4/1996 |
| EP | 0722237 | 7/1996 |
| EP | 0781016 | 6/1997 |
| EP | 0812089 | 12/1997 |
| EP | 0823809 | 2/1998 |
| JP | 09-168051 | 6/1997 |
| JP | 09-168063 | 6/1997 |
| JP | 09-168064 | 6/1997 |
| JP | 09-168065 | 6/1997 |
| JP | 09-172459 | 6/1997 |
| JP | 09-172462 | 6/1997 |
| WO | 91/07839 | 5/1991 |
| WO | 94/11813 | 5/1994 |
| WO | 95/22221 | 8/1995 |
| WO | 95/29564 | 11/1995 |
| WO | 96/20448 | 7/1996 |
| WO | 96/20553 | 7/1996 |
| WO | 96/32800 | 10/1996 |
| WO | 96/34341 | 10/1996 |
| WO | 96/38018 | 11/1996 |
| WO | 97/14238 | 4/1997 |
| WO | 97/20424 | 6/1997 |
| WO | 97/22211 | 6/1997 |
| WO | 97/23078 | 6/1997 |
| WO | 97/28628 | 8/1997 |
| WO | 97/33412 | 9/1997 |
| WO | 98/12860 | 3/1998 |
| WO | 98/23080 | 5/1998 |
| WO | 98/34391 | 8/1998 |

OTHER PUBLICATIONS

American National Standard for Telecommunications—Signalling System No. 7 (SS7)—Signalling Connection Control Part (SCCP), American National Standards Institue, Inc., ANSITI.112-1992, Oct. 26, 1992.
American National Standard for Telecommunications—Signalling System No. 7 (SS7)—Message Transfer Part (MTP), American National Standards Institue, Inc., Mar. 14, 1996.
American National Standard for Telecommunications—Signalling System No. 7 (SS7)—Signalling Connection Control Part (SCCP), American National Standards Institue, Inc., ANSITI.110-1992, Jun. 2, 1992.
Gasman, Lawrence, "Broadband networking," Van Nostrand Reinhold, Jun. 13, 1994.
Balkovich, Ed, et al., "Project clarity: First internal trial," Readiness Review, Bell Atlantic Confidential and proprietary, Jul. 21, 1997.
Grigonis, Richard "Zippy," "Computer telephony over the Internet," CT and the 'Net, Mar. 1996.
Park, Myung Ah, et al., "Dial-up internet access service system with automatic billing mechanism," ICICS 1997, Electronics .and. Telecommunications Research Institute, pp. 148-151, Singapore, Sep. 9-12, 1997.
El-Gendy, Hazem, et al., "Computer-supported routing for intelligent networks and personalized wired communications," ICCS 1994, pp. 1027-1033, Aug. 1994.
"Audio and video over the Internet," CT and the 'Net, Mar. 1996.
Malamud, Carl, et al., "Internet talk radio: Geek of the week," Mobile IP Networking, O'Reilly .and. Associates, Inc., transcript of interview, Nov. 1993.
McConnell, Brian, "How to build an Internet PBX," Pacific Telephony Design, http://www.phonezone.com/ip-phone.htm, pp. 1-9, Oct. 28, 1996.

Sears, Andrew, "Innovations in Internet Telephony: The Internet as the Competitor to the POTS Network," Innovation in Internet Telephony: The Internet as the Successor to the POTS Network, pp. 1-6, Feb. 28, 1996.
"Supercharging the web with computer telephony," CT and the 'Net, Mar. 1996.
Anand, Surinder S., et al., "Accounting architecture for cellular networks," ICPWC '96, IEEE, pp. 184-189, 1996.
Karttunen, Jari, et al., "Cost structure analysis and reference model for Scaleable network services," The Institution of Electrical Engineers, pp. 1-9, 1996.
Jennings, Barbara J., "End-User Requirements for High-Integrity Directory," Sandia National Laboratories, Albuquerque, IEEE, pp. 1793-1796, 1996.
Botvich, D., et al., "On Charging for Internet Services provided over an A.TIVI network," IEEE, pp. 669-679, 1997.
Estrin, Deborah, et al., "Design Considerations for Usage Accounting and Feedback in Internetworks," downloaded, Aug. 19, 2008.
Li, Chung-Sheng, et al., ""Time-driven Priority" Flow Control for Real-time Heterogeneous Internetworking," IBM T. J. Watson .and. esearch Center, IEEE, pp. 189-197, 1996.
Edell, RJ., et al., "Billing users and pricing for TCP," IEEE Journal on Selected Areas in Communications, vol. 13, Issue 7, pp. 1162-1175, Sep. 1995.
Margulies, Ed, "CT's Cyberdate With the 'Net," Computer Telephony Periscope, pp. 28-29, Aug. 1996.
Inamori, Hisayoshi, et al., "Common Software Platform for Realizing a Strategy for Introducing the TMN," Network Operations and Management Symposium, vol. 2, pp. 579-589, Feb. 1998.
Rajan, R., et al., "A policy framework for integrated and differentiated services inthe Internet," Network, IEEE, vol. 13, Issue 5, pp. 36-41, Sep./Oct. 1999.
Louth, Nick, "MCI Communications Corp. vaults phone-data divide," Reuters Limited, News article, Jan. 29, 1998.
Eriksson, Hans, "MBONE: The Multicast Backbone," file:IIICI/Documents%20and%20Settings/ralbertJDesktopIMBONE%2OThe%20Multicast%20Backbone.htm (1 of 13)Mar. 7, 2008 4:06: 17 PM.
Macedonia, Michael R., et al., "MBone Provides Audio and Video Across the Internet," file:///CI/Documents%20and%20Settings/ralbert/Deskt . . . 20Audio%20and%20Video%20Across%20-the%20Internet.htm (1 of 13) Mar. 10, 2008 9: 34:00 AM.
Lapolla, Stephanie, "Net call centers, voice to merge," News, PC Week, Mar. 31, 1997.
Bohn, Roger, et al., "Mitigating the coming Internet crunch: multiple service levels via precedence," San Diego Supercomputer Center, Mar. 22, 1994.
Weiss, W., "QoS with differentiated services," Bell Labs Technical Journal vol. 3, No. 4, pp. 48-62, Oct.-Dec. 1998.
Hartanto, Felix, et al., "Policy-Based Billing Architecture for Internet Differentiated Services," Proceedings of IFIP Fifth International Conference on Broadband Communications (BC '99), Hong Kong, Nov. 10-12, 1999.
Mahadevan, I., et al., "Parallel Architectures, Algorithms, and Networks," (I-SPAN '99) Proceedings. Fourth InternationalSymposium, pp. 420-425, Jun. 23-25, 1999.
Schulzrinne, H., et al., "A Transport Protocol for Real-Time Applications," Network Working Group, Audio-Video Transport Working Group, pp. 1-151, Mar. 10, 2008.
Schulzrinne, H., "RTP Profile for Audio and Video Conferences with Minimal Control," Network Working Group, Audio-Video Video Transport Working Group, pp. 1-18, Jan. 1996.
Kim, Gary, "Talk is cheap voice over the internet," America's Network, pp. 34-39, Jul. 15, 1996.
Newton, Harry, "Notes from the field: The personal side of CT," 12 Computer Telephony, Jan. 1997.
Venditto, Gus, "Internet phones the future is calling," Internet World Magazine, Jun. 1996.
Crowcroft, Jon, et al., "Pricing internet services," Department of Computer Science, UCL, Gower Street, London, UK, pp. 1-16, downloaded, Aug. 19, 2008.

(56) References Cited

OTHER PUBLICATIONS

Newton, Harry, "Telephony Messaging on the Internet," http://www.dialogweb.com/cgi/dwclient?req=1205770063076 (1 of 5) Mar. 17, 2008 12:08:09 PM.
Maruyama, Katsumi, et al., "A Concurrent Object-Oriented Switching Program in Chill," 2460 IEEE Communications Magazine, 29(1991) January, No. 1, pp. 60-68, New York.
Rajkumar, R., et al., "A resource allocation model for QoS management," Proceedings. The 18th IEEE Real-Time Systems Symposium (Cat.No. 97CB36172) p. 298-307, Dec. 2-5, 1997.
Weinrib, A., et al., "Decentralized resource allocation for distributed systems," IEEE INFOCOM '87. The Conference on Computer Communications. Proceedings. Sixth Annual Conference—Global Networks: Concept to Realization (Cat. No. 87CH2412-5) p. 328-36, M.
Shabana, Mohamed, et al., "Intelligent switch architecture," 8081 Proceedings of the National Communications Forum 42 (1988) Sep. 30, No. 2, Chicago, Il., pp. 1312-1319.
Nagarajan, Ramesh, et al., "Local Allocation of End-to-End Quality-of-Service in High-Speed Networks," National Research Foundation under grant NCR-9116183 and the Defense Advanced Projects Research Agency under contract NAG2-578, pp. 1-28, downloaded, A.
Elixmann, Martin, et al., "Open Switching—Extending Control Architectures to Facilitate Applications," ISS Symposium, pp. 239-243, Apr. 23, 1995.
Chandra, P., et al., "Network support for application-oriented QoS," (IWQoS 98) 1998 Sixth International Workshop on Quality of Service, pp. 187-195, May 18-20, 1998.
Klein, Rachelle S., et al., "Minimax Resource Allocation With Tree Structured Substitutable Resources,"Operations Research, vol. 39, No. 2, pp. 285-295, Mar.-Apr. 1991.
Nyong, D., et al., "Resource based policies for design of interworking heterogeneous service networks," Interoperable Communications Networks, vol. 1, Nos. 2-4, pp. 571-580, 1998.
Kabay, S., et al., "The service node—an advanced in services element," 8438 BT Technology Journal vol. 13 (1995) April, No. 2, pp. 64-72.
Mayer, Robert L., et al., "Service Net-2000: An intelligent network evolution," 8010 At.and.T Technical Journal 70 (1991) Summer, No. 3/4, pp. 99-110, Short Hills, NJ.
U.S. Appl. No. 60/023,891, filed Aug. 16, 1996.
Mills, M. (Mar. 8, 1996) "Freebie Heebie-Jeebies: New Long-Distance Calling Via the Internet Scares Small Phone Firms", The Washington Post, sec. F, pp. 1-2.
Hughes, D.T. (Feb. 21, 1995) "What Hath (Net) God Wrought?", The Journal [Fairfax, Virginia], sec. B, pp. 1-2.
Hughes, D.T. (May 28, 1996) "WebPhone Heading for Serious Telephony", The Journal, [Fairfax, Virginia], sec. A, p. 8.
Mills, M. (Jan. 23, 1996) "It's the Net's Best Thing to Being There: With Right Software, Computer Becomes Toll-Free Telephone", The Washington Post, sec. C, pp. 1,5.
Hughes, D.T. (Jan. 2, 1996) "Internet Phone Wars Heating Up: Companies Improve and Encourage Users to Test Products", The Journal, [Fairfax, Virginia], sec. A, p. 6.
Yang, C. (Feb. 12, 1995), INETPhone: Telephone Services and Serves on Internet. http://ds.internic.net/rfc/rfc/rfc1789.txt.
Kuehn, Richard A. (Jul. 1994) "The Voice of Technology", [Online text only] Credit World, vol. 82, No. 6, pp. 20-23.
Margulies, Edwin (Aug. 1996) Understanding the Voice-Enabled Internet, Flatiron Publishing, Inc., pp. 4-42 and 12-1 to 12-3.
C. Low, "The Internet Telephony Red Herring," Hewlett-Packard Laboratories, (May 15, 1996), pp. 1-15.
C. Low et al., WebIN—an architecture for fast deployment of IN-based personal services, Intelligent Network Workshop, 1996, IN '96, IEEE, (Apr. 21-24, 1996), vol. 2, 196+258.
Cady et al., "Mastering the Internet", Sybex Inc., Alameda, CA 1994, ISBN 94-69309.
Stevens, "TCPIP Illustrated", vol. 1, 1994, Addison-Wesley, pp. 12-122 and inside cover.
Keiser et al., "Digital Telephony and Network Integration", 1995, Chapman Hall, Second Edition, pp. 426-428.
Chopra, Manvinder, Exploring Intelligent Peripheral Configuration, Universal Personal Communications, 1994. Record., 1994 Third Annual International Conference on, Sep. 27-Oct. 1, 1994, pp. 635-639.
Weisser et al. "The Intelligence Network and Forward-Looking Technology" IEEE Comm magazine, Dec. 1988, pp. 64-69.
Shah et al. "Application of a New Network Concept for Faster Service Deployment" International Conference on Comm. 88 Jun. 12-15, 1988, IEEE Comm. Soc. Conference. Record, vol. 3, pp. 1327-1329.
Audio Messaging Interchange Specification (AMIS)—Analog Protocol, Version 1, Issue 2, Feb. 1992.
Jabbari, B., "Common Channel Signaling System No. 7 for ISDN and Intelligent Networks", Proceedings of the IEEE, vol. 79, No. 2, Feb. 1991, pp. 155-169.
"Supercharging the Web with Computer Telephony", CT and the 'Net, Mar. 1996.
"Audio and Video Over the Internet", CT and the 'Net, Computer Telephony, Mar. 1996.
Grigonis, Richard, "Computer Telephony Over the Internet", CT and the Net, Mar. 1996.
"Geek of the Week", Karn, Phil et. al., Internet Talk Radio, Mobile IP Networking, Nov. 1993.
McConnell, Brian, "How to Build an Internet PBX", Pacific Telephony Design, printed from http://www.phonezone.com/ip-phone.htm Mar. 5, 1997.
"Welcome to the Phone Zone", Pacific Telephony Design, http://www.phonezone.com/index2.htm, pp. 1-6.
Sears, Andrew, "Innovations in Internet Telephony: The Internet as the Competitor to the Pots Network", Innovations in Internet Telephony: The Internet as the Successor to the Pots Network, Feb. 28, 1996, pp. 1-6.
"Computer Telephony and the Internet", Stylus Innovation, http://www.stylus.com/hvml.htm.
Hedrick, C., "Routing Information Protocol", Jun. 1988, http://www.internic.net/rfc/rfc1058.txt, pp. 1-30.
Mills, D.L., "An Experimental Multiple-Path Routing Algorithm", Mar. 1986, http://www.intemic.net/rfc/rfc981.txt, pp. 1-20.
Lougheed et al., "A Border Gateway Protocol (BGP)", Jun. 1990, http://www.internic.net/rfc/rfc1163.txt, pp. 1-26.
S. Deering, "Host Extensions for IP Multicasting", Aug. 1989, http://www.internic.net/rfc/rfc1112.txt, pp. 1-16.
Waitzman et al., "Distance Vector Multicast Routing Protocol", Nov. 1988, http://www.intemic.net/rfc/rfc1075.txt, pp. 1-22.
Hinden et al., "The DARPA Internet Gateway", Sep. 1982, http://www.internic.net/rfc/rfc823.txt, pp. 1-41.
"VocalTec's Telephony Gateway—The Ultimate Internet Telephony Solution?," Computer Telephony Magazine, Sep. 1996.
"A Call to Phones," Wired Magazine, Issue 4.03, http://www.wired.com/wired/archive/4.03/updata.html (Mar. 1996).
Mascoli, Cicchetti & Listanti, "Alternative Scenarios for Data Applications Via Internet-Mobile and DECT-ATM Interworkin," 4th IEEE International Conference on Universal Personal Communications, pp. 788-792, Nov. 6-10, 1995 published Apr. 1995.
Blackwell et al. "Secure Short-Cut Routing for Mobile IP," USENIX Summary 1994 Technical Conferences, 06/6-10, 1994.
Okada et al. "Mobile Communication Using PHS [Personal Handy Phone System] Communications Server," National Technical Report, vol. 42, No. 1, pp. 46-54 (Feb. 1996).
Sattler, Michael, "Nautilus Voice Encryption," May 10, 1995.
Chernov, Andrey A. "SpeakFreely" software, Apr. 18, 1996.
"Netspeak Corporation Introduces Webphone, Industry's First Internet-Based Telephony Solution for Business Users," PC Forum, Mar. 18, 1996.
"Free World Dialup Beta 2.0a Client," Feb. 12, 1996.
Kahane et al., "VocalTec IP Forum Contribution", VocalTec Inc., Seattle, WA, Jan. 15, 1997.
Handley et al., "SIP: Session Initiation Protocol", Internet Engineering Task Force, Internet Draft, Jul. 31, 1997, draft-ietf-mmusic-sip-03.txt.
"Internet Telephony for Dummies" $2^{nd}$ Edition, Chapters 14-16, 1997.

(56) References Cited

OTHER PUBLICATIONS

Kahane et al., "Call Management Agent System Specification" VoIP Forum Technical Committee, Aug. 14, 1996.
IMTC Voice over IP Forum Service Interoperability Implementation Agreement, Draft 0.91, Document VoIP-008, Jan. 13, 1997.
Sebestyn, I., ITU Telecommunication Standardization Sector, Study Group 15, Q;2&3/15 Rapporteur Meeting, Document AVC-1086, v1, Dec. 5, 1996.
Oppen et al., "The Clearinghouse: A Decentralized Agent for Locating Named Objects in a Distributed Environment", ACM Transactions on Office Information Systems, vol. 1, No. 3, Jul. 1983, pp. 230-253.
Anthony R. Noerpel et al., "PACS: Personal Access Communications System—A Tutorial," IEEE Personal Communications, Jun. 1996.
Vijay K Verma et al., "Architecture for Interworking Data over PCS," IEEE Communications Magazine, Sep. 1996, 124-130.
Jonathan Rosenberg et al "SIP for Presence," 41st IETF, Apr. 3, 1998.
"Overview", NetSpeak Corporation, Apr. 8, 1997, printed from Edgar Online.
"NetSpeak Corporation to Exhibit First Release of Voice Over IP, IP-to-PSTN Networking Products", Business Wire, Jun. 2, 1997.
Handley et al., Session Invitation Protocol, Internet Engineering Task Force, draft-ietf-mmusic-sip-00, Feb. 22, 1996.
"Camelot Announces Internet Voice Communication Technology Breakthrough", HighBeam™ Encyclopedia, From: PR Newswire, http://www.encyclopedia.com/doc/1G1-16452259.html?Q=Caml, Feb. 13, 1995, 2 pages.
1979 Annual Technical Report, "A Research Program in Computer Technology", Oct. 1978-Sep. 1979, Prepared for the Defense Advanced Research Projects Agency, University of Southern California, ISI-SR-80-17.
Cohen et al., "A Network Voice Protocol NVP-11", Lincoln Laboratory Massachusetts Institute of Technology, Apr. 1, 1981, ISI/RR-81-90.
1982 Annual Technical Report, "A Research Program in Computer Technology", Jul. 1981-Jun. 1982, University of Southern California, ISI/SR-83-23.
Annual Report to the Defense Communications Agency, "Network Speech Systems Technology Program", Massachusetts Institute of Technology Lincoln Laboratory, Oct. 1, 1980-Sep. 30, 1981, issued Feb. 4, 1982.
Heggestad et al., "Voice and Date Communication Experiments on a Wideband Satellite/Terrestrial Internetwork System", IEEE International Conference on Communications, Integrating Communication for World Progress, Jun. 19-22, 1983.
Annual Report to the Defense Communications Agency, "Defense Switched Network Technology and Experiments Technology", Massachusetts Institute of Technology Lincoln Laboratory, Oct. 1, 1981-Sep. 30, 1982, issued Feb. 5, 1983.
Merritt, "Providing Telephone Line Access to a Packet Voice Network", University of Southern California, Feb. 1983, ISI/RR-83-107.
Weinstein, "The Experimental Integrated Switched Networks—A System Level Network Text Facility", Proceedings of 1983 IEE Military Communications Conference, Washington, DC, Oct. 31, 1983-Nov. 2, 1983.
Cesner et al., "Wideband Communications", 1984 Annual Technical Report, University of Southern California. ISI/SR-85-150. Jul. 1983-Jun. 1984.
Annual Report to the Defense Communications Agency, "Defense Switched Network Technology and Experiments Technology", Massachusetts Institute of Technology Lincoln Laboratory, Oct. 1, 1982-Sep. 30, 1983, issued Feb. 29, 1984.
Gross. "Proceedings of the Oct. 15-17, 1988 Joint Meeting of the Internet Engineering and Internet Architecture Task Forces". Fourth IETF, The Mitre Corporation.
Corley. "Bellsouth Trial of Wideband Packet Technology", Bellsouth Services, 1990 IEEE, CH2829-0/90/0000-1000.
Inoue et al., "Evolution Scenario of Broadband Services Based on Granulated Broadband Network Concept", IEEE Region 10 Conference, Tencon 92, Nov. 11-13, 1992.
Inoue et al., "Granulated Broadband Network Applicable to B-ISDN and PSTN Services", IEEE Journal on Selected Areas in Communiations, vol. 10, No. 9, Dec. 1992.
Cerf et al., "A Protocol for Packet Network Intercommunication", IEEE Transactions on Communications, No. 8. May 1974.
Cole, "Dialing in the WB Network", Information Sciences Institute University of Southern California, Dialing-Cole.83, Apr. 30, 1981.
Hapgood. "Dialing Without. Dollars", Jul. 1995, vol. 17, No. 4. pp. 18, Journal Code, INO.
Yang, "INETPhone: Telephone Services and Servers on Internet", Network Working Group, RFC 1798, Apr. 1995. http://ds.internic.net/rfc/rfc1798.txt.
Chen et al.. "Integrated Voice/Data Switching", IEEE Communication Magazine. Jun. 1988, vol. 26. No. 6.
Frezza, "The Internet Phone is Poised to Conquer", Communications Week, Dec. 11, 1995, http://techweb.cmp.com/cw/current.
"Internet Access: Internet Phone-to-Phone Technology Now a Reality . . . ", EDGE Publishing, Aug. 12, 1996.
"Internet Phone Saves 50% on Long Distance", 411 Newsletter Aug. 5, 1996, vol. 17, No. 15, United Communications Group.
"Internet Phone Calls are Cheap but Limited", New Media Markets, Feb. 23, 1995, Financial Times Business Information, Ltd., ISSN:0265-4717.
"Internet Telephony Seems to be Evolving East, But is There Anyone on the Line?", Computergram International, Aug. 19, 1996. No. 2980. ISSN: 0268-716X.
"Internet's International Phone Calls ate Cheap But Limited", Telecom Markets, Financial Times Business Information ID, Mar. 2, 1995, ISSN: 0267-1484.
Mills, The Washington Post. "Phone Service Via the Internet May Slash Rates". Aug. 11, 1996.
Sears, "The Effect of Internet Telephone of the Long Distance Voice Market", Jan. 14, 1995.
National Technical Information Service, Wideband integrated Voice/Data Technology, ADA132284, Mar. 31. 1983. Massachusetts Inst. of Tech., Lexington, Lincoln Lab.
Detreville et al., "A Distributed Experimental Communications System", Advances in Local Area Networks, IEEE Press, 1987.
Borden et al., "Integration of Real-Time Services in an IP-ATM Network", RFC 1821, Internet RFC/STD/FYI/BCP Archives, Aug. 1995.
Laubach, "Classical IP and ARP over ATM" Hewlett-Packard Laboratories, Jan. 1994, http://www.faqs.org/rfc/rfc1577.txt.
Comer, "Internetworking with TCP/IP", vol. 1, Principles, Protocols, and Architecture, Department of Computer Sciences, 1995.
Perez et al., "ATM Signaling Support for IP Over ATM", Network Working Group, RFC 1765, Feb. 1995, http:/www.ietf.org/rfc/rfc1765.txt.
Gupta, Amit, "Resource sharing for multi-party real-time communication," Proceedings of the Fourteenth Annual Joint Conference of the IEEE Computer and Communication Societies (INFOCOM '95), pp. 1230-1237, 1995.
Kausar, Nadia, et al., "A Charging Model for Sessions on the Internet," IEEE, pp. 32-38, Apr. 1999.
Schutzrinne, Henning, "A comprehensive multimedia control architecture for the Internet," IEEE, pp. 65-76, Sep. 1997.
Tsaoussidis, V., et al., "A CORBA-based Application Service Middleware Architecture and Implementation," State University, of NY at Stony Brook, pp. 1-7, downloaded, Aug. 19, 2008.
Bernet, Y., et al., "A Framework for Differentiated Services," The Internet Society, pp. 1-35, Sep. 22, 1999.
Gleeson, B., et al., "A Framework for IP Based Virtual Private Networks," The Internet Society, pp. 1-62, Feb. 2000.
Yavatkar, Raj, et al., "A Framework for Policy-based Admission Control," Internet Engineering Task Force, pp. 1-19, Apr. 1999.
Ekstein, Ronnie, et al., "AAA Protocols: Comparison between Radius, Diameter and Cops," Internet Engineering Task Force (IETF), pp, 1-17, Aug. 1999.
Hussmann, H., et al., "An edge device for supporting internet integrated services over switched ATM networks," pp. 1-10, downloaded, Aug. 19, 2008.

(56) References Cited

OTHER PUBLICATIONS

Sinnreich, H., et al., "Interdomain IP communications with QoS, authorization and usage reporting," http:www.ietf.org/internet-drafts . . . , Jan. 2000.
Mascolo, Cecilia, et al., "An XML based Programmable Network Platform," Dept. of Computer Science, University College London, pp. 1-5, Jun. 10, 2005.
Kumar, Vijay P., et al., "Beyond Best Effort: Router Architectures for the Differentiated Services of Tomorrow's Internet," IEEE Communications Magazine, pp. 152-164, May 1998.
Pan, Ping, et al., "Diameter-SIP," Internet Draft, pp. 1-15, Nov. 15, 1998.
Neilson, Rob, et al., "A Discussion of Bandwidth Broker Requirements for Internet2 Qbone Deployment," Internet2 Qbone BB Advisory Council, Version 0.7, pp. 1-30, Aug. 1999.
Stojsic, Goran, et al., "Formal Definition of SIP Proxy Behavior," IEEE, pp. 289-292, Feb. 2001.
Bhuyan, L, et al., "Impact of switch Design on the Application Performance of Cache-Coherent Multiprocessors," Dept. of Computer Science, Texas A.and.M University and Intel Corp., pp. 1-9, Nov. 15, 2005.
Product Overview, "IP Highway product overview," http://iphighway.com/prod/, pp. 1-4, Sep. 22, 1999.
Rosenberg, Jonathan, et al., "Internet telephony gateway location," IEEE, pp. 488-496, Feb. 1998.
Wright, S., et al., "IP "Telephony" vs. ATM: What is There to Discuss?," IEEE, pp. 400-409, Feb. 1998.
Wedlund, Elin, et al., "Mobility support using SIP," WoWMoM, Jan. 1999.
Aiken, B., et al., "Network Policy and Services: A report of a Workshop on Middleware," Network Working Group, pp. 1-26, Feb. 2000.
Aspnes, James, et al., "On-Line Routing of Virtual Circuits willi Applications to Load Balancing and Machine Scheduling," pp. 486-504, Journal of the ACM, vol. 44, No. 3, May 1997.
Salsano, Stefano, et al., "Qo5 Control by Means of COPS to Support SIP-Based Applications," IEEE Network, Mar./Apr. 2007.
White, Paul P., "RSVP and Integrated Services in the Internet: A Tutorial," IEEE Communications Magazine, pp. 100-106, May 1997.
Beck, Christopher J., et al., "Scheduling alternative activities," http://www.aaai.org/home.html, 1999.
Flykt, P., et al., "SIP Services and Interworking IPv6," 3G Mobile Communication Technologies, Mar. 26-28, 2001, Conference Publication No. 477.
Schulzrinne, Henning, et al., "Signaling for internet telephony," Columbia University, Dept. of Computer Science Technical Report CUCS-005-98, Feb. 2, 1998.
Barzilai, Tsipora, et al., "Design and Implementation of an RSVP-based Quality of Service Architecture for Integrated Services Internet," IEEE, May 1997.
Hubaux, Jean-Pierre, et al., "The impact of the Internet on telecommunication architectures," Computer Networks 31 (1999).
Roberts, Erica, The New Class System, http://www.data.com/round-ups/class_system.html, pp. 1-14, Sep. 22, 1999.
Wroclawski, J., "The Use of RSVP with IETF Integrated Services," ftp://ftp.isi.edu/in-notes/rfc2210.txt, Sep. 22, 1999.
Sloman, Morris, et al., "Distributed Management for the Networked Millennium," Proceedings of the Sixth IFIP/IEEE International Symposium on Integrated Network Management—Boston, MA, U.S.A., May 24-28, 1999.
Schulzrinne, Henning, "MIME-Version: 1.0," email communication dated Oct. 10, 1995.
Garrahan, James J., et al., "Marching toward the global intelligent network," IEEE Communications Magazine, vol. 31, No. 3, pp. 30-36, Mar. 1993.
Gys, L, et al., "Intelligence in the Network," Alcatel Telecommunications Review, pp. 13-22, 1st Quarter 1998.
Yang, C., "INETPhone Telephone Services and Servers on Internet," Network Working Group, pp. 1-6, Apr. 1995.
Perret, Stephane, et al., "MAP: Mobile Assistant Programming for Large Scale Communication Networks," IEEE, pp. 1128-1132, Apr. 1996.
Plunkett, Bill, "ISCP Service Capacity Improvements," Bellcore, Feb. 29, 1996.
Murray, Dave, "High speed signalling link interface for ISCP version 6.0," Bellcore, Feb. 29, 1996.
Evans, Jeff, "Alternative Approaches for Multi-ISCP Locator," Bell Atlantic, Mar. 13, 1996.
Performance Task Force, "Off-Line Engineering Tool," Bellcore, Sep. 3, 1996.
Jones, Doug R., "Advanced intelligent network delivering control of network routing," Bell Atlantic, downloaded, Aug. 20, 2008.
Gorton, Dave, "ISCP Evolution overview," Telcordia Technologies Inc., Jun. 5, 2001.
Brown, Kathryn C., "Telecom Convergence," PowerPoint presentation, downloaded Aug. 21, 2008.
Cohen, Danny, "Specifications for the Network Voice Protocol (NVP)," http://www.rfc-archive.org/getrfc.php?rfc=741, Nov. 22, 1977.
Low, Colin, "The Internet Telephony Red Herring," Hewlett Packard, pp. 1-15, May 15, 1996.
de la Fuente, L.A., et al., "Application of the TINA-C Management Architecture," Bellcore, Red Bank, NJ, downloaded, Aug. 21, 2008.
Finseth, C. "An access control protocol, sometimes called TACACS," Network Working Group, University of Minnesota, pp. 1-21, Jul. 1993.
Buchanan, Ken, et al., "IMT-2000: Service Provider's Perspective," IEEE Personal Communications, pp. 8-13, Aug. 1997.
Pontailler, Catherine, "TMN and New Network Architectures," IEEE Communications Magazine, pp. 84-88, Apr. 1993.
Mills, Mike, "Phone service via the Internet may slash rates," The Washington Post, A Section; p. A01, Sunday, Final Edition, Aug. 11, 1996.
Chapman, Martin, et al, "Overall Concepts and Principles of TINA," TINA-C, Version 1.0, Feb. 17, 1995.
Kahane, Opher, et al, "Call Management Agent System Specification," Voice over IP Forum Technical Committee in Chicago, Aug. 14, 1996.
Verjinski, Richard D., "PHASE, A Portable Host Access System Environment," IEEE, May 1989.
*Verizon Services Corp., et al., v. Cox Fibernet Virginia, Inc., et al.*, Report of Herman J. Helgert, Ph.D., Exhibit D, downloaded, Aug. 21, 2008.
*Verizon Services Corp., et al., v. Cox Fibernet Virginia, Inc., et al.*, Report of Herman J. Helgert, Ph.D., Exhibit E, downloaded, Aug. 21, 2008.
*Verizon Services Corp., et al., v. Cox Fibernet Virginia, Inc., et al.*, Report of Herman J. Helgert, Ph.D., Exhibit F, downloaded, Aug. 21, 2008.
The Jeff Pulver Blog: Free World Dialup and Verizon's patent on "name translation," http://pulverblog.pulver.com/archives/006846.html, pp. 1-19, Apr. 23, 2007.
Lipoff, Stuart, "Operations Support System Framework for Data Over Cable Services," Data Over Cable Technical Reports, MCNS Holdings, L.P., Oct. 16, 1996.
Sinnreich, H., et al., "Interdomain IP communications with QoS, authorization and usage reporting," http:www.cs.columbia.edu/-hgs/sip/drafts/draft-sinnreich-sip-qos-osp, Feb. 2000.
Pan, Ping, et al., "Diameter: Policy and Accounting Extension for SIP," Internet Engineering Task Force, Internet Draft, pp. 1-17, Nov. 15, 1998.
Schulzrinne, Henning, et al., "Interaction of Call Setup and Resource Reservation Protocols in Internet Telephony," pp. 1-13, Jun. 11, 1999, downloaded, Aug. 21, 2008.
Rosen, E., et al., "Memo re: BGP/MPLS VPNs," Networking Group, pp. 1-25, Mar. 1999.
Waksberg, M., "Axe 10 and the Intelligent Network," Commutation . and. Transmission, No. 4, pp. 67-76, Dec. 1993.
Niitsu, Yoshihiro, et al., "Computer-aided stepwise service creation environment for intelligent network," NTT Communication Switching Laboratories, Tokyo, Japan, IEEE, pp. 454-458, 1992.

(56) References Cited

OTHER PUBLICATIONS

Morgan, Michael J., et al., "Service creation technologies for the intelligent network," At.and.t Technical Journal, Summer 1991.
Fujioka, Masanobu, et al., "Universal service creation and provision environment for intelligent network," XIII International Switching Symposium, Stockholm, Sweden, Proceedings vol. III, pp. 149-156, May 27-Jun. 1, 1990.
Moy, J., "OSPF Version 2," Network Working Group, Proteon, Inc., Jul. 1991.
Lantz, Keith A., "Towards a universal directory service," Operating Systems Review, vol. 20, No. 2, Apr. 1986.
Fang, Wenjia, "Building an Accounting Infrastructure for the Internet," Princeton University, IEEE, pp. 105-109, 1996.
Aidarous, Salah, et al., "The role of the element management layer in network management," 1994 IEEE Network Operations and Management Symposium, Feb. 14-17, 1994.
Gareiss, Robin, "Voice over the internet," Data Communications, pp. 93-100, Sep. 1996.
Bethoney, Herb, "HAHTSite Gives Pros Everything They Need," PC Week, p. 36, Mar. 10, 1997.
Kolarov, Aleksandar, et al., "End-to-end Adaptive Rate Based Congestion Control Scheme for ABR Service in Wide Area ATM Networks," IEEE International Conference on Communications, Seattle, Washington, pp. 138-143, Feb. 1995.
Chen, Larry T., et al., "ATM and Satellite Distribution of Multimedia Educational Courseware," 1996 IEEE International Conference on Communications, pp. 1133-1137, Jun. 23-27, 1996.
Civanlar, M. Reha, et al., "FusionNet: Joining the Internet .and. Phone Networks for Multimedia Applications," ACM Multimedia 96, pp. 431-432, 1996.
Cobbold, Christopher, et al., "Enhancement for Integrated Wireless Personal Communications over Metropolitan Area Networks," 1996 IEEE International Conference on Communications, pp. 1370-1376, Jun. 23-27, 1996.
Corner, Douglas E., "Internetworking With TCP/IP," 3rd ed., V. 1. Principles, protocols, and architecture, Prentice-Hall, Inc., 1995.
Mahadevan, I., et al., "Quality of service achitectures for wireless networks: IntServ andDiffServ models," http://ieeexplore.ieee.org/xpllabsprintf.jsp?arnumber==778974.and.page . . . , Aug. 6, 2002.
Ahmadi, H., et al., "NBBS Traffic management overview," IBM Systems Journal, vol. 34, No. 4, pp. 604-628, 1995.
Stoica, Ion, et al., "LIRA: An Approach for Service Differentiation in the internet," sponsored by DARPA under contract Nos. N66001-96-C-8528 and NOO174-96-K-0002, and by a NSF Career Award under grant No. NCR-9624979. Additional support was provi.
Duan, Juan, et al., "Efficient Utilization of Multiple Channels between two Switches in ATM Networks," IEEE, pp. 1906-1911, 1995.
Ejiri, Masayoshi, et al., "For Whom the Advancing service/network management," IEEE, pp. 422-433, 1994.
Lee, Whay Chiou, et al., "Integrated Packet Networks With Quality of Service Constraints," Globecom, IEEE, pp. 8A.3.1-8A.3.5, 1991.
Elia, Carlo, et al., "Skyplex: Distributed Up-link for Digital Television via Satellite," IEEE Intelligent Network workshop IN, Melbourne, Australia, Apr. 21-24, 1996.
Ely, Tom, "The Service Control Point as a Cross Network Integrator," Bellcore, IEEE, pp. 1-8, 1996.
Mamais, G., et al., "Efficient buffer management and scheduling in a combined IntServand DiffServ architecture: a performance study," ATM, 1999. ICATM '99. 1999 2nd International Conference on, pp. 236-242, Jun. 21-23, 1999.
Baumgartner, F., et al., "Differentiated services: a new approach for quality of service in the Internet," Proceedings of Eighth International Conference on High Performance Networking, pp. 255-273, Sep. 21-25, 1998.
Sibal, Sandeep, et al., "Controlling Alternate Routing in General-Mesh Packet Flow Networks," SIGCOMM 1994, London, England, pp. 168-179, Aug. 1994.
Jajszczyk, A., et al., "Bringing information to People," IEEE INFOCOM '95, Proceedings, vol. 3, Apr. 2-6, 1995.
CT and the 'Net, "Webphone," Computer Telephony pp. 219-221, Mar. 1996.
Sisalem, Dorgham, et al., "The Network Video Terminal," IEEE Proceedings of HPDC-5, pp. 3-10, 1996.
Baumgartner, H., et al., "Middleware for a New Generation of Mobile Networks: The ACTS OnTheMove Project," http://www.isoc.org/inet96/proceedings/a6/a6_3.htm, pp. 1-4, Apr. 14, 2008.
"Talk Talk," tele.com, pp. 68-72, Jun. 1996.
Kreller, Birgit, et al., "UMTS: A Middleware Architecture and Mobile API Approach," IEEE Personal Communications, pp. 32-38, Apr. 1998.
Low, Colin, et al., "WebIN—An Architecture for Fast Deployment of IN-based Personal Services," IEEE, 1996.
Grami, A., et al., "The Role of Satellites in the Information Superhighway," IEEE International Conference on Communications, pp. 1577-1581, Jun. 18-22, 1995.
Gupta, Ranabir, et al., "Technical Assessment of (T)INA—TMN—OSI Technology for Service Management Applications," IEEE Network Operations and Management Symposium, vol. 3, pp. 877-887, Feb. 14-17, 1994.
Inamori, Hisayoshi, et al., "Applying TMN to a Distributed Communications Node System with Common Platform Software," NTT Network Service Systems Laboratories, Tokyo, Japan, pp. 83-87, IEEE International Conference on Communications, Seattle, WA, Jun. 18.
Clark, David D., et al., "Supporting Real-Time Applications in an Integrated Services Packet Network: Architecture and Mechanism," COMM'92, MD, USA, pp. 14-26, Aug. 1992.
Imielinski, Tomasz, et al., "Mobile Wireless Computing: Solutions and Challenges in Data Management," Department of Computer Science, Rutgers University, downloaded, Oct. 22, 2008.
Balmer, R., et al., "A Concept for RSVP Over DiffServ," Institute of Computer Science and Applied Mathematics, University of Berne, Switzerland, http://www.iam.unibe.ch/~rvs, pp. 412-417, IEEE, May 2000.
Ziegler, Jr., K., "A Distributed Information System Study," IBM Syst J, vol. 18, No. 3, pp. 374-401, 1979.
Blake, S., et al., "An Architecture for Differentiated Services," Network Working Group, pp. 1-36, Dec. 1998.
Walters, Rob, "Computer Telephony Integration," Second Edition, Artech House, 1999.
IMTC Voice over IP Forum Service Interoperability Implementation Agreement, Draft 0.91, IMTC Voice over IP Forum Technical Committee, VoIP97-008, Jan. 13, 1997.
Braden, R., et al., "Integrated Services in the Internet Architecture: an Overview," Network Working Group, pp. 1-28, Jul. 1994.
Braun, Torsten, "Internet Protocols for Multimedia Communications," Part II: Resource Reservation, Transport, and Application Protocols, IEEE MultiMedia, pp. 74-82, Oct.-Dec. 1997.
Black, Uyless D., "Internet Telephony Call Processing Protocols," Prentice Hall PTR, www.phptr.com, 2001.
Briere, Daniel D., et al., "Internet Telephony for Dummies," 2nd Edition, IDG Books Worlwide, Inc., 1997.
Vin, Harrick M., et al., "Multimedia Conferencing in the Etherphone Environment," Xerox Palo Alto Research Center, IEEE, pp. 69-79, Oct. 1991.
Detti, Andrea, et al., "Supporting RSVP in a Differentiated Service Domain: an Architectural Framework and a Scalability Analysis," http://www-st.inf.tu-dresden.de/elisa/, downloaded, Oct. 27, 2008.
Bernet, Yoram, "The Complementary Roles of RSVP and Differentiated Services in the Full-Service QoS Network," QoS Mechanisms, Microsoft, downloaded, Oct. 27, 2008.
Herzog, S., et al., "COPS Usage for RSVP," Network Working Group, pp. 1-15, Jan. 2000.
Sebestyen, Istvan, "What is the position of Q.2, 0.3/15 on Internet Telephony for the IMTC—VoIP Forum Meeting in Seattle," ITU Telecommunication Standardization Sector, Study Group 15, pp. 1-5, Dec. 5, 1996.
Daniele, M., et al., "Textual Conventions for Internet Network Addresses," Nework Working Group, pp. 1-16, Jun. 2000.
Handley, M., et al., "SIP: Session Initiation Protocol," Internet Engineering Task Force, pp. 1-30, Dec. 2, 1996.

(56) References Cited

OTHER PUBLICATIONS

Weinstein, Clifford J., "The Experimental Integrated Switched Network—a System-Level Network Test Facility," IEEE, pp. 449-456, Jan. 1983.
"Computer Telephony and the Internet," pp. 1-8, downloaded, Jul. 14, 2009.
Jitian, Xiao, et al., "Sharing Model of Netware Node Resources and Real-Time Scheduling," Mini-Micro Systems, vol. 16, No. 12, pp. 54-59, Dec. 1995.
Swinehart, D.C. et al., "Adding Voice to an Office Computer Network", IEEE GLOBECOM '83 Conference Record, vol. 1, Nov. 28, 1983, p. 392-398.
Zellweger, Polle T., et al., "An overview of the etherphone system and its applications," Xerox Palo Alto Research Center, pp. 160-168, Apr. 1988.
Ng, L.J., et al., "Distributed architectures and databases for intelligent personal communication networks," Department of Electrical Engineering, U. of British Columbia, pp. 300-304, Feb. 1992.
Malyan, Andrew D., et al., "Network architecture and signaling for wireless Personal communications," IEEE Journal on Selected Areas in Communications, vol. 11, No. 6, pp. 830-841, Aug. 1993.
Malyan, Andrew D., et al. "A Microcellular Interconnection Architecture for Personal Communications Networks," Department of Electrical Engineering, University of British Columbia Vancouver, B.C., V6T 1W.5, Canada, pp. 502-505, Feb. 1992.
Bakre, Ajay, et al., "M-RPC: A Remote Procedure Call Service for Mobile Clients," Department of Computer Science Rutgers, The State University of New Jersey Piscataway, NJ, pp. 97-110, 1995.
O'Malley, Sean W., "A Dynamic Network Architecture," Department of Computer Science, University of Arizona, ACM Transactions on computer systems, vol. 10, No. 2, pp. 110-143, May 1992.
Cheshire, Stuart, et al., "Internet Mobility 4 by 4," SIGCOMM 96—Stanford, California, USA, pp. 1-2, Aug. 1996.
Chang, Rong N., et al., "A Service Acquisition Mechanism for the Client/Service Model in Cygnus," IBM Canada Laboratory Technical Report TR 74.059, pp. 323-345.
Arao, Shinya, et al., "Component-based policy deployment for service level differentiation in converging communication networks," IEEE, pp. 1388-1392, 1999.
Goyal, Pawan, et al., "Integration of call signaling and resource management for IP telephony," IEEE Network, pp. 24-32, May/Jun. 1999.
Delatore, J.P., et al., "The 5ESS switching system: Fatory system testing," AT+T Technical Journal, vol. 64, No. 6, Jul.-Aug. 1985.
Oran, Dave, "Dial plan mapping for voice-over-IP," Access Engineering, Apr. 11, 1996.
Getting started guide for Internet Phone release 4, http://www.vocaltec.com, 1993-1996 VocalTec Inc.
VocalTec desktop dialer version 3.0, User reference, http://www.vocaltec.com, 1997 VocalTec Ltd.
"Vocaltec's telephony gateway software captures 1996 product of the year honors from computer telephony magazine," Herzliya, Israel, Dec. 18, 1996, VocalTec, Ltd.
"Introduction to VTG," Northvale, NJ 07647, Tel. 201-768-9400, info@vocaltec.com, www.vocaltec.com, posted not earlier than Dec. 24, 1996.
Kahane, Opher, et al., "IMTC VoIP Forum Contribution." Subject: Call management agent system requirements function architecture and protocol, VoIP97-010, pp. 1-44, Seattle, Jan. 1, 1997.
Kahane, Opher, "Introduction to VocalTec's CMA system," Intelligent switching for a new era of telecom, Nov. 7, 1996.
Newton, Harry, "Newton's Telecom Dictionary," 22nd edition, pp. 728, 2006.
Braden, R., et al., "Resource ReSerVation Protocol (RSVP)—Version 1 Functional Specification," Network Working Group, pp. 1-224, Univ. of Michigan, Sep. 1997.
Keiser, Bernhard E., et al., "Digital Telephony and Network Integration," downloaded Jul. 1, 2008.

Boyle, Jim, et al., "The COPS (Common Open Policy Service) Protocol," http://www.ietf.orgiinternet-drafts/draft-ietf-rap-cops-07.txt, pp. 1-35, Aug. 16, 1999.
Bellamy, John, "Digital telephony," Dallas, TX, Oct. 1981.
Open and standardized—the world of IP Protocols, "H.323: The Leading Standard in Voice over IP," downloaded Jul. 1, 2008.
"Inside APPN—The Essential Guide to the Next-Generation SNA," IBM, International Technical Support Organization Raleigh Center, Raleigh, NC, Jun. 1997.
Friedes, A., et al. "Integrating the world through communications," IEEE ICC, vol. 1 of 3, Jun. 22-25, 1986.
Huitema, Christian, "Routing in the internet," Prentice Hall, Englewood Cliffs, NJ, 1995.
Lucky, R.W., "Applications of communications theory," Fundamentals of digital switching, AT+T Laboratories, Second Edition, downloaded, Jul. 3, 2008.
Bellamy, John, "Digital telephony," Second Edition, Wiley Series in Telecommunications, downloaded, Jul. 3, 2008.
Stallings, William, "ISDN and Broadband ISDN with frame relay and ATM," Prentice Hall, Upper Saddle River, NJ, downloaded, Jul. 3, 2008.
GR-1298-CORE, AINGR: Switching Systems, Telcordia Technologies, Issue 10, Nov. 2004.
GR-2863-CORE, CCS Network Interface Specification (CCSNIS) Supporting Advanced Intelligent Network (AIN), Bellcore, Bell Communications Research, Issue 2, Dec. 1995.
GR-246-CORE, Telcordia technologies specification of signalling system No. 7, Telcordia Technologies, Issue 10, Dec. 2005.
GR-1280-CORE, Advanced intelligent network (AIN) service control point (SCP) generic requirements, Telcordia Technologies, Issue 1, Aug. 1993.
Morris, Christopher, Academic Press Dictionary of Science and Technology, Academic Press, downloaded, Jul. 3, 2008.
GR-1428-CORE, CCS Network Interface Specification (CCSNIS) Supporting Toll-Free Service, Bellcore, Issue 2, May 1995.
Mockapetris, P., "Domain names—concepts and facilities," Network working group, Nov. 1987.
Mockapetris, P., "Domain names—implementation and specification," Network Working Group, Nov. 1987.
Finseth, C. "An access control protocol, sometimes called TACACS," Network Working Group, University of Minnesota, pp. 1-20, Jul. 1993.
Carrel, D., "The TACACS+ Protocol," Network Working Group, Cisco, Oct. 1996.
ITU-T, "Line transmission of non-telephone signals," Recommendation H.323, May 28, 1996.
Product releases webpage, VocalTec, info@vocaltec.com, Aug. 26, 1996.
Tutorial on "H.323," by The International Engineering Consortium, http://www.iec.org, pp. 1-30, downloaded, Jul. 3, 2008.
Everhart, C., et al., "New DNS RR Definitions," Network Working Group, University of Maryland, pp. 1-11, Oct. 1990.
Handley, M., et al., "SIP: Session Initiation Protocol," Network Working Group, The Internet Society, Mar. 1999.
Rosenberg, J., et al., "SIP: Session Initiation Protocol," Network Working Group, The Internet Society, Jun. 2002.
Brannen, Lynn, et al., "Next generation switch," MCI Telecommunications, May 16, 1997.
Shen, Yi-Shang, "Communications network with flexible call routing and resource allocation," MCI Invention Disclosure Form, Jan. 8, 1998.
Kahane, Opher, et al, "Call management agent system specification," VoIP Forum Technical Committee Contribution, Chicago, IL, Aug. 14, 1996.
Pulver, Jeff, "The Internet telephone tookit," Wiley Computer Publishing, New York, NY, 1996.
Peeren, Rene, "IN in the Hybrid Broadband Network the Intelligent Web," Presentation, Ericsson, IEEE 1996.
Jain, Surinder K., "Evolving Existing Narrowband Networks Towards Broadband Networks with IN Capabilities," Bellcore Intelligent Networks, IEEE, Apr. 22, 1996.

(56) References Cited

OTHER PUBLICATIONS

Matta, Ibrahim, et al, "Type-of-Service Routing in Dynamic Datagram Networks," Department of Computer Science, University of Maryland, pp. 992-999, IEEE 1994.
Yeager, Nancy J., et al., "Web Server Technology: The Advanced Guide for World Wide Web Information Providers," National Center for Supercomputing Applications, pp. 250, Morgan Kaufman Publishers, Inc., 1996.
Kishimoto, Ryozo, "Agent Communication System for Multimedia Communication Services," IEEE INFOCOM, Fifteenth Annual Joint Conference of the IEEE Computer and Communications Societies, pp. 10-17, Mar. 24-28, 1996.
Willebeek-LeMair, Marc H., "Videoconferencing over Packet-Based Networks," IEEE Journal on Selected Areas in Communications, vol. 15. No. 6, pp. 1101-1114, Aug. 1997.
Kumar, Vinay, "Internet Multicasting: Internet's Next Big Thing," ICAST Corporation, pp. 1-13, Sep. 23, 1997.
The Wall Street Journal article on: "MCI's New Service for Corporate Use Sets 1 Line for Net, Phone," pp. B16, Jan. 30, 1997.
Sharp, C.D., et al., "Advanced Intelligent Networks—now a reality," Electronics .and. Communication Engineering Journal, pp. 153-162, Jun. 1994.
Pezzutti, David A., "Operations Issues for Advanced Intelligent Networks," IEEE Communications Magazine, pp. 58-63, Feb. 1992.
Oppen, Derek C., et al., "The Clearinghouse: A Decentralized Agent for Locating Named Objects in a Distributed Environment," ACM Transactions on Office Information Systems, vol. 1, No. 3, Jul. 1983, pp. 230-253.
Rendleman, John, et al., "ATM Goes Into Orbit . . . While IP Gets Speedy in Space," Communications Week, Mar. 17, 1997, www.commweek.com.
Miller, Mark A., "Troubleshooting TCP/IP: Analyzing the Protocols of the Internet," M.and.T Books, pp. 365-389, 1992.
Platt, Richard, "Why IsoEthernet Will Change the Voice and Video Worlds," IEEE Communications Magazine, pp. 55-59, Apr. 1996.
Quicklook, "Internet by Satellite," 1 page, http://www.netsatx.net, at least as early as 1990.
Rosalyn, Retkwa, "Telephone Politics," Internet World, Jun. 1996.
Schreyer, Oliver, et al., "Least Cost Call Routing—A Brilliant Application for Private IN," IEEE International Conference on Communications, vol. 2 of 3, Jun. 23-27, 1996.
Rodriguez Serrano, Inma, "Evolution of a Hybrid Fibre Coaxial Network for Multimedia Interactive Services," British Telecommunications Egineering, vol. 15, pp. 249-253, Oct. 1996.
Sunaga, Hiroshi, et al., "A Reliable Communication Switching Platform for Quick Service Provisioning," IEEE International Conference on Communications, Seattle, WA, Jun. 18-22, 1995.
Marketing materials re: Workshops on "Telephony on the Internet," to take place on Sep. 24-25, 1996, at The Drake Hotel, Chicago, Illinois.
Gralla, Preston, "How the Internet Works," Ziff-Davis Press, pp. 118-119, 1996.
Gralla, Preston, "How the Internet Works," Ziff-Davis Press, pp. 64-67, 1996.
Tsuchida, Hisazumi, et al., "Intelligent Dynamic Service Provisioning Architecture in the Multimedia Era," NTT Information and Communication Systems Laboratories, IEEE, pp. 1117-1122, 1996.
Low, Colin, "Integrating Communication Services," IEEE Communications Magazine, pp. 164-169, Jun. 1997.
Fridisch, M., et al., "Terminals for Accessing the Internet—The Internet Telephone," Alcatel Telecommunications Review, 4th Quarter, pp. 304-309, 1996.
Hurwicz, Michael, "Switched ATM is fast, but not that smart. Routed IP is smart, but not that fast. Why not combine them?," http://www.ipsilon.com/, Apr. 1997.
Diehl, Standford, "Data's New Voice," BYTE, Special Report, pp. 129-135, Sep. 1996.

Kahn, Jeffery, "Videoconferencing Debuts on the Internet," LBL, U.S. Department of Energy, Berkeley, California, University of California, Feb. 28, 1995.
Braun, Hans-Werner, et al., "A framework for flow-based accounting on the Internet," National Science Foundation (NCR-9119473), downloaded, Aug. 21, 2008.
Kelly, Katy, "Up to their laptops in packed powder: Mountaintop office keeps skiers in touch," USA Today, Final Edition, News, pp. 1A, Feb. 21, 1997.
Braun, Torsten, "Implementation of an Internet Video Conferencing Application over ATM," IBM European Networking Center, Heidelberg, Germany, IEEE, pp. 287-294, 1997.
Sclavos, Jean, et al., "Information Model: From Abstraction to Application," Telecom Paris, France, pp. 1-13, downloaded, Aug. 21, 2008.
Black, Uyless D., "OSI: A model for computer communications standards," Prentice-Hall, Inc., pp. 157-201, 1991.
Sriram, Kotikalapudi, et al., "Voice Packetization and Compression in Broadband ATM Networks," IEEE Journal on Selected Areas in Communications, vol. 9, No. 3, pp. 294-304, Apr. 1991.
Arango, Mauricio, et al., "Guaranteed Internet Bandwith," IEEE, pp. 862-866, Nov. 18, 1996.
Lapolla, Stephanie, "Seagate joins the backup vendors' enterprise forays," PC Week, The National Newspaper of Corporate Computing, vol. 13, No. 33, Aug. 19, 1996.
Harmer, Julie, et al., "Revised Requirements for Mobile-API-Interim deliverable," OnTheMove public project, pp. 1-44, Dec. 1996.
Schulzrinne, Henning, "Personal Mobility for Multimedia Services in the Internet," IDMS '96 (European Workshop on Interactive Distributed Multimedia Systems and Services), Berlin, Germany, pp. 1-18, Mar. 4-6, 1996.
Schulzrinne, "Simple Conference Invitation Protocol," Internet Engineering Task Force, pp. 1-19, Feb. 22, 1996.
Ash, G.R., et al., "Design and Optimization of Networks With Dynamic Routing," American Telephone and Telegraph Company, The Bell System Technical Journal, vol. 60, No. 8, pp. 1787-1820, Oct. 1981.
Prosecution history of U.S. Patent No. 6,332,023, Issued, Dec. 18, 2001.
The Phone Zone, an online reference cite and catalog of PC based telephony and networking solution for business, http://www.phonezone.com/index2.htm, Oct. 29, 1996.
"IDT's Net2Phone Launches Phone-to-Phone Technology Via the Internet," Press release, http://web.net2phone.com/about/press/releases/p2p.asp, Sep. 8, 1997.
"Vocaltec's telephony gateway—the ultimate internet telephony solution?," Computer Telephony, pp. 30, Sep. 1996.
Cheriton, David R., "Dissemination-Oriented Communication Systems: Final Report," ARPA contract No. DABT63-91-K-0001, Nov. 26, 1996.
Johnson, David B., "Scalable Support for Transparent Mobile Host Internetworking," Proceedings of the Ninth Annual IEEE Worshop on Computer Communications, pp. 1-10, Oct. 1994.
"Specifications of Signalling System No. 7," International Telecommunication Union, ITU-T Telecommunication Standardization Sector of ITU, Recommendation, Q.700, Mar. 1993.
"Integrated Services Digital Network (ISDN) I.312," CCITT The International Telegraph and Telephone Consultative Committee, ITU International Telecommunication Union, Recommendation, I.312/Q.1201, Oct. 1992.
"Interface Recommendation for Intelligent Network CS-1," International Telecommunication Union, ITU-T Telecommunication Standardization Sector of ITU, ITU-T Recommendation Q.1218, Oct. 1995.
"Series Q: Switching and Signalling," Intelligent Network, International Telecommunication Union, ITU-T, Telecommunication Standardization Sector of ITU, Recommendation Q.1218—Addendum 1, Sep. 1997.
USDC for the Eastern Distric of Virginia, Alexandria Division, "Claim Construction of the Patents-in-Suit" Civil Action No. 08-0157, dated Sep. 3, 2008.

\* cited by examiner

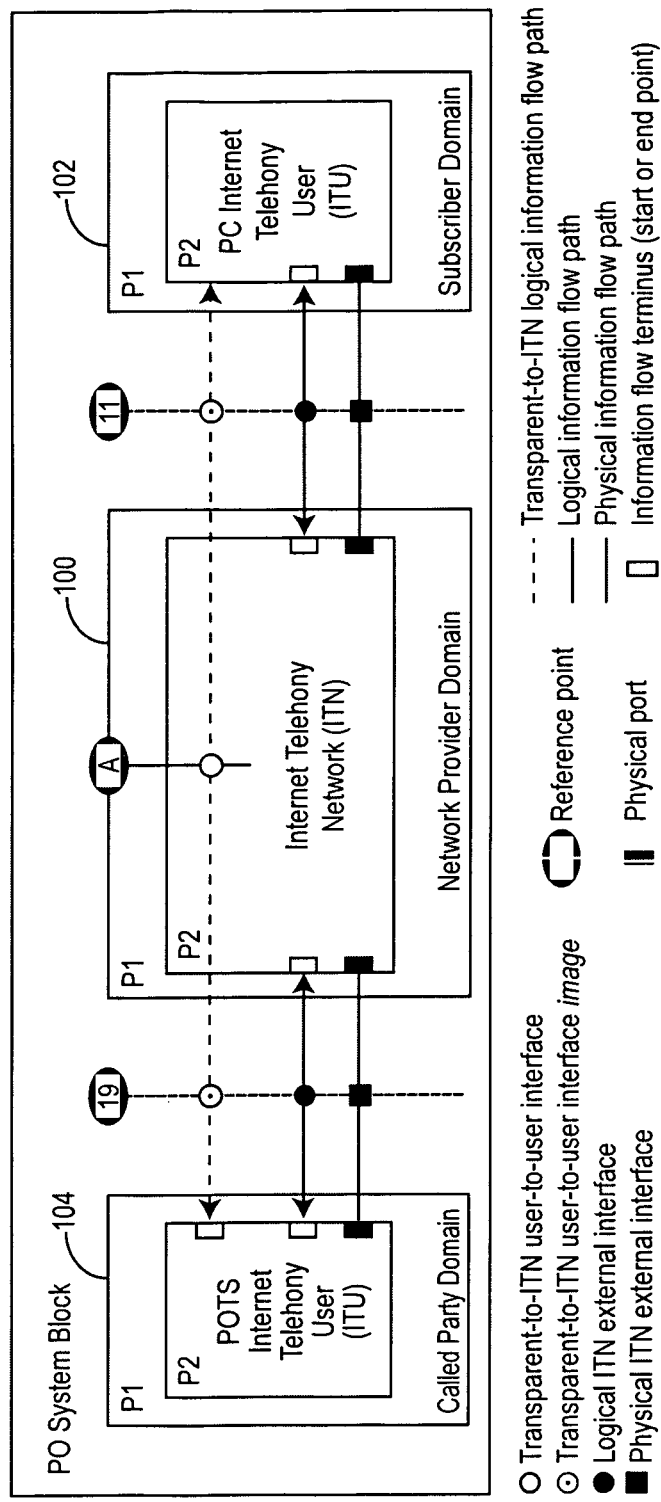

NETWORK SESSION MANAGEMENT FOR TELEPHONY OVER HYBRID NETWORKS

RELATED APPLICATIONS

This application is a continuation of U.S. patent application Ser. No. 10/979,317, filed Nov. 2, 2004, entitled "Network Session Management", which is a continuation of U.S. patent application Ser. No. 08/931,159, filed Sep. 16, 1997, entitled "Network Session Management", now U.S. Pat. No. 6,137,869, and which is a continuation-in-part application of U.S. patent application Ser. No. 08/931,480, filed Sep. 16, 1997, titled "Network Session Management", now U.S. Pat. No. 6,839,340, each of the application being incorporated herein by reference in its entirety.

FIELD OF INVENTION

This invention relates to methods and systems for managing signaling and communication sessions across networks, and particularly relates to a scalable methodology and system for managing telephony over hybrid networks such as combined switched telephone networks and packet switched internetworks, such as the Internet.

BACKGROUND OF THE INVENTION

Attention recently has been directed to implementing a variety of communication services, including voice telephone service, over the worldwide packet data network now commonly known as the Internet. The Internet had its genesis in U.S. Government programs funded by the Advanced Research Projects Agency (ARPA). That research made possible national internetworked data communication systems. This work resulted in the development of network standards as well as a set of conventions, known as protocols, for interconnecting data networks and routing information across the networks. These protocols are commonly referred to as TCP/IP. The TCP/IP protocols were originally developed for use only through ARPANET but have subsequently become widely used in the industry. TCP/IP is flexible and robust. TCP takes care of the integrity, and IP moves the data.

Internet provides two broad types of services: connectionless packet delivery service and reliable stream transport service. The Internet basically comprises several large computer networks joined together over high-speed data links ranging from ISDN to T1, T3, FDDI, SONET, SMDS, ATM, On, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries. However, since then it is estimated that the number of Internet users continues to double approximately annually.

In simplified fashion the Internet may be viewed as a series of packet data switches or 'routers' connected together with computers connected to the routers. The Information Providers (IPs) constitute the end systems which collect and market the information through their own servers. Access providers are companies such as UUNET, PSI, MCI and SPRINT which transport the information. Such companies market the usage of their networks.

FIG. 3 shows a simplified diagram of the Internet and various types of systems which are typically connected. Generally speaking the Internet consists of Autonomous Systems (AS) type packet data networks which may be owned and operated by Internet Service Providers (ISPs) such as PSI, UUNET, MCI, SPRINT, etc. Three such AS/ISPs appear in FIGS. 3 at 310, 312 and 314. The Autonomous Systems (ASs) are linked by Inter-AS Connections 311, 313 and 315. Information Providers (IPs) 316 and 318, such as America Online (AOL) and CompuServe, connect to the Internet via high speed lines 320 and 322, such as T1/T3 and the like. Information Providers generally do not have their own Internet based Autonomous Systems but have or use Dial-Up Networks such as SprintNet (X.25), DATAPAC and TYMNET.

By way of current illustration, MCI is both an ISP and an IP, SPRINT is an ISP, and the Microsoft Network (MSN) is an IP using UUNET as an ISP. Other information providers, such as universities, are indicated in exemplary fashion at 324 and are connected to the AS/ISPs via the same type connections here illustrated as T1 lines 326. Corporate Local Area Networks (LANs), such as those illustrated in 328 and 330, are connected through routers 332 and 334 and high speed data links such as T1 lines 336 and 338. Laptop computers 340 and 342 are representative of computers connected to the Internet via the public switched telephone network (PSTN), and are shown connected to the AS/ISPs via dial up links 344 and 346.

In the addressing scheme of the Internet, an address comprises four numbers separated by dots. This is called the Internet Protocol address, or IP address. An example of an IP address would be 164.109.211.237. Each machine on the Internet has a unique number assigned to it which constitutes one of these four numbers. In the IP address, the leftmost number has the greatest weight. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router.

When a packet bearing a destination address leaves the source router, the router examines the first two numbers in a matrix table to determine how many hops are the minimum to get to the destination. It then sends the packet to the next router as determined from that table, and the procedure is repeated. Each router has a database table that finds the information automatically. This continues until the packet arrives at the destination computer. The separate packets that constitute a message may not travel the same path depending on traffic load. However, they all reach the same destination and are assembled in their original order in a connectionless fashion. This is in contrast to connection oriented routing modes, such as frame relay and ATM or voice.

It would be difficult for most people to remember the four separate numbers (sometimes having ten or more digits) comprising each numeric IP address. In addition numeric IP addresses occasionally change, making it even more of a problem for people to keep track of them. The Domain Name System (DNS) was developed to provide some relief from these problems. In the DNS system words, which are more easily remembered, are used instead of numbers.

An example of a textual Domain Name is Evoit@HUT.MB.COM. Each of the names separated by a dot is called a domain. The significance of each of the domains is the reverse of that of the numeric IP address. In the numeric IP address, the most significant numbers were on the left and the least significant on the right. The textual Domain Name System begins with the least significant on the left and proceeds to the most significant on the right.

The top-level domains, those of the most general significance, are as follows:

1. COM A commercial operation
2. EDU A university, college or other educational institution
3. GOV A government organization
4. MIL A military site
5. ORG Any organization that does not fit into any of the preceding
6. NET A network There are now two-letter domains, each denoting a different country, which are atop the above original domain names. An address ending in "COM.AU," for example, would be a commercial operation in Australia. Over a hundred different countries are now connected to the Internet so the list of two-letter country codes is ever increasing. Computers associated with the Internet called domain name servers convert textual domain names into numeric IP addresses.

Recently, one or more companies have developed software for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line, in some cases as low as 2.4 kbits/s. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers.

Such programs have relied on servers coupled to the Internet to establish voice communication links through the networks. Each person active on the network, who is willing to accept a voice call, must register with a server. A calling party can call only those persons registered on the voice communication server. Also, the address management provided by these servers, like that provided by the domain name servers, has not permitted any individualized control of routing. For example, a user could register only one current address and must reregister each time the user comes on-line with a new address. The registration server provides no automatic selection of alternate destinations.

Concurrent with recent developments in public packet data communications such as the Internet, outlined above, the telephone industry has been developing an enhanced telephone network, sometimes referred to as an Advanced Intelligent Network (AIN), for providing a wide array of new voice grade telephone service features. In an AIN type system, local and/or toll offices of the public telephone network detect one of a number of call processing events identified as AIN "triggers". For ordinary telephone service calls, there would be no event to trigger AIN processing. The local and toll office switches would function normally and process such calls without referring to the central database for instructions. An office which detects a trigger will suspend call processing, compile a call data message and forward that messaae via a common channel interoffice signaling (CCIS) link to a database system, such as an Integrated Service Control Point (ISCP). Each ISCP includes a Multi-Services Application Platform (MSAP) database.

If needed, an ISCP can instruct the central office to obtain and forward additional information. Once sufficient information about the call has reached the ISCP, the ISCP accesses its stored data tables in the MSAP database. Using those tables it translates the received message data into a call control message and returns the call control message to the switching office of the network via CCIS link. The network switching offices then use the call control message to complete the particular call. An AIN type network for providing an Area Wide Centrex service, for example, was disclosed and described in detail in commonly assigned U.S. Pat. No. 5,247,571 to Kay et al., the disclosure of which is entirely incorporated herein by reference.

As shown by the art discussed above, the Internet and the AIN have remained separate, independent areas of technical development. Many telephone service subscribers are accustomed to enhanced telephone features, such as those provided by AIN processing. However, the wide range of conditional routing options offered by AIN type processing have not been available on the Internet. For example, the address processing provided by the domain name servers and the registration servers used to exchange addresses for voice communication have not permitted alternate treatments for different times, different calling parties, different destinations of roaming subscribers, etc. An enhanced domain name server which enables conditional routing and which is capable of wide database applications was disclosed and described in detail in the above-referenced parent Eric A. Voit U.S. application Ser. No. 08/812,075.

As use of the Internet expands, particularly for transport of voice telephone communications, a need exists not only for enhanced address management but also for distributed and scalable customer account authentication, authorization, usage recording, usage pricing billing account management, and inter carrier interfaces. The enhanced domain server described in the above incorporated Voit application Ser. No. 08/812,075 lends itself to serving in this capacity.

Voice over internetworks, and particularly the Internet (V/IP), involves terminal equipment affiliated with various networks. V/IP services can be divided into at least four categories based on the type of network to which the users' terminal equipment is attached, such as Internet/Intranet or narrowband Public Switched Telephone Network (PSTN) or POTS (plain old telephone service) telephone network. These four categories are:
1. Personal Computer (PC)—PC
2. PC—Telephone
3. Telephone—PC
4. Telephone—Telephone Existing V/IP implementations over the Internet are subject to best-effort quality of service (QoS).

Typically, this is noticeably degraded as compared to "toll quality" service. In addition, it is subject to significant variations. There is a need for improvement over these existing implementations both in level and consistency of QoS. The QoS should be such as to be perceived by end users as consistently supporting comfortable conversation similar to that which users are accustomed. Preferably the QoS should be equivalent to "toll quality" voice service.

Residential and business customers on the PSTN are accustomed to the availability of enhanced calling features and it is desirable to provide personal dialing directories, ability to use multiple point to point connections at the same time, multi-line conferencing capabilities, and full duplex operation. Authorization and security features should be supplied, as well as user access to billing and usage accounting relating to their own accounts.

DISCLOSURE OF THE INVENTION

It is a primary objective of the present invention to satisfy the needs which have been described.

The present invention addresses those needs by providing a robust and scalable customer account management database within the packet switched network. This database may act as manager of all transactions for a particular customer account. Each Internet telephone service subscriber will have at least one billing and authorization account maintained in a database on the Internet. During set-up of a call, the hop-off gateway will obtain identification and password information from the caller. The gateway then communicates with the database to determine if the call is authorized and to negotiate the overall billing algorithm. When the call is finished, the gateway will report usage data to the database for billing purposes.

Another objective is to provide an overall internetwork architecture that will permit the development of Internet Telephony Gateways (ITGs) capable of dealing with existing problems on a scalable basis. For example, in view of the fact that there is no "originating switch" to generate billing records for an internetwork caller, there is no present system for providing a generation site which will implement a unitary presentation of customer account usage, and also support extraction of data from the network on a real time basis. There is no present architecture or methodology to provide for customer access to his/her account or accounts records without intermixing requests for account information with requests for implementing services. Such an intermixing would subject the fulfillment of services to the traffic load of information requests and vice versa. There is no present architecture for ensuring customer authentication and billing beyond a limited number of customers.

It is another objective of the invention to implement a system to inform a customer of the pricing rules for a call prior to call connection and to report the price of the call in real time visually or orally.

It is another objective of the invention to provide customers with ready access to information in their account records without allowing the customer to access the account database which is used in implementing services, or updating or maintaining or storing such databases.

It is yet another objective of the invention to provide a system to implement the handling of multiple, concurrent calls terminating at different ITGs using the same billing account number and preventing overrun of a preset account spending limit.

It is another object of the invention to provide an architecture which will provide downloading of billing data to external service providers in isolation from the account information maintained and utilized in implementing Internet voice telephony.

It is a still further objective of the invention to ensure that such a system will operate properly in situations where the ITG is owned by a different company than the owner of the customer account.

It is another objective of the invention to provide a mechanism for reducing the potential for fraud.

According to the invention usage recording, pricing, and authorization are bundled into one logical object. This eliminates the separation between authorization and billing processes and significantly reduces the potential for fraud in a regionally deployed system. By having a single logical database which is managing customer authentication, authorization, and usage pricing for the overall network, a transaction-based approach to updating data is possible. This minimizes opportunities for fraud based on exploitation of temporary inconsistencies of partitioned or replicated data bases. There is no requirement that this logical object be implemented as a single physical system.

The single logical element or object is invoked during a call when an authorization request is received. This request may consist of an account number and password provided by a PC user to be authenticated. At this point the logical database processor checks the account password and available account balance. If the password is correct and the remaining balance in the account permits the call to be established, the object responds affirmatively to the Internet Telephony Network (ITN) Call Control Object which includes the Internet Telephony Gateway (ITG). The database retains data indicating that a call associated with that account is in progress. In such an architecture mutual authentication by the Call Control Object and ITG and the database is preferable, as is a secure (such as by encryption) call transaction between them.

In providing the authorization, the database object will evaluate the customer account status to determine if there are multiple connections currently in service, possibly across multiple ITGs. With this state information, the authorization function of the system may ensure that only one call per account is being handled by the network, and/or ensure that the maximum billing limit is not being circumvented by multiple concurrent sessions. In the absence of such a precaution, a second PC caller using the same account and password might receive authorization for a call prior to the posting of the first caller's usage record. Optionally, in order to handle low billing amount availability without denying a call completely, the database object may respond to the ITN with a maximum allowable call duration.

Another feature is that the database object may reserve a predetermined remaining balance on the account for the call so that additional calls related to that account will not result in exceeding the account's limit. The database object may return the pricing algorithm for the usage to the Call Control Object and ITG, which will pass it on to the PC user. In this way the PC user knows the initial charge and ongoing per minute rate for the usage. This is particularly important when the Call Control Object and ITG is owned by a different company than the database object. The user desires to know the rates that will be charged prior to completing the call. The PC is such as to be able to receive and utilize the algorithm, and display pricing to the PC user. The PC may also present the total charge being incurred by the user on a real time basis as the call progresses.

After the completion of the call, the database object is also responsible for accepting usage recording data which has been generated by the Call Control Object and ITG, pricing the usage, and decrementing that priced amount from a customer's available balance. The database object then logs the final call data. Preferably the Call Control Object and ITG also logs and maintains the call detail information. This feature is very useful in the situation where the Call Control Object and ITG and the database objects are owned by different companies. In this case, the database object data can be used by the owner of the database object to manage the customer account. In addition, the Call Control Object and ITG data can be used by the owner of the Call Control Object and ITG to charge the database object for the completion of the call over its facilities. In effect this Call Control Object and ITG data becomes the basis for a usage based settlement interface between carriers.

Preferably the database object is partitioned and may be distributed. A database object partition may be made by a field identifying the carrier owning the customer account, a subfield within the customer account number (such as NPA-NXX), the customer's telephone number, the customer's e-mail domain name, the customer's originating IP address, or some other field. Each partitioned database may then be placed on its own physical system. With such a partitioned customer account data architecture, it becomes possible to divide the totality of all managed accounts into implementable sub-groups in a straight forward manner.

It is an objective of the invention to provide a code based means of querying a distributed database of codes which allows automatic accessing of the pertinent physical instance of the database for approval.

It is another objective of the invention to provide such a database and functionality on a scalable basis.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 1A is a high level (partition 1 level) diagram of a PC to Phone Internet Telephony architecture of one embodiment of the system of the invention.

BEST MODE FOR CARRYING OUT THE INVENTION

Referring to FIG. 1A there is illustrated a high level (partition 1) reference model of the Internet Telephony Network or ITN. The center block 100 is the Internet Telephony Network or ITN, is shown in this illustration as managing a customer call between a PC and a POTS telephone. This ITN is in the Network Provider Domain and is responsible for all functions required of a traditional POTS network, i.e., call set-up, usage accounting, surveillance, etc. The ITN spans both the circuit switched network (such as a Public Switched Telephone Network or PSTN) and the packet switched (Internet Protocol or IP—frame relay, etc.) networks. The PC Internet Telephony User (ITU or computer or PC user) is shown at 102 in the Subscriber Domain and the called POTS Internet Telephony User (ITU or telephone user) is shown at 104 in the Called Party Domain. The interface between the PC user and the ITN is designated I1, while the interface between the POTS user and the PSTN is designated I9. I9 represents a standard analog or digital telephone interface.

Figure 1B:
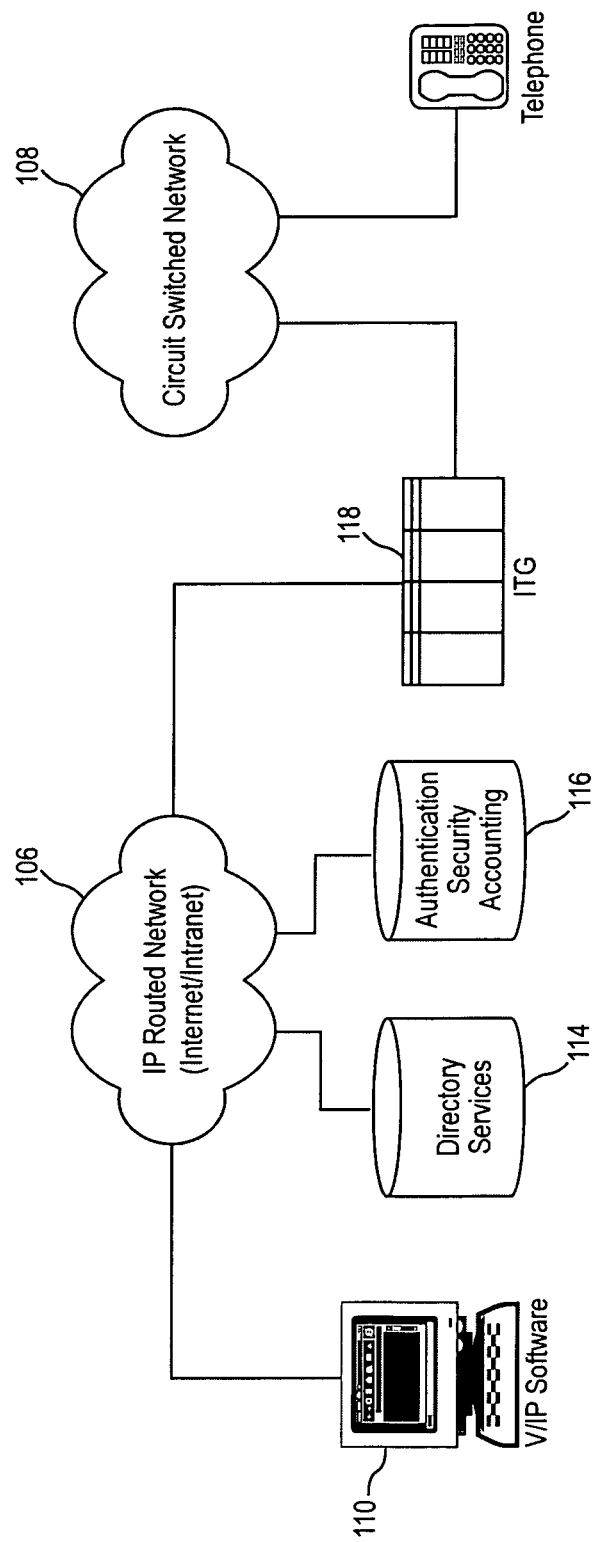
FIG. 1B is another simplified high level diagram of the generic system.

FIG. 1B shows a different high level depiction of the generic system wherein the packet switched and circuit switched networks are separately shown at 106 and 108. In this figure the end-to-end system connects a laptop computer 110 and a telephone 112. These constitute respectively the PC user call control object U1 and the U3 POTS U1 service user, as is presently described in further detail in relation to FIG. 2. The directory services object 114 and authentication and security accounting object 116 are coupled to the packet switched 12 routed network 106. These constitute respectively the C1 ITN directory object and the C3 authorization, usage recording and pricing object, as presently described in further detail.

The Internet Telephony Gateway or ITG 118 connects the packet switched and circuit switched networks. This is sometimes referred to herein as the C2 ITN call control object. The computer may be linked to the packet switched network via any available computer to Internet link. Similarly the connection between the circuit switched network and the telephone may be any of the conventional links including POTS.

Figure 2:
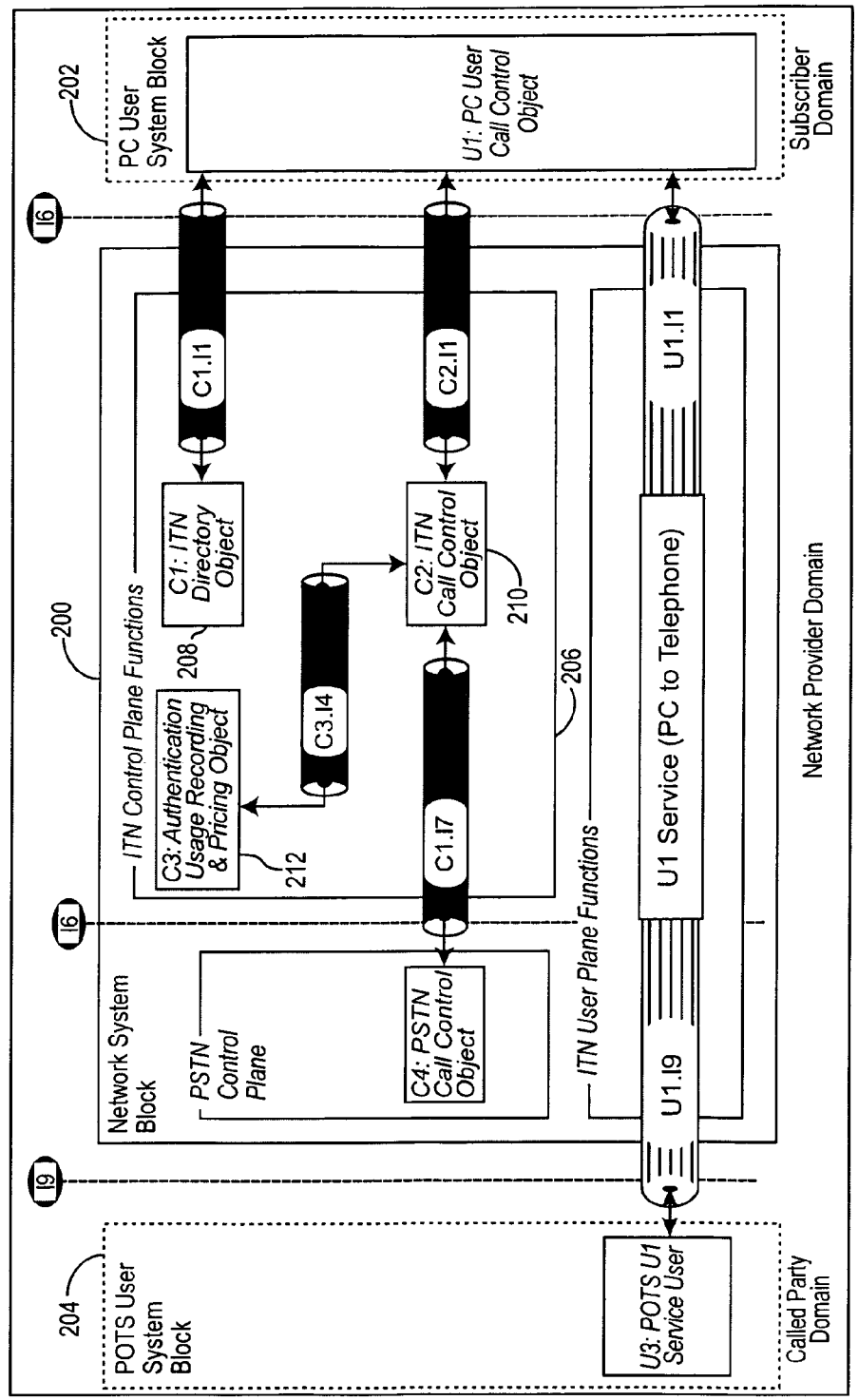
FIG. 2 is a diagram of one embodiment of a preferred architectural implementation showing interfaces between IP network elements.
Figure 3:
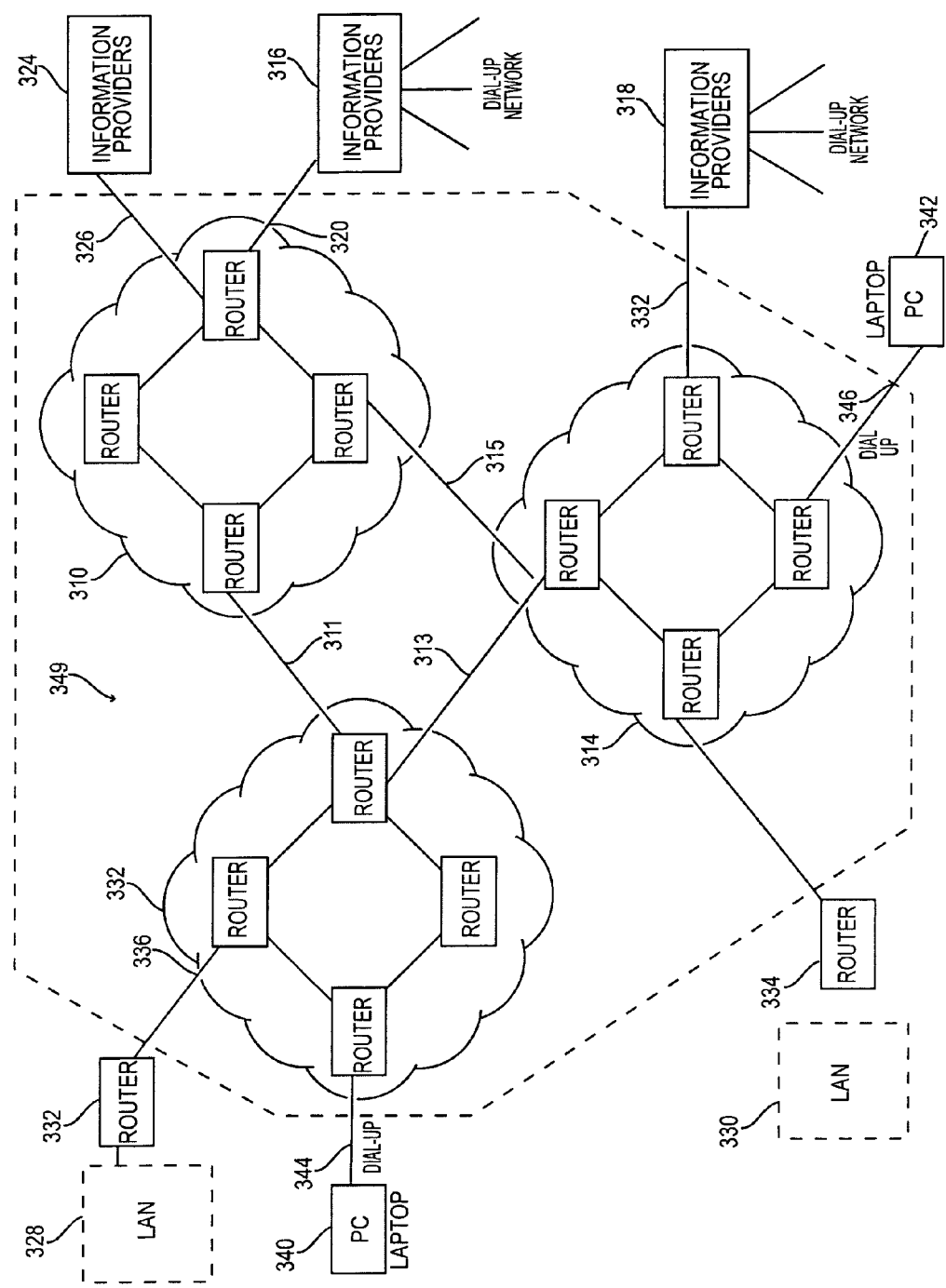
FIG. 3 shows a simplified diagram of the Internet and various types of systems typically connected thereto.

In order to manage a call across the circuit switched and packet switched and packet switched networks, it is necessary to provide an architecture, a set of interfaces, and a call flow. FIG. 2 is a diagram showing the interfaces between IP network elements in one architectural implementation. Referring to that figure there is shown at 202 the PC user System Block in the subscriber domain, which includes the U1 PC User Call Control Object. At 200 there is shown the Network System Block or network provider domain, which includes the PSTN Control Plane and C4 PSTN Call Control Object. At 204 there is shown the POTS User System Block or called party domain, which includes the U3 POTS U1 Service User. Within the Network System Block the ITN Control Plane functions are illustrated at 206. The ITN Control Plane functions are those which establish and tear-down communication paths across the User Plane. Three Control Plane Objects are illustrated, namely:

C1: The Internet Telephony Gateway Directory Object
C2: The Internet Telephony Call Control Object
C3: The Internet Telephony Authorization and Usage Recording Object These objects are shown respectively at 208, 210, and 212. Not shown in this figure is the PSTN Call Control Object C4 since neither the PSTN network elements nor the PSTN protocols are modified by the ITN system.

The C3 object represents the network element required in this architecture to perform customer authentication, call authorization, usage accounting, and usage pricing for a particular PC user's customer account. By bundling usage recording, pricing, and authorization into this one logical object, it is possible to eliminate the conventional separation between authorization and billing processes and significantly reduce the potential for fraud in a regionally deployed system. By having a single logical database which is managing customer authentication, authorization, and usage pricing for the network, a transaction-based approach to updating data is possible. This minimizes opportunities for fraud based on exploitation of the conventional temporary inconsistencies which are encountered with partitioned or replicated data bases. There is no requirement that this unitary logical object be implemented as a single physical system. Although not shown in FIG. 2, C3 can also respond to real time requests from external OSS systems for usage record details and account status information for the customer account.

The C3 object ensures coordination between User Authorization and Usage Recording for a single PC user's customer account. C3 also responds to external requests for that information.

According to the invention the C3 object is implemented in a manner such that multiple sites maintain their own database servers and no single site on the Internet is in possession of all of the authentication, authorization, usage pricing, and account data. The overall data constitutes a distributed database which forms a unitary logical object which relies on the database servers at the individual sites. Operation is such that a local C3 database or server receives a request for data. If the local server database cannot locate the requested information it sends a request to a second database server asking it to locate the information and send the results back to the requester. The second database server locates the information and sends a message to the requester. If the second database server cannot locate the information in its database it (or the local server database) sends a similar request to the next database server until the desired information is located. Alternatively, the account number may be coded so as to indicate the proper database instance. Database servers with this capability are described in detail in the common assignee's copending Sistanizadeh application Ser. No. 08/634,544, filed Apr. 18, 1996. That application is incorporated by reference herein in its entirety.

The C3 object is invoked during a call when an Authorization request is relayed over the interface C3.I4. This interface is responsible for allowing an authorization of ITG usage by a service subscriber, and for maintaining the current state of a subscriber's connections within C3, as well as passing ITG generated usage records from C2 to C3 in real time. Communication through the C3.I4 interface is preferably encrypted and secure. The authorization request relayed over C3.I4 typically consists of an account number and password provided by the PC User to be authenticated by C3. At this point, C3 checks the account password and available account balance. If the password is correct and the account remaining balance permits the call to be established, then C3 responds affirmatively to C2. C3 also retains data indicating that a call associated with that account is in progress. In such an architecture, mutual authentication of C2 and C3, and a secure transaction between them is preferred.

In providing the authorization, C3 evaluates the customer account status to determine if there are multiple connections currently in service (possibly across multiple ITGs). It should be appreciated that while FIG. 2 shows only a single gateway between a PC user and the ITN (via the PSTN), a plurality of gateways exist serving the various regional areas from which subscribers may request service. With the state information obtained from the C3 status evaluation the authorization system may ensure that only one call per account is being handled by the network, and/or ensure that the maximum billing limit is not being circumvented by multiple concurrent sessions. If this precaution is not provided a second PC caller using the same account and password might receive authorization for a call prior to the posting of the first caller's usage record. Optionally, in order to handle low billing amount availability without denying a call completely, C3 can respond to C2 with a maximum allowable call duration.

Another feature is that C3 may reserve a certain remaining balance on the account for the call so that additional calls related to that account will not result in exceeding that account's limit. C3 may return the pricing algorithm for the usage to C2 which will pass it on to the PC user. In this way the PC user knows the initial charge and ongoing per minute rate for the requested usage. This is particularly important when C2 is owned by a different company than C3, and the user wants to know the overall rates that will be charged prior to completing the call. The PC is such as to be able to receive and utilize the algorithm, and display pricing to the user. The PC is also able to present the total charge being incurred by the user as time goes on during the call.

After the completion of the call, the C3 object is also responsible for accepting usage recording data from C2, pricing the usage, and decrementing that priced amount from a customer's available balance. C3 then logs the final call data. Preferably C2 also logs and maintains the call detail information. This feature is very useful in the situation where C2 and the C3 database objects are owned by different companies. In this case, the database object data can be used by its owner to manage the customer account. In addition, the C2 data can be used by the owner of the C2 object to charge the C3 database object for the completion of the call over its facilities. In effect this C2 data becomes the basis for a usage based settlement interface between carriers.

Preferably the C3 system is partitioned. Such a partition may be made by a field identifying the carrier owning the customer account, a sub-field within the customer account number (such as NPA-NXX), the customer's telephone number, the customer's e-mail domain name, the customer's originating IP address, or some other field. Each partitioned database may then be placed on its own physical system on a geographical or other basis. With such a partitioned customer account data architecture, the domain of all managed accounts may be divided into efficiently implementable subgroups.

Figure 4:
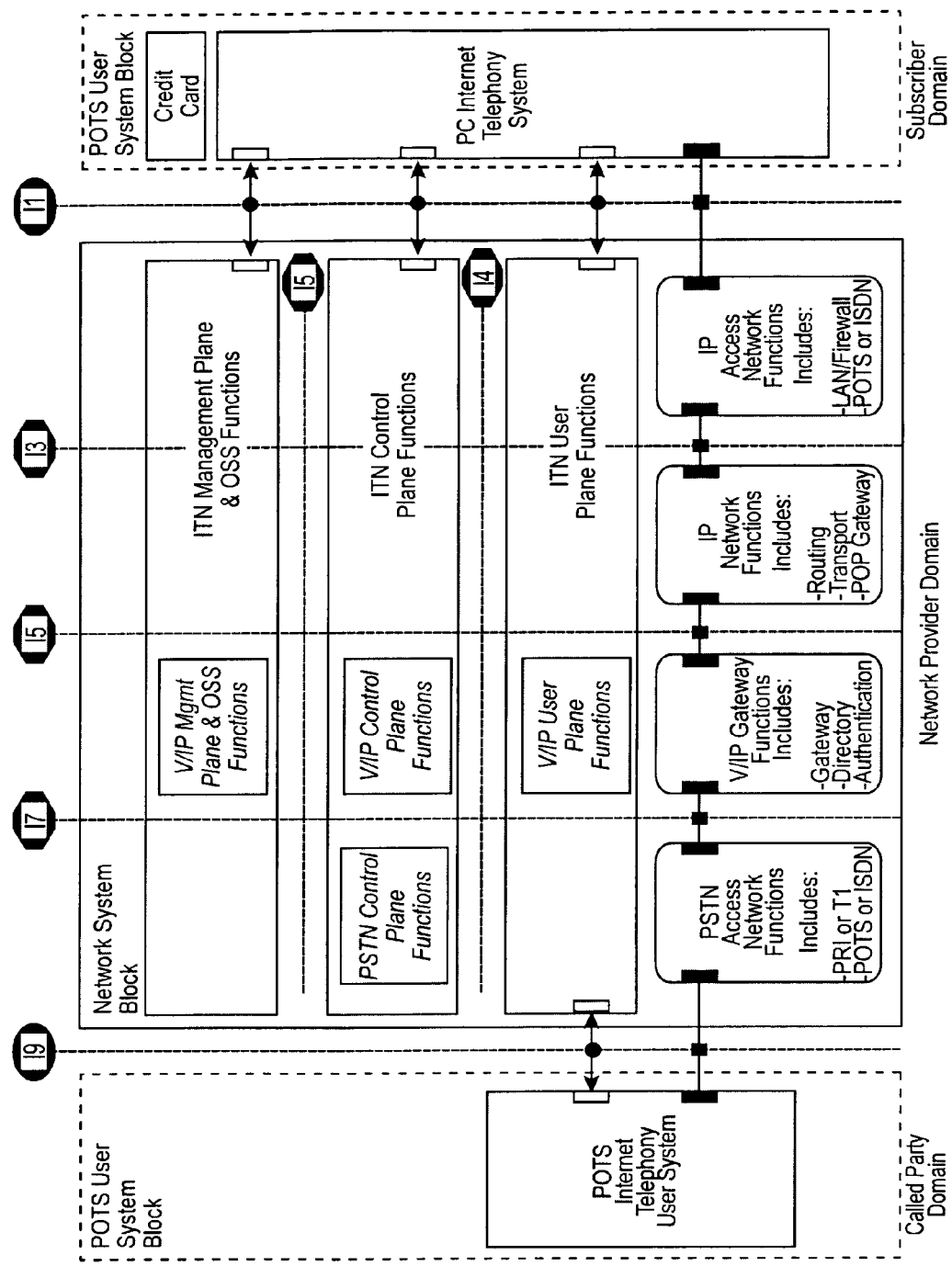
FIG. 4 is an Internet Telephony Network (ITN) block diagram showing the ITN system at a second level of partitioning (partition 2 level).

Referring to FIG. 4 there is provided an illustration of the ITN system at a second level of partitioning. Within this partitioning there are three planes (types of processes which span all the network elements involved with a service), and four types of network functions (domains of individual transport networks (e.g., PSTN or IP) over which communication must cross).

The three planes are:

The ITN User Plane Functions: These functions are those which are directly involved with real time communications transport and signal manipulation within a network.

The ITN Control Plane Functions: These are the functions which establish or set-up and tear-down communication paths across the User Plane.

The ITN Management Plane and Operations Support Systems Functions (OSS): These are the functions needed to provision and maintain the elements of the User Plane and Control Plane.

The four network functions are:

IP Access Network Functions (right or PC User Side): The IP access network is used locally on the PC user side simply to reach the IP network. This access may be direct via a LAN, or over a circuit switched PPP link connected to a Point of Presence (POP).

IP Network Functions: The IP network is the involved Intranet backbone and associated support systems (such as the DNS), this network provides the IP transport functions.

V/IP Gateway Functions: These are the network functions (and elements) which are involved primarily with supporting a Voice over IP service.

PSTN Access Network Functions (POTS User Side): The PSTN access network consists of the traditional PSTN connecting the Internet Telephony Gateway (ITG) to the called telephone user.

Figure 5:
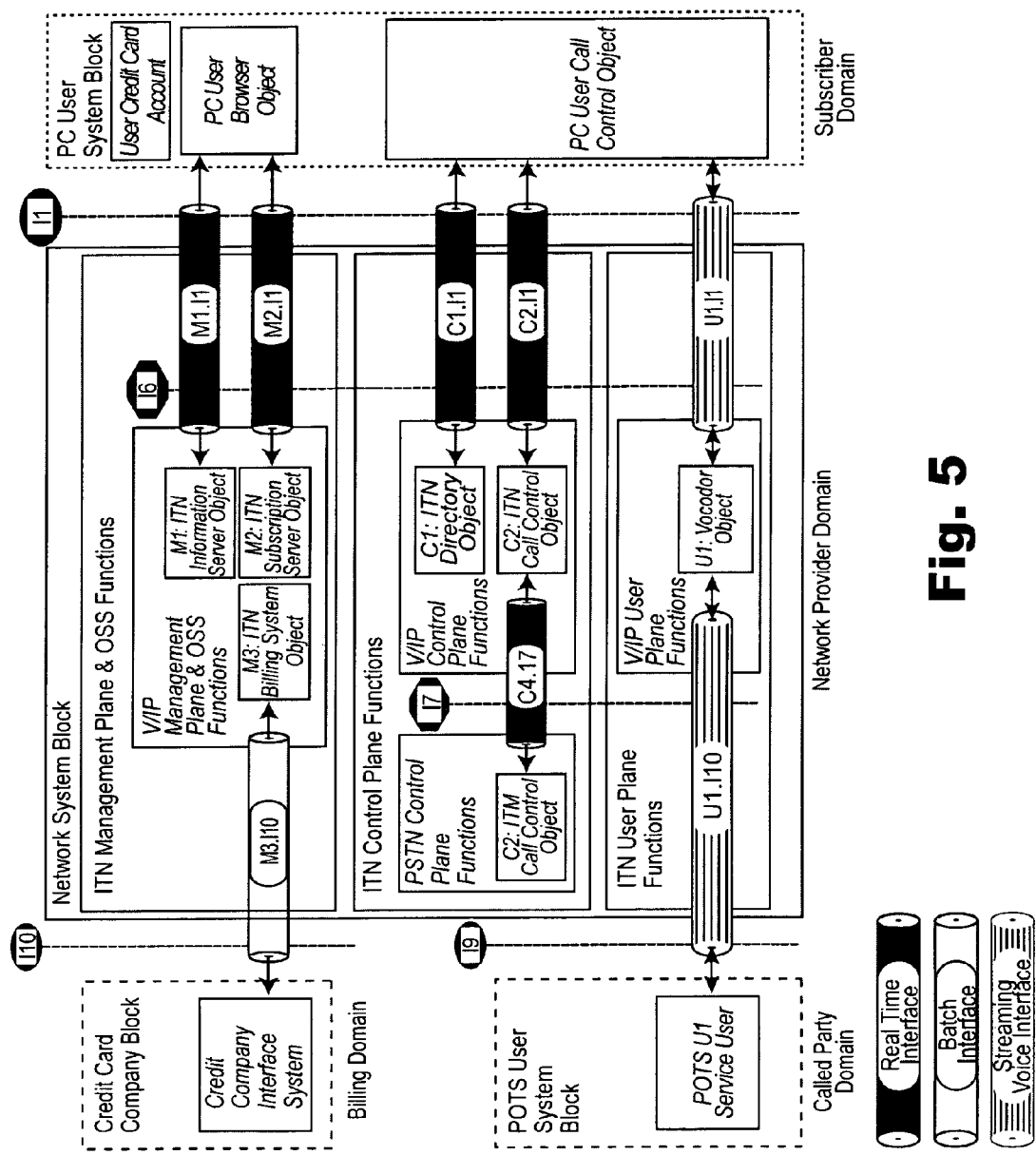
FIG. 5 illustrates the V/IP objects and interface relationships between users and the network, including external objects and interfaces.

The V/IP Gateway Functions and relationships to the other elements involved with the V/IP service are now described in relation to FIGS. 4 and 5. FIG. 4 illustrates interface references defined between the different User Planes and the different Network Functions. Although this partitioning has been done at the logical level, it is not necessary that physical systems be partitioned in this manner. As an example, an Internet Telephony Gateway may have functions spanning both the Control Plane (call setup) and User Plane (Vocoding).

The internal interface references designated within FIG. 4 are:

1. The interface between the Control Plane and the Management Plane functions is shown at I5. Management functions such as directory table maintenance, surveillance, and periodic billing exports cross the I5 interface.

2. The interface between the User Plane and the Control Plane Functions is shown at 14. Interfaces between various elements of the Control Plane are also designated as 14.

3. The interface between the V/IP Gateway and POTS Access Network is shown at 17.

4. The interface between the IP Network and the V/IP Gateway functions is shown at 16.

5. The interface between the IP Network and the PC Access Network is shown at 13.

6. For the sake of simplicity, one additional interface of lower utilization, 110, is not shown in FIG. 4. This interface is an external billing interface to a credit card provider and is shown and detailed in FIG. 5.

FIG. 5 illustrates the V/IP objects and interface relationships between users and the network, including external objects and interfaces. An object is a major process which has been identified within the functional specifications of the system. An interface is a communications path between two objects. External objects are objects which use interfaces that span between different network functions. By defining external objects and interfaces in this way, the V/IP system elements can be defined based on any communication which might be made across interfaces 16, 17, and 110 as shown in FIG. 5.

FIG. 5 shows a second level of partitioning illustrating the user, control and management planes within the network. Only those objects attached to a new or modified object for the V/IP service are shown. Other previously shown objects required for V/IP in the IP Management and Control Planes between I6 and I3 are not shown. The U1 PC to Phone service is a user plane service which is shown and defined in FIGS. 5 and 6.

Figure 6:
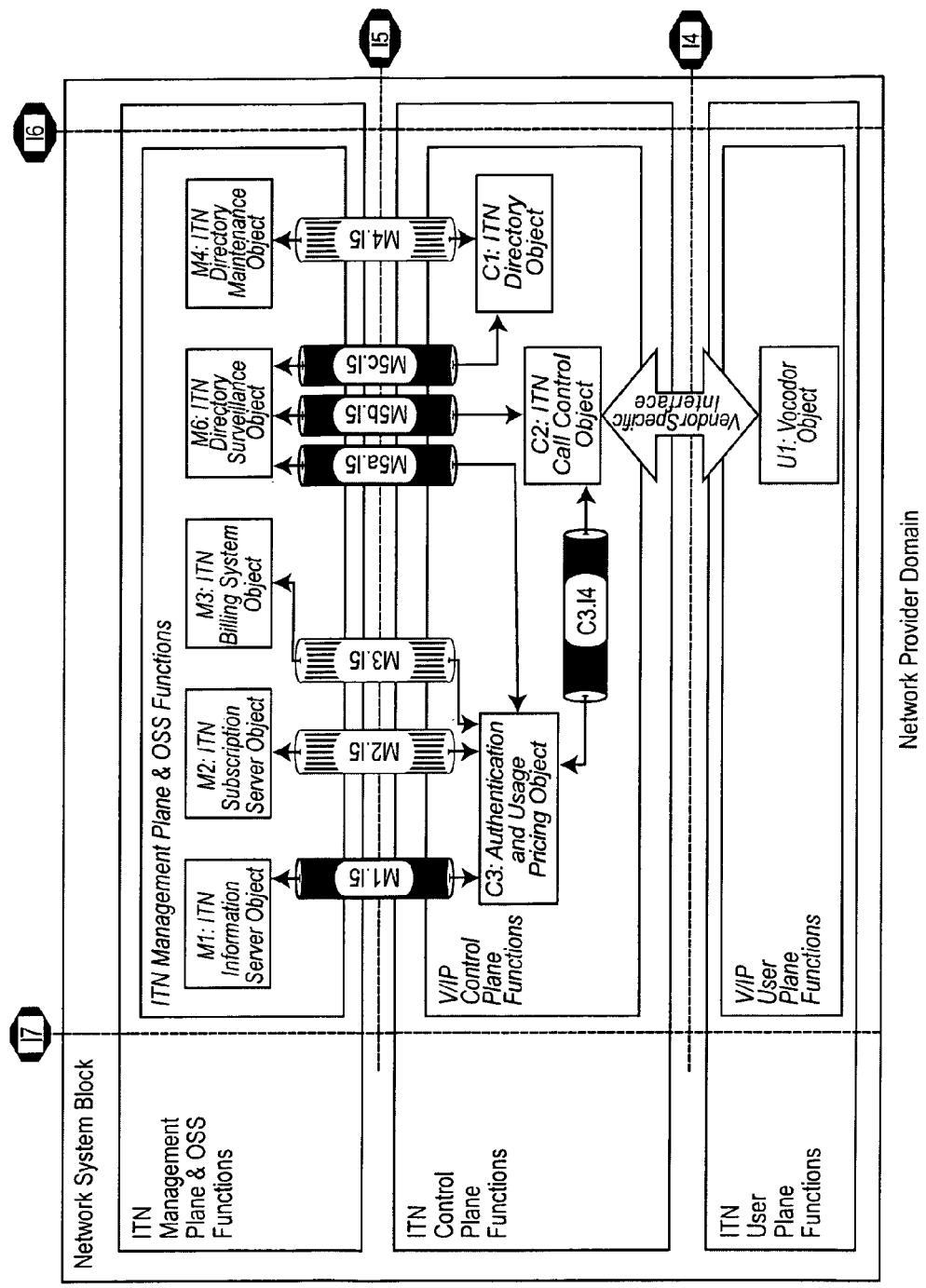
FIG. 6 illustrates the V/IP objects and interface relationships which have been defined between internal ITN objects.

FIG. 6 illustrates the V/IP objects and interface relationships which have been defined between internal ITN objects. Again only those objects or interfaces that are new or modified for V/IP are shown. Multiple objects may be contained within a single physical entity, and this physical entity may cross several planes.

The more significant objects and interfaces are now described in further detail.

ITN objects are considered to be partitions of the ITN processing requirements into sub-systems. A definition of ITN platform objects in this way, independent from protocol or message set constraints, provides a logical view of the system independent of those constraints.

User Plane Objects

U1 Object: Vocoder

The U1 Object converts packetized voice segments (which are encapsulated with IP) to and from circuit switched voice segments (which are encoded in Pulse Code Modulation (PCM)). The Vocoder performs various functions in order to accomplish this. It buffers a certain amount of packetized voice segments in order to maintain a continual flow on the circuit switched network. It dynamically assesses the delay characteristics of the transport network between the Vocoder and the User's software application in order to minimize those buffer requirements.

The Vocoder is able to handle all ITG ports in service, with all participants (on both sides of each call) talking at the same time. The Vocoder also identifies the level of packet loss resulting from voice transport across the IP network and maintains a record of that packet loss for summary reporting. Based on the level of packet loss, the Vocoder applies corrective algorithms to the voice wave form so that the resulting loss of signal quality is minimized for the called PSTN party.

The U1 Object is able to identify a loss of voice content packets, or a continuous stream of format errors in the encoded voice data incoming on the U1.I1 and U1.I10 interfaces (see FIG. 5). If such a condition is found and there has been no corresponding signaling at the control plane level, U1 will notify C2 to pull down the connection and perform any necessary clean up tasks.

User Plane Interfaces

Two user plane interfaces are defined:

External Entity to V/IP User Plane

1) U1.I1: The Internet Telephony Packetized Voice Interface is an external interface which is responsible for transporting Vocoded, packetized voice segments across the IP Access Network and IP Network.

2) U1.I10: The Circuit Switched Voice Interface is an external interface responsible for transporting PCM voice segments across the PSTN.

Control Plane Objects

Three control plane objects are defined:

1) C1: Internet Telephony Gateway Directory Object
2) C2: Internet Telephony Call Control Object
3) C3: Internet Telephony Authorization and Usage Recording Object (Internal)

The C1 Object: The Internet Telephony Gateway Directory manages which E.164 addresses (telephone numbers) are served within the terminating footprint of a particular ITG. The management of the terminating footprint may be in the form of NPA-NXX ranges which relate to an IP address for a single ITG. When queried with a "called" telephone number by the PC Call Control Object, the C1 object returns the IP address of the Internet Telephony Gateway (ITG) that serves the called telephone number.

The IP address of the V/IP Server is communicated to the PC user or Client software application prior to initiating contact with the C1 object. The object's TCP port number for the C1 directory application is defined, selected, and maintained within the client software.

The C2 Object: Internet Telephony Call Set-Up may be described as follows:

The ITN (ITG) communicates with the PC user to establish a PC-to-Telephone call. The call setup is originated by the PC user and destinated or terminated by the telephone user by supplying the address or number of the called terminal. However, it is the C2 Object or Call Control Object which coordinates the signaling among the involved network elements. Included in this signaling are:

Management of the state of the call with the client PC software (via C2.I1 shown in FIG. 5).

Validation of a PC users' Account number and password (via C3.I4 shown in FIG. 6).

Establishment and tear down of the PSTN circuit (via C4.I7 shown in FIG. 5).

Generation of usage information which is sent for processing and pricing (via C3.I4 shown in FIG. 6).

Managing the state of the connection within C3 (via C3.I4 shown in FIG. 6).

When initiating a V/IP call, the PC user may be required to provide the 10 digit E.164 (ITU-T telecommunication numbering or telephone number) address of the called telephone user, the IP address of the ITG associated with the called telephone user (obtained via the C1 Object), the PC's IP address, as well as the billing account number and associated password.

The C2 object is able to signal various states of a connection (ringing, busy, etc.) to a PC user. If the C2 object receives a maximum call duration from C3 during call set-up, this maximum call duration is sent to the PC software either as an audio message or as information to be presented on the PC screen. C2 generates the raw usage records which are sent to C3. A usage record is not tagged as billable unless the PC application has acknowledged its receipt of a connection establishment message. The C2 object may require a user ID and password to be provided by the PC Client software prior to completing a V/IP call. This information is authenticated via the C3 object.

The C3 Object: User Authorization and Usage Recording

The C3 Object ensures coordination between User Authorization and Usage Recording for a single PC user's customer account. C3 also responds to external requests for that information. C3 is a unitary logical object with distributed instances. That is, physically distributed account, authorization, validation and billing databases are so arranged as to be usable as a single logical object. The data associated with a user subscriber account is typically stored in an instance of C3 which is local to the user subscriber. The C3 Object is invoked during a call when an Authorization request is relayed over C3.I4 (this request typically consists of an account number and password provided by PC User). At this point C3 checks the account's password and available monthly minutes remaining, and responds appropriately to C2. Optionally, C3 can respond to C2 with a maximum allowable minute duration for a call. Successful account validation by the C3 Object is a prerequisite to successful call establishment by the C2 Object.

The C3 Object is also responsible for accepting usage recording data from C2, and decrementing the minutes used from the available minutes (and/or optionally pricing that usage, and decrementing that priced amount from a customer's existing balance), and then logging the information. Preferably, C3 also knows the state of a users connections across multiple ITGs. With this state information, the authorization system may ensure only one call per account is being handled by the network, and/or ensure that the maximum available minute limit is not being circumvented by multiple concurrent sessions (otherwise a second PC caller might receive authorization for a call prior to the posting of the first caller's usage record).

The theory behind bundling usage recording, pricing, and authorization into one logical object is to significantly reduce the potential for fraud when the system is widely deployed. By having a single logical database which is managing customer authentication, authorization, and usage pricing for the network, data synchronization is facilitated, and opportunities for fraud are minimized. As described, it is not necessary that C3 be implemented as a single physical system. The C2 Object will provide C3 with a customer billing account number and a password (originally supplied by the PC user). The C3 Object maintains a current account "minutes remaining" balance and usage records for each user on a monthly basis. This usage information can be extracted in real time based on a request from the M1.I5 interface as shown in FIG. 6.

If a user who is requesting authorization has a low "minutes remaining" balance, and this low balance will result in a maximum call duration which is shorter than the maximum call duration typically allowed by the network, then the Authentication server will transmit a maximum call duration back to the C2 Object.

The Control Plane Interfaces

Four control plane interfaces are defined:

External Entity to V/IP Control Plane

1) C1.I1: The Internet Telephony Directory Interface is an external interface which is responsible for PC to Directory services address resolution (see FIG. 5). The client PC provides the E.164 address (telephone number) of the intended party to be called, and the Directory service returns the IP address of the appropriate hop-off. Internet Telephony Gateway.

2) C2.I1: The Internet Telephony Call Management Interface is an external interface which is responsible for PC to Internet Telephony Gateway signaling for call establishment and tear-down.

3) C4.I7: PSTN Call Management Interface is an external interface which is responsible for managing signaling to the PSTN which is necessary for the PSTN to establish and tear down circuit switched connections to the called party. Signaling from the ITG to the serving PSTN central office is preferably via PRI ISDN. Alternately, T1 E&M PSTN signaling may be used.

4) C3.I4: The Internet Telephony Authorization and Usage Recording Interface is an internal interface shown in FIG. 6, and is responsible for two functions. First the interface must allow for an authorization of ITG usage by a service subscriber. Second, the interface must maintain the current state of a subscriber's connections within C3, as well as pass ITG generated usage records from C2 to C3 in real time.

Management Plane Objects

Five management plane objects are defined and shown in FIG. 6:

1) M1: ITN Information Server & Feedback Object
2) M2: ITN Subscription Server Object
3) M3: ITN Billing System Object
4) M4: ITN Directory Maintenance Object (Internal)
5) M5: ITN Surveillance Object (Internal)

The M1 Object: The ITN Information & Feedback Server allows the PC user to access information on the V/IP service including general and user-specific information. Essentially, the M1 Object is the HTML interface to the V/IP network for subscribers of the service. Following is the information which the user might request from the ITN via HTML:

Descriptions on how to download and install client software and operate the service Descriptions of service availability and pricing plans Graphical (map) areas showing the ITG terminating footprints NPA-NXX ranges supported by the ITG terminating footprints Call usage record details (will extract the data from the control plane in real time via M1.I5)

Billing account status & balance (will extract the data real time via M1.I5)

Change of the ITN password (will verify old password and update to new password via M1.I5)

An introductory page, with links to each of the pages items listed above.

Operationally the M1 Object interface will be accessible via commercial browsers and at least a Netscape 3.0 or Internet Explorer 3.0 web browser. On any customer specific request for usage records or account balance, a PC user will have to provide within the query the same account number and password which is used for call establishment. This information will be validated by C3 when fulfilling the request.

The M2 Object: ITN Subscription Server: The ITP allows the PC user to subscribe to the V/IP service via an on-line process. Information gathered from the potential subscriber will include:

ISP (Internet Service Provider) account number
ISP email address
CPU type of PC, amount of memory
Type of sound card, microphone, and speakers
Operating System and version
Global Service Provider (GSP)
Free disk space Upon activation the subscriber will receive notification via email. This email will include instructions, the web page URLs (Uniform Resource Locator or www (World Wide Web) address) needed to get started, and an initial password (which can be changed via M1).

The M3 Object: ITN Billing System: Monthly, the M3 Object will poll C3 to extract account balances and credit card numbers in order to request payments from credit card companies. As account balances are processed by the M3 Object, failed billing attempts will be flagged in a report (either formatted as ASCII, or in a PC database product's format).

The M4 Object: ITN Directory Maintenance: Directory data (in the form of NPA-NXX ranges pointing to ITGs) will be created, validated, and managed outside of the network (away from C1, the ITN Directory Object). The M4 object is responsible for this function. M4 will accomplish this by assisting in the creation of the Directory tables in a format which can be exported directly (via M4.I5) to C1. The M4 Object preferably also supports the creation of graphical maps showing the terminating call areas supported by the ITGs. The maps and the NPA-NXX table information may be exported so that it may be presented to the user via M1. Off the shelf software products like MapInfo may be used to support the requirements of M4.

Operationally the M4 Object is able to import NPA-NXX data, along with supporting graphical central office serving area information. The object is able to graphically define ITG terminating calling areas. The M4 Object automatically generates the NPA-NXX to ITG IP address Directory table based on the graphical information provided above. The M4 Object supports multiple versions of the C1 Object Directory database.

The M5 Object: ITN Surveillance: The V/IP service may cross many network elements within the ITN. Having a centralized surveillance capability which can span multiple platforms ensure its operation. The M5 Object attempts to identify and log critical alarms, and to present these alarms to an administrative console. Such alarms may include: Whether a network based application is under distress (via an SNMP Management Information Block (MIB)), whether the system is alive and communicating with the network (via "Ping" or similar function), whether required application processes are active and if they need to be restarted (via a "ps-eaf" or similar function), whether the processes are sane (via periodic test queries to validate correct responses).

These types of problems may be analyzed by M5, and alarms generated and logged within C5 at four levels: Critical (service affecting), Major (user intervention recommended), Minor (of note), and Informational (components reporting normal operation). These alarms may be used to manage a local database containing managed objects representing the current operational state of ITN platforms and processes. Each managed object and/or platform will be assigned one of three operational states: Red (out of service), Orange (operating with degraded capabilities), and Green (operating normally). A graphical representation of the ITN network is presented to a console via a standard display package such as OpenView. Console operators have the option of directly connecting to any ITN object or system to perform troubleshooting or diagnostic operations. This connection presents the console operator with the same capabilities as a local system administrator.

With respect to M5 addressing requirements, new elements added to the ITN will have their IP addresses and their type of object identified in M5. The M5 Object will create its database of managed objects dynamically (once given the IP address or host name) via the M5x.I5 interfaces.

Management Plane Interfaces

Ten Management Plane Interfaces have been defined:

External Entity to V/IP Management Plane

1) M1.I1: Internet Telephony Data Request Interface
2) M2.I1: Internet Telephony Subscription Interface
3) M3.I10: Credit Card Provider Interface V/IP Management Plane to V/IP Control Plane 4) M1.I5: Internet Telephony Network Data Extraction Interface
5) M2.I5: Internet Telephony Subscription Management Interface
6) M3.I5: Internet Telephony Billing and Usage Extraction Interface
7) M4.I5: Internet Telephony Directory Maintenance Interface
8) M5a.I5: Internet Telephony Call Management Surveillance Interface
9) M5b.I5: Internet Telephony Authorization and Usage Recording Surveillance Interface
10) M5c.I5: Internet Telephony Directory Surveillance Interface The functions of these interfaces are as follows:

The M1.I1 Interface: The Internet Telephony Data Request external interface is responsible for providing a subscriber with data requested about the ITN in real time.

The M3.I10 Interface: The Credit Card Provider external interface is responsible for allowing an ISP to place a charge against a user's credit card account number.

The M1.I5 Interface: The Internet Telephony Network Data Extraction internal interface is responsible for providing the M1 Object with real time data regarding a subscriber's remaining minutes of use, usage records of the current and previous billing cycle, and/or calls currently in progress. The M1 Object will reformat and present this data to the subscriber who requested it.

The M2.I5 Interface: The Internet Telephony Subscription Management internal interface is responsible for managing the list of account numbers allowed to use the ITN. This interface supports several functions: an initial batch load of subscribers and initial passwords, adding or removing individual account numbers, and resetting individual passwords.

The M3.I5 Interface: The Internet Telephony Billing and Usage Extraction internal interface is responsible for performing a periodic extraction of usage records from the network.

The M4.I5 Interface: The Internet Telephony Directory Maintenance internal interface is responsible for maintaining the NPA-NXX to hop-off ITG directory data.

The M5a.I5 Interface: The Internet Telephony Call Management Surveillance internal interface is responsible for carrying a variety of information which allows M5 to assess the availability, health, and status of the physical computer and software processes of the various Internet Telephony Gateways.

Figure 7:
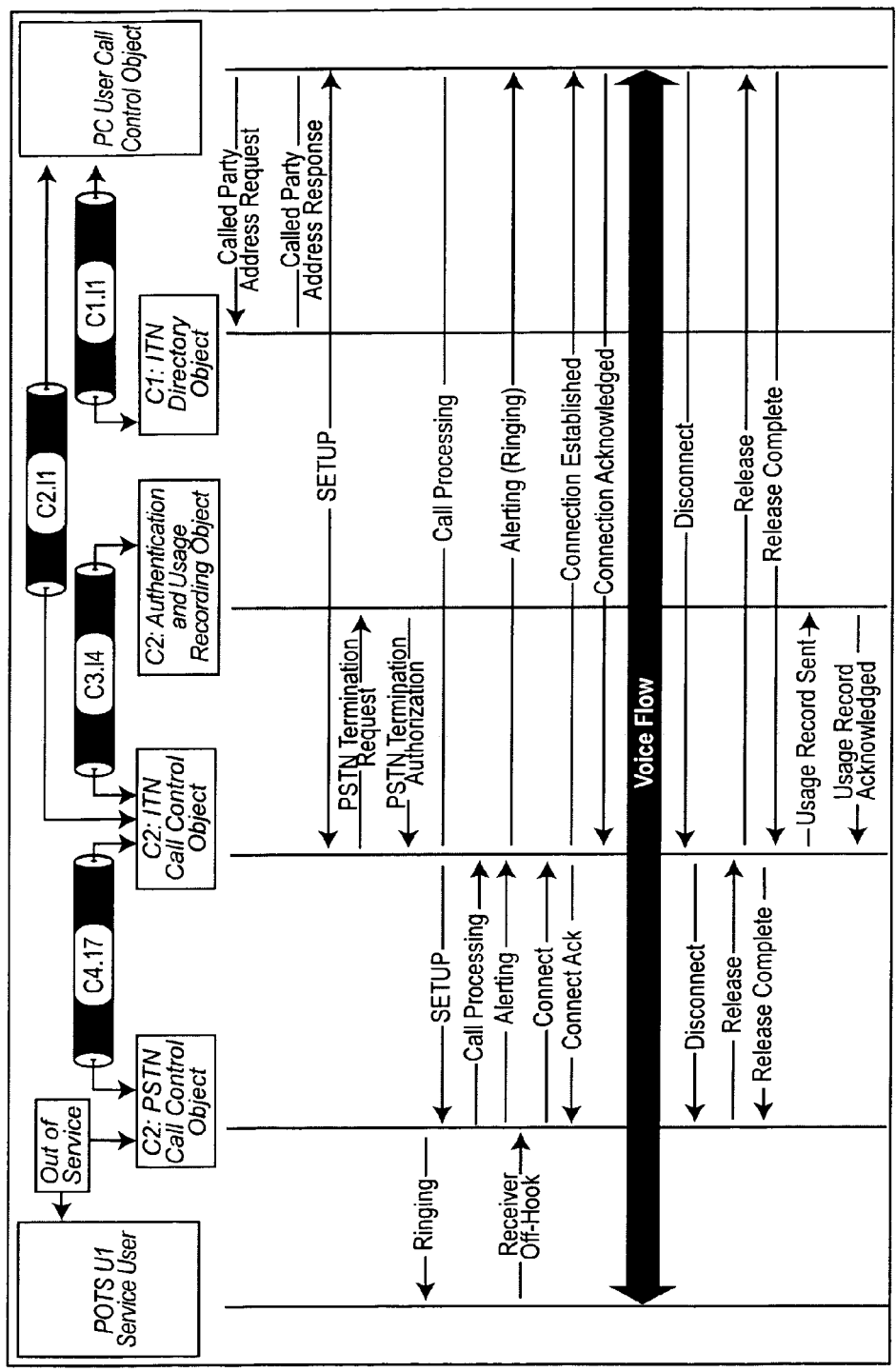
FIG. 7 is a diagram of a typical control plane message flow.

Based on the foregoing descriptions of the interfaces and objects a high level call flow of signaling messages is described. FIG. 7 illustrates an example diagram of such a control plane message flow. This example should be understood to show one version or embodiment of a set of messages which may be implemented for a PC to PSTN service. Converse messages would be utilized for a PSTN initiated PSTN to PC service, as well as appropriate corresponding messages for PC-PC and telephone-telephone service. Additional messages may be added if enhanced functionality is provided.

The call flow starts at the point where the user has established IP layer connectivity with the network, and has invoked the V/IP software application. This preliminary procedure typically entails the following steps by the party initiating the call (not illustrated in FIG. 7):

1. The customer will boot the PC, and connect to the IP network following their existing procedures for network access.

2. The customer will launch their V/IP application, either as a plug-in to an existing browser or as a stand-alone application. When launched, this application will present a template of fields which are required to initiate a call.

3. The customer will populate a "telephone number to be called" data field. The customer will also either populate his/her account number and password, or the application will reapply this data if it has been previously saved within the application.

4. The customer will then initiate the call. During the call, the call's completion status will be presented in real-time to the user by the application (via a visual display). One example of the call initiation procedure is now described.

The following steps commence with the Called Party Address Request step in FIG. 7 and proceed as follows:

1. The user initiates a call via the PC's V/IP software. This software application invokes the Directory (C1 Object) to obtain the IP address of the destination ITG. Based on the dialed number submitted by the PC application as described in the foregoing preliminary procedure, the C1 Object returns the IP address of the associated ITG (C2 Object).

2. The PC's V/IP software application invokes the C2 Object to set up a call by passing to C2 the number to be called, the user's account number, and a password. This is shown as SETUP in FIG. 7.

3. C2 invokes the C3 Object in order to receive authorization to proceed with the call (PSTN Termination Request). This may entail communication among instances of the distributed database to verify the account status of the caller and optionally set a limit on the duration or cost of the call depending upon the account status and/or balance. The pricing of the call may be communicated to C2 for communication to the caller. C3 will pass the authorization information back to the C2 (PSTN Termination Authorization).

4. If authorization was successful, C2 will establish the PSTN connection, and notify the client software that the call is proceeding (SETUP Call Proceeding). C2 may also pass on to the calling PC the pricing information obtained from C3. C2 will continue to update the client software with call establishment information as the call is proceeding and may also pass along to the caller a running account of the cost of the call.

5. After the call has been established, the PC will respond to the network that it recognizes that a connection has been established (Connection Acknowledged), timing of the call's duration can be initiated, and any usage measurements will indicate that the call is billable.

6. Steady state call (Voice Flow).

7. The PC's V/IP software application invokes the C2 service to release the call. The PC application signals release to C2, and C2 releases the call in the PSTN and confirms the release back to PC application. Also, timing of the call's billable duration is completed. Alternatively, the PSTN user may initiate call tear down as well.

8. The C2 Object passes a usage record to C3 for reporting. The C3 Object may also initiate individual call billing by reporting to M3 as shown in FIG. 6.

Figure 8:
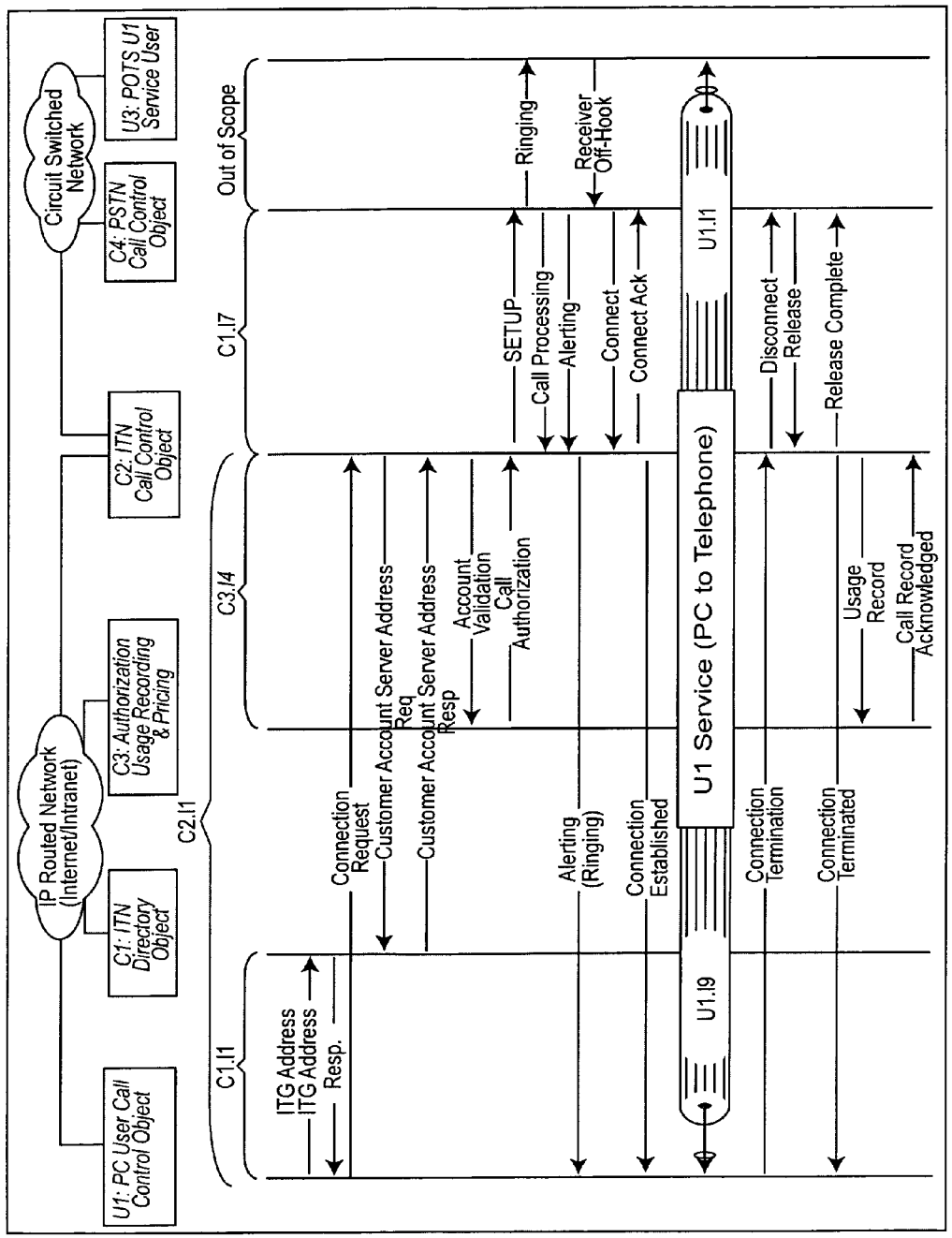
FIG. 8 is a diagram of another typical control plane message flow.

A modified version or embodiment of the call set up procedure is now described in connection with FIG. 8.

The following steps commence with the Called Party Address Request step in FIG. 7 and proceed as follows:

1. The user initiates a call via the PC's V/IP software. This software application invokes the Directory (C1 Object) to obtain the IP address of the destination ITG. Based on the dialed number submitted by the PC application, the C1 Object returns the IP address of the associated ITG (C2 Object).

2. The PC's V/IP software application invokes the C2 Object to set up a call by passing to C2 the number to be called, the user's account number, and a password (Connection Request).

3. The C2 Object invokes the C1 Object to request the customer account server address (Customer Account Server Address Req), which is then returned (Customer Account Server Address Resp).

4. The C2 Object invokes the C3 Object for account validation (Account Validation) using the Customer Account Server Address (address of the instance of the C3 object database) and receives call authorization (Call Authorization). This may include limitations as described in connection with the description of FIG. 7.

5. If authorization was successful, C2 will establish the PSTN connection, and notify the client software that the call is proceeding. C2 will continue to update the client software with call establishment information as the call is proceeding.

6. After the call has been established, the PC will respond to the network that it recognizes that a connection has been established (Connect Ack), timing of the call's duration can be initiated, and any usage measurements will indicate that the call is billable.

7. Steady state call (U1 Service PC to telephone).

8. The PC's V/IP software application invokes the C2 service to release the call. The PC application signals release to C2, and C2 releases the call in the PSTN and confirms the release back to PC application. Also, timing of the call's billable duration is completed. Alternatively, the PSTN user may initiate call tear down as well.

9. The C2 Object passes a usage record to C3 for reporting and for individual call billing if that option is chosen. The C3 Object acknowledges receipt of the usage record to C2.

Figure 9:
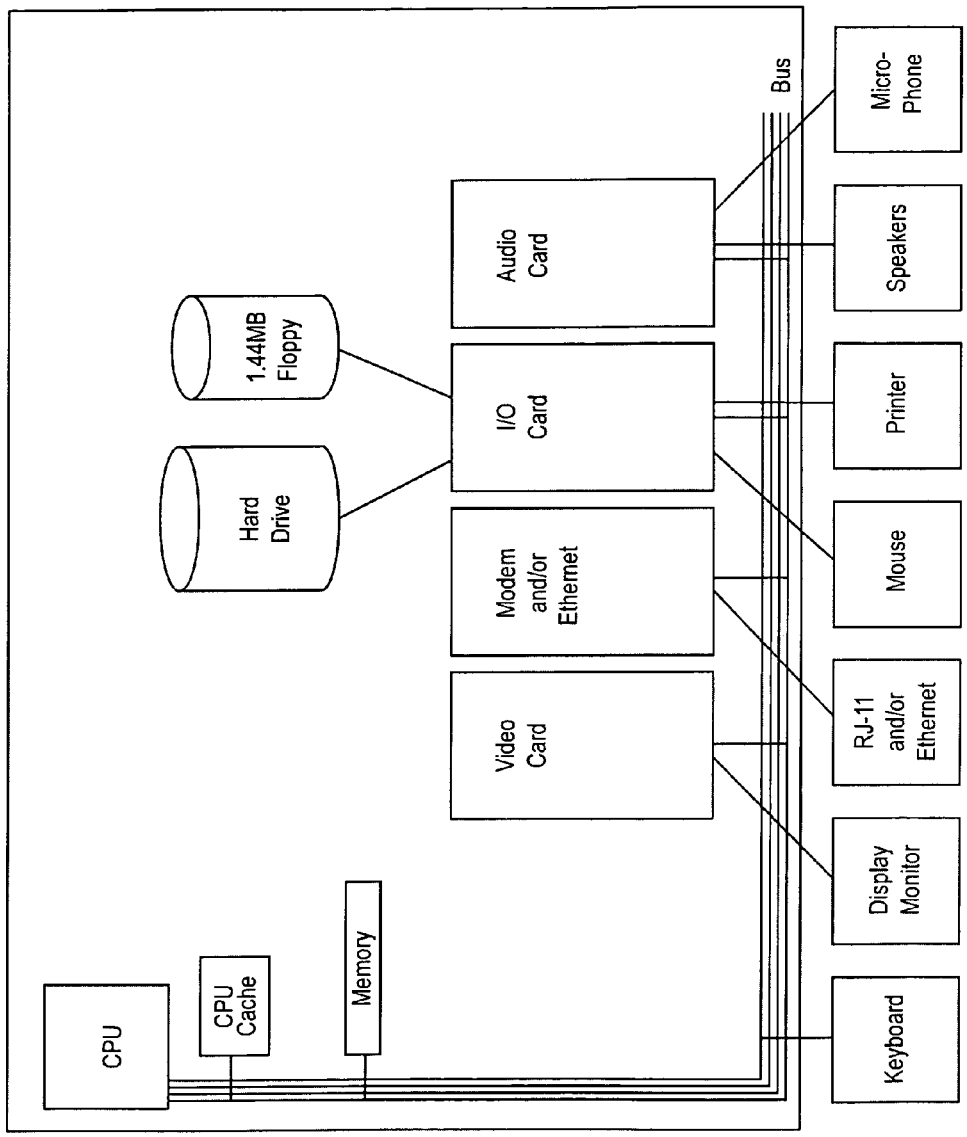
FIG. 9 provides a high level diagrammatic illustration of a typical PC which may be utilized by a user in the system of the invention.

FIG. 9 provides a high level diagrammatic illustration of a typical PC which may be utilized by a user in the system of the invention.

Figure 10:
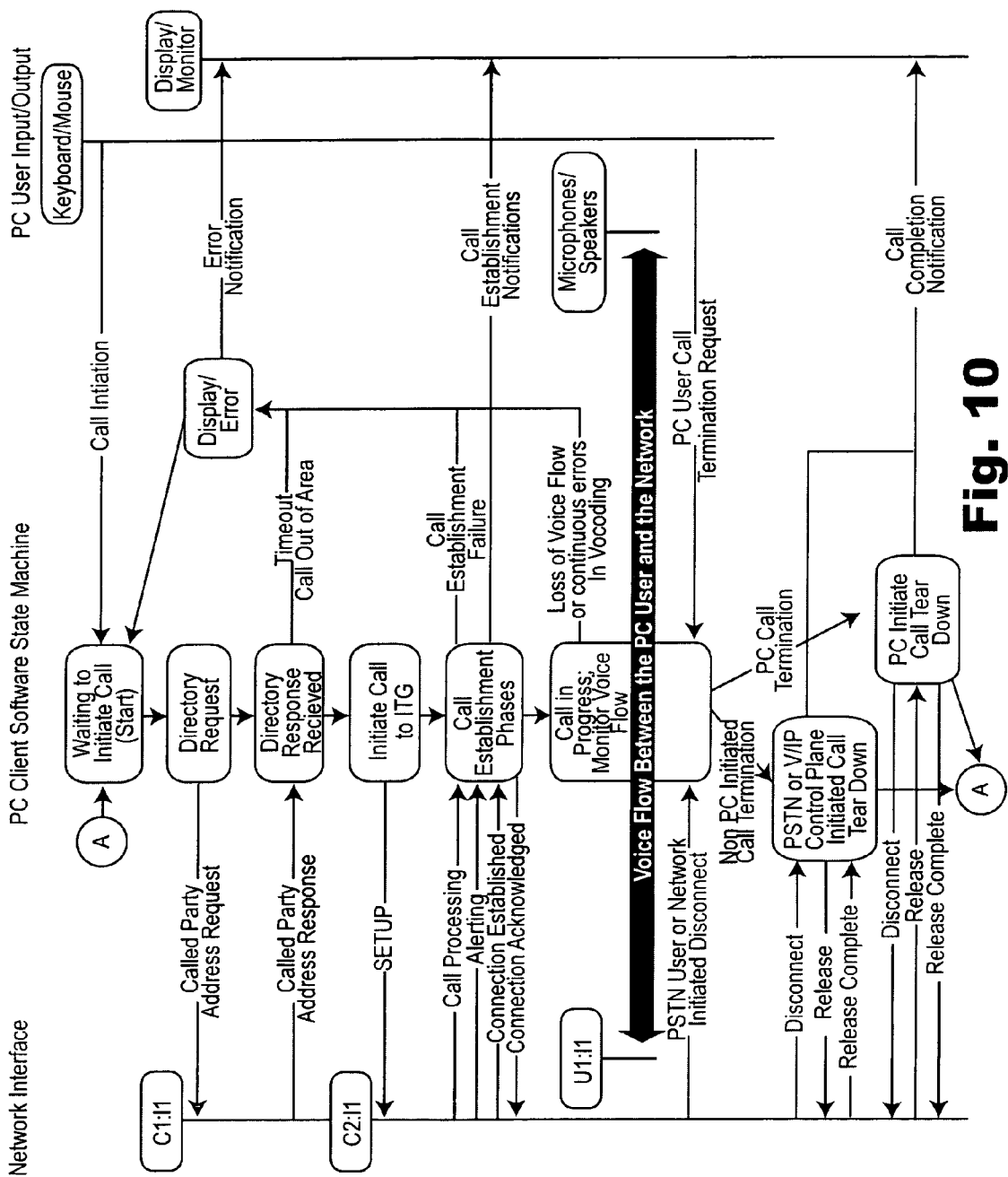
FIG. 10 illustrates a typical client software state machine.

FIG. 10 illustrates a typical client software state machine which is executed in the subscriber's PC. The V/IP software state machine correlates operations within the environment of the typical/high end PC of the user. FIG. 10 provides an example of how the end user interacts with the V/IP network via the client software. Interaction between the PC user and the software's state machine utilizes messages which cross between the client software's state machine and the operating system's input/output drivers for each hardware device. The more significant messages and the content which they may carry may be summarized as follows:

Keyboard/Mouse

Call Initiation:

This comprises the input information needed by the state machine (and the V/IP control plane) which is required to establish a call. The information includes the calling party's account number and password, as well as the telephone number being called.

PC User Call Termination Request:

This comprises the input of a notification by the user to the software to conclude the call.

Display/Monitor

Error Notification:

This comprises a dialog which shows the reason for the failure of a particular call.

Call Establishment Notification:

This refers to the display information showing the step-by-step progression of a call as it is established through the network.

Call Completion Notification:

This comprises a dialog which shows the statistics of a completed call.

Figure 11:
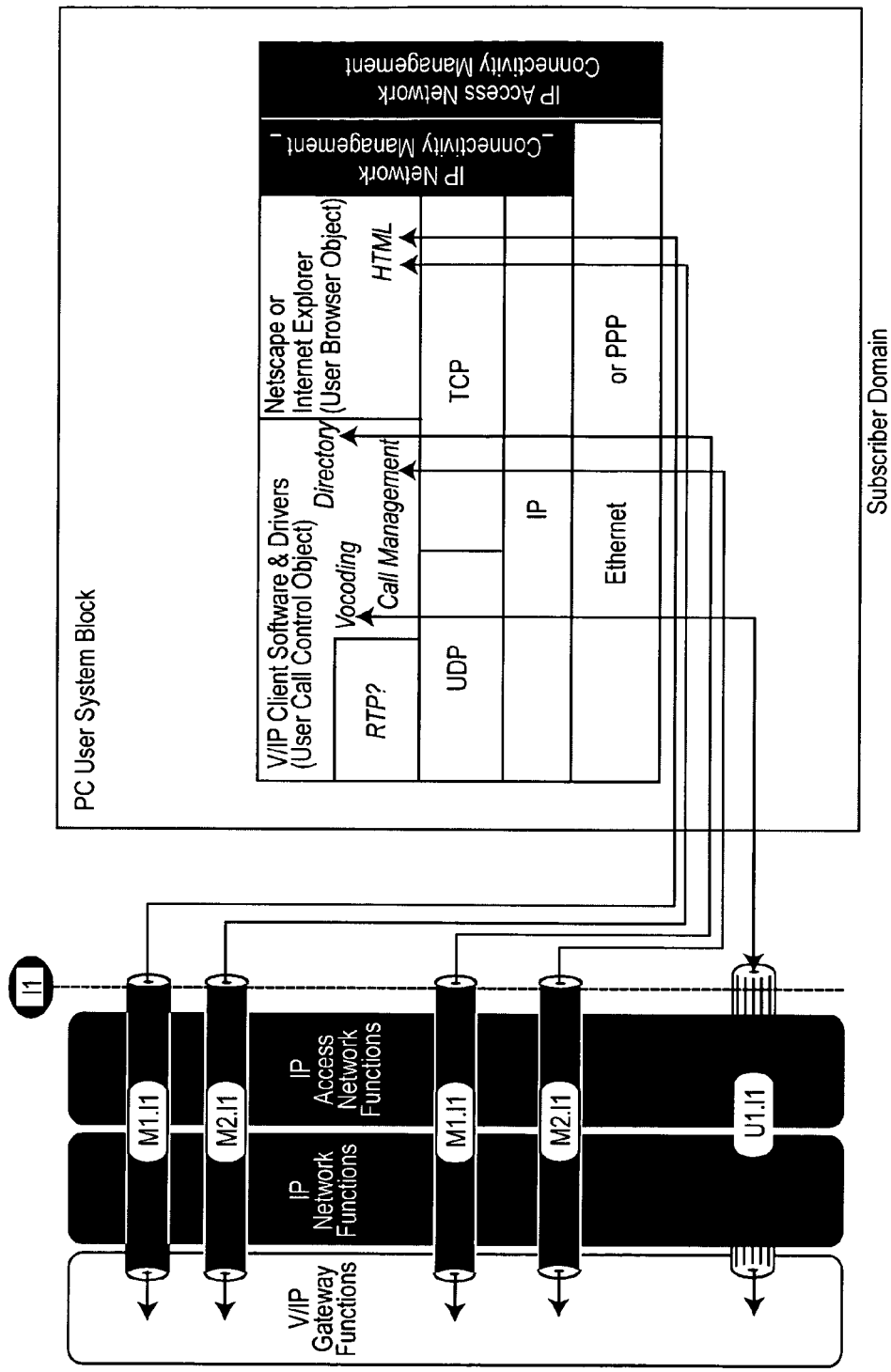
FIG. 11 shows the PC software interface and the relationship to the ITM interfaces.

FIG. 11 shows the PC software interfaces (stack) and the relationship to the ITN interfaces. It is necessary that the VI/IP software state machine fit seamlessly within the environment of a typical high end PC owned by an ISP subscriber. FIG. 11 shows how the state machine interacts with the other software components for Internet connectivity and communication. Using the types of PC shown in FIG. 9, state machine shown in FIG. 10, and interface relationships shown in FIG. 11, the following customer software characteristics and functions are significant:

1. It is not necessary for the client software to validate that IP Access Network or IP Network connectivity has been established prior to attempting to communicate with the network. The availability of connectivity across these layers is assumed. A lack of response by the network to the application's state machine is displayed to the user as a lack of network level connectivity.

2. Each of the five V/IP network interfaces is able to have their transactions traverse seamlessly across the IP Access Network and IP Network. The client software should use the same IP network drivers which are used for their existing ISP Internet connectivity. Client software driver conflicts or adverse interactions should not occur with the installed base of PC software.

3. All management plane interfaces with the user may be via the PC's existing Web Browser. The client software need not take on the task of managing network based customer data.

4. The compressed voice interface, U1.I1, preferably communicates via UDP (User Datagram Protocol), however, RTP (Routing Table Protocol) on top of UDP is also an option. If RTP is used, the client software should validate that it is a valid option over the existing IP network.

5. If RTP is selected, and communication over the IP Access network is performed with a PPP link, RTP header compression should be supported in order to reduce the required IP Access network bandwidth.

6. The software must be able to transmit DTMF digits to the hop-off ITG. Preferably the digits will be transmitted "out of band" (in other words, the PC will not generate DTMF signals which are transmitted as compressed tones).

7. The software should be able to transmit the length (duration) that a DTMF digit a pressed.

8. The software should display to the user the current state of a call as it is made through the Internet Telephony Gateway (ITG).

9. The voice played back to the PC user will be toll quality. The Vocoder includes capabilities such as echo cancellation, it should be able to handle varying levels of packet loss and latency, and it should be able to apply corrective algorithms to the voice stream.

10. A user account number and password should be required within the Call Initiation message to the state machine. If the user so chooses, these items should be able to be saved within the client application.

In order to insure ease of use and maximum utility to the subscriber it is desirable to provide for the subscriber an easy access and instructional tutorial as to the use of the system. At the same time it is also desirable to provide the subscriber with his/her billing account balance, status, and call usage details on a real time basis. This information may include descriptions on how to download and install client software and operate the service, descriptions of service availability and pricing plans, graphical (map) areas showing the ITG terminating footprints, and NPA-NXX ranges supported by the ITG terminating footprints. With respect to account information the data available to the subscriber may include call usage record details, billing account status & balance, and verification of the existing password. All of the foregoing may be conveniently provided through the use of an introductory page with links to pages that provide access to each of the foregoing.

The system of the invention provides the above described features through the architecture illustrated in FIGS. 4, 5, 6, and 12. Thus FIG. 6 shows the authorization and usage object C3 connected to an Information Server Object M1 in the V/IP management plane. This information and feedback object M1 comprises a server separate from the C3 authorization and usage object but connected to the C3 control plane object via the M1.I5 interface between the ITN management plane and control plane functions. The M1 object serves as an HTML interface to the V/IP network for subscribers to the service.

Operationally the M1 Object interface is accessible via commercial browsers and at least a Netscape 3.0 or Internet Explorer 3.0 web browser. On any customer specific request for usage records or account balance, a PC user will have to provide within the query the same account number and password which is used for call establishment. This information will be validated by C3 before fulfilling the request. The M1.I1 link between the PC user browser and M1 information server is shown in FIG. 5. The subscriber, using a commercial browser such as Netscape 3.0 or Internet Explorer 3.0 and HTML by way of example, accesses the information server via M1.I1. The information server validates the password and obtains the information from the authorization, usage and account object C3 via M1.I5, and presents the information to the PC user subscriber with the correct formatting display via M1.I1.

The M1 information server provides real time interface to the authorization, usage and account object C3 while at the same time also providing isolation of the C3 object. The information server thus provides an intermediary which, among other things, prevents undesirable interaction between information retrieval and service implementation in the C3 authorization, usage and account object. Appropriate sizing of the capacity of the information server permits the provision of virtually instant access for subscribers without necessarily requiring interrelated sizing of the authentication, usage and account object.

The combination of the logically unitary distributed authorization, usage and account object with this intermediary information server, which is constantly available to subscriber, presents a unique and powerful tool for information retrieval and usage. As has been previously explained, the distinctive authorization, usage and retrieval object provides tracking of multiple ongoing calls against the same account through separate and geographically distal ITGs and network elements.

The new information server permits a subscriber to engage in real time monitoring of this activity and real time tracking of overall account status and balance. Further, there is no requirement that the subscriber perform such monitoring or information gathering from a fixed locale. The information is as readily available from a hotel room by laptop computer as from the home location of the subscriber. Still further, the information may be retrieved and monitored not only by the subscriber but also by any entity with valid credentials for accessing the service, such as a super account holder or employer. This also provides a mechanism for an employer to act on the obtained information to place a stop on further use of any supervised account.

Figure 12:
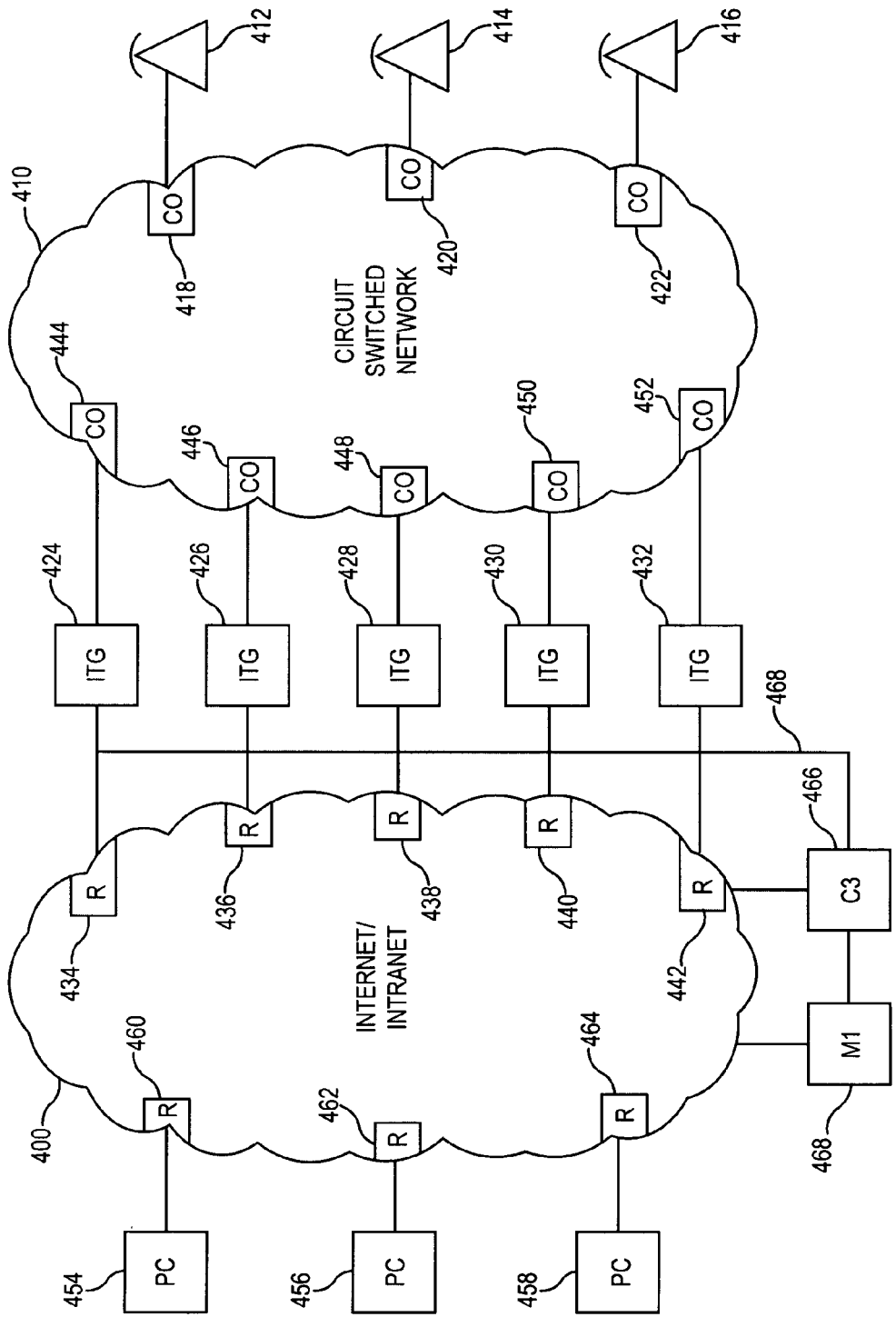
FIG. 12 is a simplified diagram illustrating another aspect of the invention showing an architecture wherein a separate intermediary information server provides substantially real time retrieval of account information across the entire communication system.

FIG. 12 provides a simplified illustration of this aspect of the overall communication system. Referring to that figure the IP Routed Internet/Intranet is shown at 400. The Circuit Switched Network, such as a public switched telephone network, is shown at 410. The circuit switched network serves a large number of subscriber terminals, here illustrated as telephone terminals 412, 414, and 416. The telephone terminals may typically be connected to the circuit switched network via end offices or central offices 418, 420, and 422 via local links or loops. It will be appreciated that these terminals may be distributed over a wide geographical area such as the entire United States or North America, by way of example.

The circuit switched network is connected to the packet switched network via a plurality of C2 call control objects or ITGs shown here by way of illustration as 424, 426, 428, 430, and 432. These gateway control objects are connected to routers in the Internet/Intranet as shown at 434, 436, 438, 440, and 442. The ITGs are also connected to end or central offices in the circuit switched network shown here as 444, 446, 448, 450, and 452. Also connected to the Internet/Intranet are voice equipped personal computers or PCs 454, 456, and 458. These PCs are shown connected to routers 460, 462, and 464. It will be appreciated that the particular gateway or ITG chosen to effect a particular communication path is dependent upon multiple factors, such as the lowest cost connection through the telephone network, by way of example. Thus the ITG 424 may be chosen to effect a link between PC 454 and telephone terminal 412.

As has been explained, the gateway controllers are all linked to the C3 authentication, usage and account object 466 as shown here at 468. The authentication, usage and account object in turn is linked to the information server object M1, here shown at 468. This has previously been described in more detail in connection with FIGS. 4, 5, and 6 hereinabove.

It is believed that this simplified diagrammatic illustration in FIG. 12 will facilitate an appreciation of the power of the authentication, usage, and account object C3 acting in conjunction with the information server M1. The arrangement permits the information server to provide to users almost immediate access to information regarding accounts which may actually be locally stored in instances of the authentication, usage and account object dispersed over an enormous geographical area. Such flexibility permits travelers to access their accounts from hotel rooms, while their employers may also access those accounts from the home or any branch office of the business establishment.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

The invention claimed is:

1. A method comprising:
receiving over a packet switched network at a call control object a request to initiate a communication session between a calling terminal and a called terminal, the request identifying a user account associated with the calling terminal and including an address of the called terminal;
sending a request from the call control object to a unitary logical object, the unitary logical object including authentication, authorization, usage accounting, and pricing information for the user in a distributed database containing the user account;
at the unitary logical object, authenticating, account validating and authorizing the communication session;
receiving at the call control object a response from the unitary logical object indicating the communication session is authorized;
determining a lowest cost gateway that connects the packet switched network and a circuit switched network through which to connect the communication session;
establishing the communication session between the calling terminal and called terminal via the determined lowest cost gateway;
distributing the unitary logical object over multiple physical systems;
at a billing system object, having an extraction interface for selectively polling for extracting usage records from the unitary logical object; and
at a credit card provider interface in communication with the billing system object, placing a charge against a credit card account number associated with the user account.

2. The method of claim 1, wherein each of the multiple physical systems includes an instance of the unitary logical object.

3. The method of claim 2, wherein the unitary logical object stores a plurality of user accounts, and each instance of the unitary logical object corresponds to a subgroup of the plurality of user accounts.

4. The method of claim 3, wherein the authenticating, account validating and authorizing the communication session includes determining the instance of the unitary logical object storing the user account associated with the calling terminal.

5. The method of claim 1, further comprising:
receiving usage information associated with the communication session at the unitary logical object; and
logging the usage information in the unitary logical object.

6. The method of claim 5, further comprising decrementing the user account based on the usage information.

7. The method of claim 1, wherein the authenticating, account validating and authorizing the communication session includes determining that no other communications session is in progress that is associated with the user account.

8. The method of claim 1, wherein the authenticating, account validating and authorizing the communication session includes determining that an available account balance of the user account permits the communication session to be established.

9. The method of claim 1, the usage records including at least one of usage accounting and pricing information in the form of an account balance.

10. The method of claim 9, further comprising a billing domain, the credit card provider interface disposed between the billing system object and the billing domain, the charge representing the account balance.

11. The method of claim 10, further comprising associating the call control object, the unitary logical object, and the billing system object with a network provider domain, the billing domain being external to the network provider domain with the credit card provider interface representing an external interface separating the network provider domain from the billing domain.

12. A system, comprising:
- a call control object connected over a packet switched network to a calling terminal, the call control object configured to receive a request from the calling terminal over the packet switched network to initiate a communication session between the calling terminal and a called terminal, the request identifying a user account associated with the calling terminal and includes an address of the called terminal;
- an authorization and usage recording object communicatively coupled to the call control object and including authentication, authorization, usage accounting, and pricing information for the user in a distributed database containing the user account, and configured to receive an authorization request from the call control object, determine whether to authorize the communication session, and send a response signal indicating that the communication session is authorized to proceed, wherein the authorization and usage recording object comprises a unitary logical object distributed over multiple physical systems;
- a billing system object having an extraction interface to selectively poll to extract usage records from the unitary logical object; and
- a credit card provider interface in communication with the billing system object to place a charge against a credit card account number associated with the user account.

13. The system of claim 12, wherein the authorization and usage recording object is further configured to receive from the call control object information comprising at least one of the following pertaining to the session: initiation of the session, progress of the session, pricing of the session and termination of the session.

14. The system of claim 12, wherein the determining whether to authorize the communication session includes determining that no other communications session is in progress that is associated with the user account.

15. The system of claim 12, wherein the determining whether to authorize the communication session includes determining that an available account balance of the user account permits the communication session to be established.

16. The system of claim 12, further comprising:
- at least one gateway communicatively coupled to the calling terminal via the packet switched network; and
- wherein the communication session is established between the calling terminal and called terminal via one of the at least one gateway.

17. The system of claim 16, wherein the call control object is further configured to determine a lowest cost gateway of the at least one gateway through which to establish the communication session.

18. The system of claim 12, further comprising:
- the usage records including at least one of the usage accounting and the pricing information in the form of an account balance; and
- a billing domain, the credit card provider interface disposed between the billing system object and the billing domain, the charge representing the account balance.

19. The system of claim 18, further comprising:
- a network provider domain that includes the call control object, the unitary logical object, and the billing system object with a network provider domain; and
- wherein the billing domain is disposed external to the network provider domain with the credit card provider interface representing an external interface separating the network provider domain from the billing domain.

\* \* \* \* \*